(12) United States Patent
Yasui et al.

(10) Patent No.: US 7,216,006 B2
(45) Date of Patent: May 8, 2007

(54) CONTROL SYSTEM FOR A PLANT INCLUDING A SLIDE MODE CONTROLLER

(75) Inventors: Yuji Yasui, Wako (JP); Yoshihisa Iwaki, Wako (JP); Jun Takahashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/345,994

(22) Filed: Feb. 2, 2006

(65) Prior Publication Data

US 2006/0129250 A1    Jun. 15, 2006

Related U.S. Application Data

(62) Division of application No. 10/312,108, filed as application No. PCT/JP02/03895 on Apr. 19, 2002, now Pat. No. 7,050,864.

(30) Foreign Application Priority Data

| Apr. 20, 2001 | (JP) | ............................... 2001-123344 |
| Apr. 24, 2001 | (JP) | ............................... 2001-125648 |
| May 16, 2001 | (JP) | ............................... 2001-146144 |
| Jun. 14, 2001 | (JP) | ............................... 2001-179926 |
| Jun. 19, 2001 | (JP) | ............................... 2001-184540 |
| Nov. 9, 2001 | (JP) | ............................... 2001-343998 |

(51) Int. Cl.
| *G05B 13/02* | (2006.01) |
| *G05B 11/01* | (2006.01) |
| *G06F 17/00* | (2006.01) |
| *F02D 9/08* | (2006.01) |
| *F02D 31/00* | (2006.01) |
| *F02D 11/02* | (2006.01) |

(52) U.S. Cl. ............................ 700/54; 700/32; 700/37; 700/52; 700/71; 701/85; 123/337; 123/376; 123/398

(58) Field of Classification Search ............ 700/28–34, 700/37, 44, 52, 54, 71; 60/276, 285, 906; 123/337, 376, 398, 568.19; 701/51, 85, 103, 701/109, 110, 113
See application file for complete search history.

(56) References Cited

U.S. PATENT DOCUMENTS 4,663,703 A    5/1987    Axelby et al.

(Continued)

FOREIGN PATENT DOCUMENTS

CA    2337865    1/2000

(Continued)

*Primary Examiner*—Crystal J. Barnes
(74) *Attorney, Agent, or Firm*—Lahive & Cockfield, LLP; Anthony A. Laurentano, Esq.

(57) ABSTRACT

A control system for a plant is provided. This control system can control the plant more stably, when the model parameters of the controlled object model which are obtained by modeling the plant, which is a controlled object, are identified and the sliding mode control is performed using the identified model parameters. The model parameter identifier (22) calculates a model parameter vector (θ) by adding an updating vector (dθ) to a reference vector (θbase) of the model parameter. The updating vector (dθ) is corrected by multiplying a past value of at least one element of the updating vector by a predetermined value which is greater than "0" and less than "1". The model parameter vector (θ) is calculated by adding the corrected updating vector (dθ) to the reference vector (θbase).

8 Claims, 37 Drawing Sheets

U.S. PATENT DOCUMENTS

| | | |
|---|---|---|
| 4,720,793 A | 1/1988 | Watanabe et al. |
| 5,134,574 A | 7/1992 | Beaverstock et al. |
| 5,144,549 A | 9/1992 | Youcef-Toumi |
| 5,268,834 A | 12/1993 | Sanner et al. |
| 5,418,710 A | 5/1995 | Ono et al. |
| 5,535,135 A | 7/1996 | Bush et al. |
| 5,586,190 A | 12/1996 | Trantow et al. |
| 5,680,337 A | 10/1997 | Pedersen et al. |
| 5,710,822 A | 1/1998 | Steenhagen et al. |
| 5,715,320 A | 2/1998 | Allie et al. |
| 5,819,202 A | 10/1998 | Sato et al. |
| 5,845,490 A * | 12/1998 | Yasui et al. .................. 60/276 |
| 5,880,952 A * | 3/1999 | Yasui et al. .................. 700/28 |
| 5,924,281 A * | 7/1999 | Yasui et al. .................. 60/276 |
| 5,988,848 A * | 11/1999 | Berstecher et al. ........... 700/28 |
| 6,082,099 A * | 7/2000 | Yasui et al. .................. 700/28 |
| 6,178,947 B1 | 1/2001 | Machida et al. |
| 6,185,467 B1 * | 2/2001 | Romano et al. ............. 60/276 |
| 6,188,953 B1 * | 2/2001 | Yasui et al. ................. 701/109 |
| 6,192,311 B1 * | 2/2001 | Yasui et al. ................. 701/113 |
| 6,195,988 B1 | 3/2001 | Yasui et al. |
| 6,230,486 B1 | 5/2001 | Yasui et al. |
| 6,236,895 B1 | 5/2001 | Romano et al. |
| 6,266,605 B1 | 7/2001 | Yasui et al. |
| 6,351,943 B1 * | 3/2002 | Tagami et al. ................ 60/285 |
| 6,449,943 B1 | 9/2002 | Ueno et al. |
| 6,453,229 B1 * | 9/2002 | Ohkuma et al. ............. 701/109 |
| 6,816,776 B2 * | 11/2004 | Yasui et al. .................. 701/110 |
| 6,839,598 B2 | 1/2005 | Yasui et al. |
| 6,950,741 B2 * | 9/2005 | Ishikawa et al. ............. 701/110 |
| 7,120,530 B2 * | 10/2006 | Yasui et al. .................... 701/51 |
| 2003/0009240 A1 | 1/2003 | Yasui et al. |
| 2003/0028264 A1 | 2/2003 | Yasui et al. |

FOREIGN PATENT DOCUMENTS

| | | |
|---|---|---|
| EP | 0800125 A1 | 10/1997 |
| EP | 0990794 B1 | 4/2000 |
| EP | 1045124 A2 | 10/2000 |
| JP | 8-232670 | 9/1996 |
| JP | 8-261050 | 10/1996 |
| JP | 9-274504 | 10/1997 |
| JP | 10-301602 | 11/1998 |
| JP | 11-73205 | 3/1999 |
| JP | 11-73206 | 3/1999 |
| JP | 0899441 | 3/1999 |
| JP | 11-93740 | 4/1999 |
| JP | 11-93741 | 4/1999 |
| JP | 11-153051 | 6/1999 |
| JP | 2000-110637 | 4/2000 |
| JP | 2000-179384 | 6/2000 |
| JP | 2000-179385 | 6/2000 |

* cited by examiner

FIG. 5
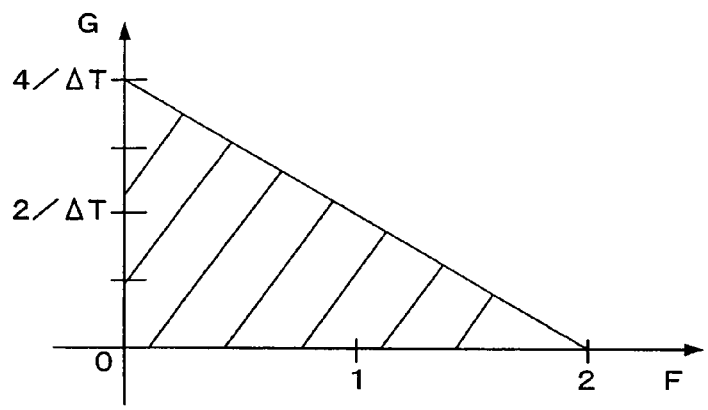
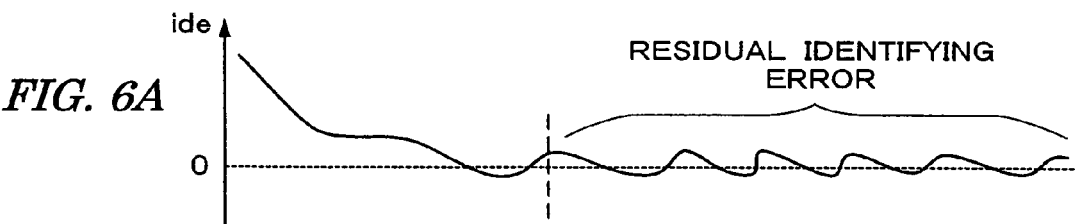
FIG. 6A
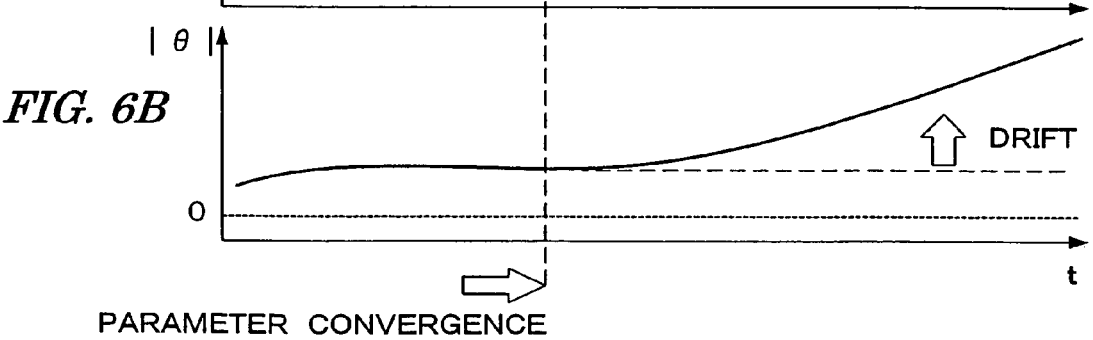
FIG. 6B

DEFAULT OPENING DEVIATION COMPONENT

CONTROL SYSTEM FOR A PLANT INCLUDING A SLIDE MODE CONTROLLER

RELATED APPLICATIONS

This application is a divisional of U.S. patent application Ser. No. 10/312,108 (allowed), filed Dec. 20, 2002, now U.S. Pat. No. 7,050,864 which was a 35 U.S.C. §371 filing of International Application Number PCT/JP02/03895 filed Apr. 19, 2002, which claims priority to Japanese Patent Application No. 2001-123344 filed on Apr. 20, 2001, Japanese Patent Application No. 2001-125648 filed on Apr. 24, 2001, Japanese Patent Application No. 2001-146144 filed on May 16, 2001, Japanese Patent Application No. 2001-179926 filed on Jun. 14, 2001, Japanese Patent Application No. 2001-184540 filed on Jun. 19, 2001, Japanese Patent Application No. 2001-343998 filed on Nov. 9, 2001 in Japan. The contents of the aforementioned applications are hereby incorporated by reference.

TECHNICAL FIELD

The present invention relates to a control system for a plant, and more particularly to a control system for controlling a plant with a sliding mode controller based on a sliding mode control theory which is one of robust control theories.

BACKGROUND ART

One known control system based on a sliding mode control theory is disclosed in Japanese Patent Laid-open No. Hei 9-274504, for example. The publication proposes a method of setting a hyperplane in the sliding mode control theory according to the convergence state of a controlled state quantity. According to the proposed method, the convergence response and convergence stability of the sliding mode control is improved.

For controlling a plant, which is a controlled object, with the sliding mode controller, it is necessary to produce a model of the plant and determine model parameters representing the characteristics of the model of the plant (i.e. the controlled object). The model parameters may be set to predetermined constant values. However, the values of the model parameters usually change due to aging and disturbance. Therefore, it is desirable to use a model parameter identifier for identifying the model parameters on a real-time basis and carry out the sliding mode control using the model parameters that are identified by the model parameter identifier.

The model parameter identifier detects an identifying error which is a difference between the output of the plant which is calculated using the identified model parameters and the actual output of the plant, and corrects the model parameters in order to eliminate the identifying error. Therefore, regarding the model parameter identifier, the following problems may occur.

Due to nonlinear characteristics and disturbance whose average value is not "0", the identifying error does not become "0" even though substantially optimum model parameters have actually been obtained. Therefore, the model parameters which do not need to be corrected are occasionally corrected. As a result, a drift occurs in which the values of the model parameters gradually shift from their optimum values to some other values to make the control performed by the sliding mode controller unstable.

Conventionally known is an air-fuel ratio control system in which a controlled object model is defined by modeling a plant, i.e., a controlled object, and model parameters of the controlled object model are identified by a parameter adjusting device (for example, Japanese Patent Laid-open No. Hei 11-73206). According to this system, the air-fuel ratio of an air-fuel mixture to be supplied to the internal combustion engine is feedback-controlled to a target air-fuel ratio by a self-tuning regulator using the identified model parameters.

In the above control system, each model parameter is calculated by adding an initial value of the model parameter and an updating component which is calculated according to the identifying error of the model parameters.

In the above control system, the initial values of the model parameter is determined irrespective of the state quantity of the plant at the time of calculating a control input to the plant. Therefore, the time period which is necessary for the model parameters to converge on their optimum values becomes longer when the characteristics of the plant change in a relatively short time period, which results in insufficient controlling performance.

One known control system based on the sliding mode control theory is disclosed in Japanese Patent Laid-open No. Hei 9-274504, for example. The publication shows that the stability of the sliding mode control is determined, and when the sliding mode control is determined to be unstable, the value calculated before the sliding mode control is determined to be unstable is used for a control input to the controlled object.

Another control system is known from Japanese Patent Laid-open No. Hei 11-93741. In this control system, the stability of the sliding mode control is determined, and when the sliding mode control is determined to be unstable, the control input to the controlled object is set to a predetermined value.

However, according to the above-described conventional control systems, when the sliding mode control is determined to be unstable, the control input to the plant is fixed, which makes it impossible to converge an output of the plant to the control target value.

In the control system shown in Japanese Patent Laid-open No. Hei 11-73206 described above, the model parameters are calculated by adding updating components, which are calculated according to the identifying error of the model parameters, to the initial values of the model parameters.

According to this control system shown in Japanese Patent Laid-open No. Hei 11-73206, a drift of the model parameters due to disturbances is prevented. However, since the model parameters calculated by the parameter adjusting device are used per se in the self tuning regulator, there remains a room for improvement in maintaining stability of the self tuning regulator.

A control system in which model parameters of a controlled object model which are obtained by modeling a plant, is identified on a real-time basis, and the plant is controlled using the identified model parameters, is shown in Japanese Patent Laid-open No. 2000-179384.

The control system shown in this publication includes an identifier for identifying the model parameters, an estimator for estimating an output of the plant, and a sliding mode controller which calculates a control input to the plant with the sliding mode control, using the model parameters identified by the identifier and the plant output estimated by the estimator. A difference between an output of the plant and a target value of the plant output, and a difference between an input of the plant and a reference value, are input to the identifier and the estimator. The reference value is variably set according to a manipulating quantity for manipulating the input of the plant. By setting the reference value variably according to the manipulating quantity, an effect of raising a converging speed of the control for converging the plant output to the target value, is obtained.

According to the control system shown in Japanese Patent Laid-open No. 2000-179384, a method for setting the reference value according to an adaptive control input which is calculated by the sliding mode controller, is adopted. Accordingly, this method for setting the reference value is applicable only to a control system using the adaptive sliding mode control. Therefore, a reference value setting method which is widely applicable is desired.

One known throttle valve opening control system for a vehicle is disclosed in Japanese Patent Laid-open No. Hei 8-261050. In this control system, an opening of a throttle valve which is actuated by a motor is controlled with a PID (Proportional, Integral, and Differential) control, and control constants of the PID control is set according to an operating condition of the vehicle.

Since the throttle valve actuating device, which is a controlled object, has non-linear characteristics, a sufficient control performance in control accuracy, control stability, and a follow-up characteristic (convergence characteristic) of the throttle valve opening to a target value, is not obtained by the conventional PID control.

DISCLOSURE OF INVENTION

It is therefore an object of the present invention to provide a control system for a plant, which can control the plant more stably when the model parameters of the controlled object model which are obtained by modeling the plant, which is a controlled object, are identified and the sliding mode control is performed using the identified model parameters.

Another object of the present invention is to provide a control system for a plant, which can promptly converge one or more model parameter of the controlled object model on its optimum value to thereby maintain good controllability, when the characteristics of the plant changes in a relatively short time period.

Another object of the present invention is to provide a control system for a plant, which can continue the control of converging an output of the plant to the control target value and execute a suitable process for stabilizing a sliding mode control, when the sliding mode control is determined to be unstable, to thereby improve the stability of the sliding mode control.

Another object of the present invention is to provide a control system for a plant, which identifies model parameters of a controlled object model which is obtained by modeling the plant (i.e. the controlled object), and improve stability of the control using the model parameters.

Another object of the present invention is to provide a control system for a plant, in which when using a controlled object model which is defined using a reference value of the input or output of the plant, the reference value is set by a widely applicable method, to thereby improve control performance.

Another object of the present invention is to provide a control system for a throttle valve actuating device, which can improve control accuracy, control stability, and a follow-up characteristic of the throttle valve opening to a target value.

To achieve the above object, the present invention provides a control system for a plant, comprising identifying means and a sliding mode controller. The identifying means identifies a model parameter vector ($\theta$) of a controlled object model of a plant which is obtained by modeling the plant. The sliding mode controller controls the plant using the model parameter vector identified by the identifying means. The identifying means comprises an identifying error calculating means, an updating vector calculating means, and an updating vector correcting means. The identifying error calculating means calculates an identifying error (ide) of the model parameter vector. The updating vector calculating means calculates an updating vector ($d\theta$) according to the identifying error. The updating vector correcting means corrects the updating vector by multiplying a past value of at least one element of the updating vector by a predetermined value (DELTAi, EPSi) which is greater than "0" and less than "1". The identifying means calculates the model parameter vector by adding the corrected updating vector to a reference vector ($\theta$base, $\theta(0)$) of the model parameter vector.

With this configuration, the updating vector is calculated according to the identifying error of the model parameter vector, and corrected by multiplying the past value of at least one element of the updating vector by the predetermined value which is greater than "0" and less than "1". The corrected updating vector is added to the reference vector of the model parameter vector to calculate the model parameter vector. Accordingly, values of the elements of the updating vector are limited, thus stabilizing the model parameter vector in the vicinity of the reference vector. As a result, the drift of the model parameters is prevented, to thereby improve the stability of the sliding mode control performed by the sliding mode controller.

Preferably, the updating vector correcting means does not multiply one of an element of the updating vector which is relevant to the input of the plant (an element relevant to the calculation of b1) and an element of the updating vector which is irrelevant to the input and the output of the plant (an element relevant to the calculation of c1), by the predetermined value. According to this configuration, the steady-state deviation which may be caused by correcting these elements can be prevented from occurring.

Preferably, the updating vector correcting multiplies at least one element of the reference vector ($\theta(0)$) by the predetermined value (EPSi). Also in this case, the drift of the model parameters is prevented, to thereby improve the stability of the sliding mode control performed by the sliding mode controller.

The present invention further provides a control system for a plant, comprising an identifying means and a sliding mode controller. The identifying means identifies a model parameter vector of a controlled object model which is obtained by modeling the plant, based on an input and an output of the plant. The sliding mode controller controls the plant using the model parameter vector identified by the identifying means. The identifying means comprises identifying error calculating means and identifying error correcting means. The identifying error calculating means calculates an identifying error (ide) of the model parameter vector. The identifying error correcting means corrects the identifying error in a decreasing direction, if the identifying error is in a predetermined range ($-\text{EIDNRLMT} \leq \text{ide} \leq \text{EIDNRLMT}$). The identifying means calculates the model parameter vector using the identifying error (idenl) corrected by the identifying error correcting means.

With this configuration, if the identifying error is in the predetermined range, the identifying error is corrected in a decreasing direction, and the model parameter vector is calculated using the corrected identifying error. Therefore, the identifying error is suppressed to less accumulate in the model parameters, that is, the drift of the model parameters is prevented, to thereby improve the stability of the sliding mode control carried out by the sliding mode controller.

Preferably, the identifying error correcting means sets the identifying error to "0", if the identifying error is in the predetermined range. With this configuration, the effect of the identifying error which is not to be reflected to the values of model parameters is eliminated, resulting in an increased effect of preventing the model parameters from drifting.

Preferably the predetermined range is set according to an amount (DDTHR) of change in a control target value or an amount (DTH) of change in the output of the plant. With this configuration, the range of the identifying error whose influence is to be reduced, becomes appropriate. Accordingly, it is prevented that the identifying error which is to be reflected to the values of model parameters is reduced or neglected as an unnecessary error.

Preferably, the identifying means identifies the model parameter vector according to a fixed gain algorithm. With this configuration, the amount of calculations for identifying the model parameters can be reduced.

Preferably, the identifying error calculating means performs a low-pass filtering of the identifying error and outputs the identifying error after the low-pass filtering.

With this configuration, the model parameter vector is identified using the identifying error which has been processed by the low-pass filtering. Accordingly, the frequency characteristics of the controlled object model are made closer to the actual frequency characteristics of the plant, to thereby improve the robustness and stability of the control carried out by the sliding mode controller.

Preferably, the control system further comprises predicting means for calculating a predicted value (PREDTH) of the output of the plant. With this configuration, the predicted value of the output of the plant is calculated by the predicting means. Therefore, the plant which has a dead time element can be controlled accurately.

Preferably, the predicting means calculates the predicted value using the model parameter vector identified by the identifying means. With this configuration, it is possible to calculate an accurate predicted value even when the dynamic characteristics of the plant changes with time or changes according to environmental conditions.

Preferably, a control input applied from the sliding mode controller to the plant includes an adaptive law input. With this configuration, good controllability can be obtained even in the presence of disturbance and/or a modeling error, which is a difference between the characteristics of the actual plant and the characteristics of the controlled object model.

Preferably, the plant includes a throttle valve actuating device (10) having a throttle valve (3) of an internal combustion engine and actuating means (6) for actuating the throttle valve, and the sliding mode controller calculates a parameter (DUT) for determining a control input to be applied to the throttle valve actuating device to make an opening (TH) of the throttle valve coincide with a target opening (THR).

With this configuration, the sliding mode controller performs the control to make the opening of the throttle valve coincide with the target opening, using stable model parameters identified by the identifying means. Consequently, the controllability of the throttle valve opening to the target opening can be improved, and the throttle valve opening can be controlled more stably.

Preferably, the plant includes an engine system (210) having an internal combustion engine (212) and fuel supply means (211) for supplying fuel to the engine, and the sliding mode controller calculates a parameter (DKAF) for determining a control input to be applied to the engine system to make an air-fuel ratio of an air-fuel mixture to be supplied to the engine coincide with a target air-fuel ratio.

With this configuration, the sliding mode controller performs the control to make the air-fuel ratio coincide with the target air-fuel ratio, using stable model parameters identified by the identifying means. Consequently, the controllability of the air-fuel ratio to the target air-fuel ratio can be improved, and the air-fuel ratio can be controlled more stably.

The present invention further provides a control system for a plant, comprising identifying means and control means. The identifying means identifies at least one model parameter ($\theta$) of a controlled object model of a plant which is obtained by modeling the plant. The control means controls the plant using the at least one model parameter identified by the identifying means. The identifying means comprises a reference model parameter calculating means, an identifying error calculating means, and an updating component calculating means. The reference model parameter calculating means calculates at least one reference model parameter ($\theta$base) according to a state quantity (DTH) of the plant. The identifying error calculating means calculates an identifying error (ide) of the at least one model parameter. The updating component calculating means calculates at least one updating component ($d\theta$) according to the identifying error (ide). The identifying means calculates the at least one model parameter by adding the at least one updating component to the at least one reference model parameter.

With this configuration, the updating component(s) is/are calculated according to the identifying error, and the model parameter(s) is/are calculated by adding the updating component(s) to the reference model parameter(s) which is/are calculated according to the state quantity of the plant. Accordingly, the model parameter(s) is/are calculated by means of correcting the reference model parameter(s) corresponding to the always-changing state quantity of the plant, with the updating component(s), which makes it possible to converge the model parameter(s) more promptly compared with the conventional method.

Preferably, the state quantity of the plant is a parameter indicative of a change in the dynamic characteristic of the plant. The parameter indicative of a change in the dynamic characteristic of the plant may be an output (DTH, TH) of the plant, or a control target value (DTHR, THR) to which the output of the plant is controlled to converge. With this configuration, the reference model parameter(s) which reflect(s) the change in the dynamic characteristics of the plant can be obtained. This makes it possible to promptly converge the model parameter(s) especially when the plant includes a nonlinear element.

Preferably, the control means controls the plant with the sliding mode control. With this configuration, good controllability can be obtained even in the presence of disturbance, a modeling error (a difference between the characteristics of the actual plant and the characteristics of the controlled object model), and/or a dead time (a delay between the input and output of the controlled object).

Preferably the control input applied from the control means to the plant includes an adaptive law input. With this configuration, better controllability can be obtained even in the presence of disturbance and/or the modeling error.

Preferably, the plant includes a throttle valve actuating device having a throttle valve of an internal combustion engine and actuating means for actuating the throttle valve, and the sliding mode controller calculates a parameter for determining a control input to be applied to the throttle valve actuating device to make an opening of the throttle valve coincide with a target opening.

With this configuration, the control means performs the control to make the opening of the throttle valve coincide with the target opening, using model parameters identified by the identifying means. Consequently, the controllability of the throttle valve opening to the target opening can be improved.

The present invention further provides a control system for a plant, including a sliding mode controller for controlling the plant with the sliding mode control. The sliding mode controller includes switching function value calculating means, equivalent control input calculating means, reaching law input calculating means, control input calculating means, stability determining means, and stabilizing means. The switching function value calculating means calculates a value ($\sigma$) of a switching function defined as a linear function of a deviation between an output of the plant and a control target value. The equivalent control input calculating means calculates an equivalent control input (Ueq) that contributes to constraining a deviation state quantity on the switching straight line on which the value of the switching function becomes zero. The deviation state quantity is defined based on the deviation between the output of the plant and the control target value. The reaching law input calculating means calculates a reaching law input (Urch) that contributes to placing the deviation state quantity onto the switching straight line. The control input calculating means calculates a control input (Usl) to the plant by adding at least the equivalent control input (Ueq) and the reaching law input (Urch). The stability determining means determines whether or not the sliding mode control is stable. The stabilizing means reduces an absolute value of the equivalent control input (Ueq) when the sliding mode control is determined to be unstable.

With this configuration, the control input to the plant is calculated using the equivalent control input that contributes to constraining the deviation state quantity on the switching straight line, and the reaching law input that contributes to placing the deviation state quantity onto the switching straight line. When the sliding mode control is determined to be unstable, the absolute value of the equivalent control input is reduced. The equivalent control input may be most greatly influenced when the sliding mode control becomes unstable. Therefore, the reduction of the absolute value of the equivalent control input makes it possible to stabilize the sliding mode control while continuing the control of converging an output of the plant to the control target value.

The present invention provides another control system for a plant, including a sliding mode controller for controlling the plant with a sliding mode control. The sliding mode controller includes switching function value calculating means for calculating a value ($\sigma$) of a switching function defined as a linear function of a deviation between an output of the plant and a control target value, equivalent control input calculating means for calculating an equivalent control input (Ueq) that contributes to constraining a deviation state quantity which is defined based on the deviation between the output of the plant and the control target value, on a switching straight line on which the value of the switching function becomes zero, reaching law input calculating means for calculating a reaching law input (Urch) that contributes to placing the deviation state quantity onto the switching straight line, control input calculating means for calculating a control input to the plant by adding at least the equivalent control input (Ueq) and the reaching law input (Urch), stability determining means for determining whether or not the sliding mode control is stable, and stabilizing means for changing a control gain (F) that is used in calculating the reaching law input (Urch), to a value (XKRCHSTB) that makes the sliding mode control more stable, when the sliding mode control is determined to be unstable.

With this configuration, the control input to the plant is calculated using the equivalent control input that contributes to constraining the deviation state quantity on the switching straight line, and the reaching law input that contributes to placing the deviation state quantity onto the switching straight line. When the sliding mode control is determined to be unstable, the control gain that is used in calculating the reaching law input, to a value that makes the sliding mode control more stable. Accordingly, it is possible to stabilize the sliding mode control while continuing the control of converging an output of the plant to the control target value.

Preferably, the sliding mode controller further includes adaptive law input calculating means for calculating an adaptive law input (Uadp) that contributes to placing the deviation state quantity onto the switching straight line, and the control input calculating means calculates the control input (Usl) to the plant by adding the equivalent control input (Ueq), the reaching law input (Urch), and the adaptive law input (Uadp).

With this configuration, the control input applied to the plant is calculated by further adding the adaptive law input to the equivalent control input and the reaching law input. Accordingly, better controllability can be obtained even in the presence of disturbance and/or the modeling error (a difference between the characteristics of the actual plant and the characteristics of the controlled object model).

The present invention provides another control system for a plant, including a sliding mode controller for controlling the plant with a sliding mode control. The sliding mode controller includes switching function value calculating means for calculating a value ($\sigma$) of a switching function defined as a linear function of a deviation between an output of the plant and a control target value, equivalent control input calculating means for calculating an equivalent control input (Ueq) that contributes to constraining a deviation state quantity which is defined based on the deviation between the output of the plant and the control target value, on a switching straight line on which the value of the switching function becomes zero, reaching law input calculating means for calculating a reaching law input (Urch) that contributes to placing the deviation state quantity onto the switching straight line, adaptive law input calculating means for calculating an adaptive law input (Uadp) that contributes to placing the deviation state quantity onto the switching straight line, control input calculating means for calculating a control input to the plant by adding the equivalent control input (Ueq), the reaching law input (Urch), and the adaptive law input (Uadp), stability determining means for determining whether or not the sliding mode control is stable, and stabilizing means for changing a control gain (G) that is used in calculating the adaptive law input, to a value (XKADPSTB) that makes the sliding mode control more stable, when the sliding mode control is determined to be unstable.

With this configuration, the control input to the plant is calculated using the equivalent control input that contributes to constraining the deviation state quantity on the switching straight line, the reaching law input that contributes to placing the deviation state quantity onto the switching straight line, and the adaptive law input that contributes to placing the deviation state quantity onto the switching straight line. When the sliding mode control is determined to be unstable, the control gain that is used in calculating the adaptive law input, to a value that makes the sliding mode control more stable. Accordingly, it is possible to stabilize the sliding mode control while continuing the control of converging an output of the plant to the control target value. Using the adaptive law input makes it possible to obtain good controllability even in the presence of disturbance and/or the modeling error, thereby stabilizing the sliding mode control while continuing the control of converging an output of the plant to the control target value.

The present invention provides another control system for a plant, including a sliding mode controller for controlling the plant with a sliding mode control. The sliding mode controller includes switching function value calculating means for calculating a value ($\sigma$) of a switching function defined as a linear function of a deviation between an output of the plant and a control target value, stability determining means for determining whether or not the sliding mode control is stable, and stabilizing means for changing the switching function (VPOLE) so that a response speed of the sliding mode control may decrease, when the sliding mode control is determined to be unstable.

With this configuration, the switching function is changed so that a response speed of the sliding mode control may decrease, when the sliding mode control is determined to be unstable. Accordingly, it is possible to stabilize the sliding mode control while continuing the control of converging an output of the plant to the control target value.

Preferably, the stability determining means performs the stability determination, based on a value ($\sigma$) of the switching function. The tendency where the absolute value of the switching function increases indicates that the control becomes unstable. Therefore, by determining such tendency based on the value of the switching function, an unstable condition of the sliding mode control can easily be detected.

The present invention provides another control system for a plant, including identifying means for identifying at least one model parameter of a controlled object model that is obtained by modeling the plant, based on an input and an output of the plant, and a sliding mode controller for controlling the plant with a sliding mode control, using the at least one model parameter identified by the identifying means. The sliding mode controller includes stability determining means for determining whether or not the sliding mode control is stable, and stabilizing means for inhibiting the use of a predetermined model parameter (b1), when the sliding mode control is determined to be unstable.

With this configuration, the use of the predetermined model parameter (b1) is inhibited, when the sliding mode control is determined to be unstable. The sliding mode control becomes unstable when the identification by the identifying means becomes unstable. Therefore, inhibiting the use of the predetermined model parameter that gives great influence to the control, makes it possible to stabilize the sliding mode control while continuing the control of converging an output of the plant to the control target value.

Preferably, the plant includes a throttle valve actuating device having a throttle valve of an internal combustion engine and actuating means for actuating the throttle valve, and the sliding mode controller calculates a parameter for determining a control input to be applied to the throttle valve actuating device to make the opening of the throttle valve coincide with a target opening.

With this configuration, the control of making the opening of the throttle valve coincide with the target opening is performed with the sliding mode control. Accordingly, controllability of the throttle opening to the target opening is improved. In addition, more stable control can be accomplished by the stabilizing means.

The present invention provides another control system for a plant, including identifying means for identifying a model parameter vector of a controlled object model which is obtained by modeling the plant, based on an input and an output of the plant, and a sliding mode controller for controlling the plant using the model parameter vector identified by the identifying means. The identifying means includes identifying error calculating means for calculating an identifying error (ide) of the model parameter vector, updating vector calculating means for calculating an updating vector (d$\theta$) according to the identifying error, updating vector correcting means for correcting the updating vector so that an influence of the past value of the identifying error may decrease, model parameter vector calculating means for calculating the model parameter vector by adding the corrected updating vector to a reference vector ($\theta$base, $\theta$(0)) of the model parameter vector, and limiting means for limiting a value of at least one element (a1, a2, b1, c1) of the model parameter vector calculated by the model parameter vector calculating means, within a predetermined limit range.

With this configuration, the updating vector is calculated according to the identifying error of the model parameter vector, and corrected so that an influence of the past value of the identifying error may decrease. The corrected updating vector is added to the reference vector of the model parameter vector to calculate the model parameter vector. Further, the value of at least one element of the model parameter vector calculated by the model parameter vector calculating means is limited within the predetermined limit range. Accordingly, a drift of the model parameter(s) is prevented, and the control stability is further improved.

Preferably, the updating vector calculating means calculates the updating vector using a fixed gain algorithm. With this configuration, an amount of the calculation can be reduced.

Preferably, the updating vector correcting means corrects the updating vector by multiplying a past value of at least one element of the updating vector by a predetermined value (DELTAi, EPSi) which is greater than 0 and less than 1. With this configuration, an influence of the past value of the identifying error is reduced, and the drift of the model parameter(s) is prevented.

Preferably, the updating vector correcting means does not multiply one of an element (an element relating to the calculation of b1) of the updating vector which is relevant to the input of the plant and an element (an element relating to the calculation of c1) of the updating vector which is irrelevant to the input and the output of the plant, by the predetermined value (DELTAi, EPSi). According to this configuration, the steady-state deviation which may be caused by correcting these elements can be prevented from occurring.

Preferably, the updating vector correcting means multiplies at least one element of the reference vector ($\theta$(0)) by the predetermined value. According to this configuration, the drift of the model parameters is prevented.

Preferably, the reference vector is calculated according to a parameter (DTH) indicative of a change in a dynamic characteristic of the plant. This makes it possible to promptly converge the model parameter(s) especially when the plant includes a nonlinear element.

The present invention provides another control system for a plant, including identifying means for identifying a model parameter vector of a controlled object model which is obtained by modeling the plant, based on an input and an output of the plant, and a sliding mode controller for controlling the plant using the model parameter vector identified by the identifying means. The identifying means includes identifying error calculating means for calculating an identifying error (ide) of the model parameter vector, identifying error correcting means for correcting the identifying error in a decreasing direction, if the identifying error is in a predetermined range ($-\text{EIDNRLMT} \leq \text{ide} \leq \text{EIDNRLMT}$), model parameter vector calculating means for calculating the model parameter vector using the identifying error (idenl) corrected by the identifying error correcting means, and limiting means for limiting a value of at least one element of the model parameter vector calculated by the model parameter vector calculating means, within a predetermined limit range.

With this configuration, if the identifying error is in the predetermined range, the identifying error is corrected in a decreasing direction, and the model parameter vector is calculated using the corrected identifying error. Further, the value of at least one element of the model parameter vector is limited within the predetermined limit range. Therefore, the drift of the model parameters is prevented, to thereby improve the control stability Preferably, the limiting means limits values of a plurality of elements (a1, a2) of the model parameter vector so that the plurality of elements satisfies a predetermined relation (FIG. 18).

With this configuration, the values of a plurality of elements of the model parameter vector is limited so that the plurality of elements satisfies a predetermined relation. Accordingly, stability of the control using the model parameter vector can be improved.

Preferably, the identifying error correcting means sets the identifying error (ide) to "0", if the identifying error (ide) is in the predetermined range ($-\text{EIDNRLMT} \leq \text{ide} \leq \text{EIDNRLMT}$).

Preferably, the plant includes a throttle valve actuating device having a throttle valve of an internal combustion engine and actuating means for actuating the throttle valve, and the sliding mode controller calculates a parameter for determining a control input to be applied to the throttle valve actuating device to make the opening of the throttle valve coincide with a target opening.

With this configuration, the control to make the opening of the throttle valve coincide with the target opening is performed using model parameters identified by the identifying means. Consequently, the controllability of the throttle valve opening to the target opening can be improved, and the throttle valve opening can be controlled more stably.

Further, the present invention provides another control system for a plant, including identifying means for identifying a plurality of model parameters of a controlled object model which is obtained by modeling the plant using a predetermined reference value (THDEF), the plurality of model parameters including a model parameter (c1) which is irrelevant to an input and an output of the plant, control means for controlling the plant using the model parameters identified by the identifying means, and correcting means for correcting the predetermined reference value (THDEF) according to the model parameter (c1) which is irrelevant to an input and an output of the plant.

With this configuration, the plurality of model parameters includes a model parameter which is irrelevant to an input and an output of the plant, and the predetermined reference value is corrected according to the model parameter which is irrelevant to an input and an output of the plant. Since the reference value is corrected by the model parameter itself of the controlled object model, the present invention is applicable to any control system which employs any control method. Further, the reference value of the controlled object model, which has a direct influence on the modeling error (a difference between the characteristics of the actual plant and the characteristics of the controlled object model), can be made coincide with an actual reference value of the plant. Accordingly, the modeling error can be reduced and the control performance can be improved.

Preferably, the correcting means calculates a correction value (thdefadp) by statistically processing the model parameter (c1) which is irrelevant to an input and an output of the plant, and corrects the predetermined reference value (THDEF) with the correction value.

Preferably, the controlled object model is defined by at least one first model parameter (a1, a2) which is relevant to an output of the plant, a second model parameter (b1) which is relevant to a control input of the plant, and a third model parameter (c1) which is irrelevant to the output and the control input of the plant.

Preferably, the plant includes a throttle valve actuating device (10) having a throttle valve (3) of an internal combustion engine and actuating means (6) for actuating the throttle valve, and the control means calculates a parameter (DUT) for determining a control input to be applied to the throttle valve actuating device (10) to make the opening (TH) of the throttle valve coincide with a target opening (THR).

Preferably, the throttle valve actuating device (10) includes first energizing means (4) for energizing the throttle valve in a closing direction, and second energizing means (5) for energizing the throttle valve in an opening direction, and maintains the throttle valve at a default opening (THDEF) by means of the first and second energizing means (4, 5), when the throttle valve is not actuated by the actuating means (6). The predetermined reference value is set to the default opening (THDEF).

The present invention provides another control system for a throttle valve actuating device including a throttle valve of an internal combustion engine and actuating means for actuating the throttle valve. The control system includes identifying means for identifying at least one model parameter of a controlled object model which is obtained by modeling the throttle valve actuating device, and control means for controlling an opening of the throttle valve to a target opening according to the at least one model parameter identified by the identifying means. The identifying means includes identifying error calculating means for calculating an identifying error (ide) of the at least one model parameter, and identifying error correcting means for correcting the identifying error in a decreasing direction, if the identifying error is in a predetermined range ($-\text{EIDNRLMT} \leq \text{ide} \leq \text{EIDNRLMT}$). The identifying means calculates the at least one model parameter using the identifying error corrected by the identifying error correcting means, and the predetermined range is set according to a value (DDTHRSQA) depending on the opening (TH) of the throttle valve or the target opening (THR).

With this configuration, the identifying error is corrected in a decreasing direction, if the identifying error is in a predetermined range, and the at least one model parameter is calculated using the corrected identifying error. Accordingly, an integration of the identifying error to the at least one model parameter is suppressed, which results in preventing a drift of the model parameter and improving a control stability. Further, the predetermined range is set according to the value depending on the opening of the throttle valve or the target opening. Accordingly, a range where a degree of influence of the identifying error should be reduced, becomes so suitable that it is prevented to reduce or neglect the identifying error to be reflected to a value of the model parameter, as an unnecessary error.

Preferably, the control system further includes predicting means for calculating a predicted value (PREDTH) of a future throttle valve opening, using the at least one model parameter identified by the identifying means.

With this configuration, the predicted value of a future throttle valve opening is predicted using the at least one model parameter identified by the identifying means. Accordingly, it is possible to calculate an accurate predicted value even when the dynamic characteristics of the plant changes with time or changes due to environmental conditions.

Preferably, the control means controls the throttle valve actuating device with a sliding mode control, using the at least one model parameter identified by the identifying means. According to this configuration, the controllability of the throttle valve opening to the target opening can be improved even in the presence of a modeling error, and the throttle valve opening can be controlled more stably.

BRIEF DESCRIPTION OF DRAWINGS

FIG. 5 is a diagram showing a range for setting control gains (F, G) of the sliding mode controller;

FIGS. 6A and 6B are diagrams illustrative of a drift of model parameters;

BEST MODE FOR CARRYING OUT THE INVENTION

The present invention will be explained below with reference to the drawings.

First Embodiment

Figure 1:
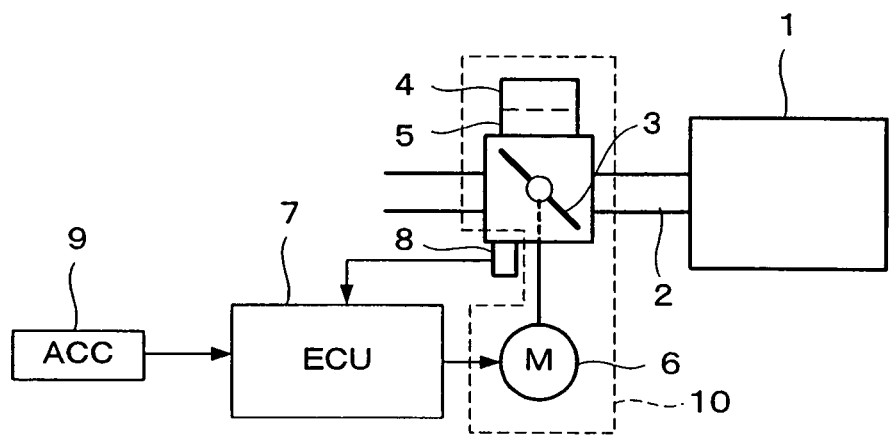
FIG. 1 is a schematic view of a throttle valve control system according to a first embodiment of the present invention.

FIG. 1 schematically shows a configuration of a throttle valve control system according to a first embodiment of the present invention. An internal combustion engine (hereinafter referred to as "engine") 1 has an intake passage 2 with a throttle valve 3 disposed therein. The throttle valve 3 is provided with a return spring 4 as a first energizing means for energizing the throttle valve 3 in a closing direction, and a resilient member 5 as a second energizing means for energizing the throttle valve 3 in an opening direction. The throttle valve 3 can be actuated by a motor 6 as an actuating means through gears (not shown). When the actuating force from the motor 6 is not applied to the throttle valve 3, an opening TH of the throttle valve 3 is maintained at a default opening THDEF (for example, 5 degrees) where the energizing force of the return spring 4 and the energizing force of the resilient member 5 are in equilibrium.

The motor 6 is connected to an electronic control unit (hereinafter referred to as "ECU") 7. The operation of the motor 6 is controlled by the ECU 7. The throttle valve 3 is associated with a throttle valve opening sensor 8 for detecting the throttle valve opening TH. A detected signal from the throttle valve opening sensor 8 is supplied to the ECU 7.

Further, the ECU 7 is connected to an acceleration sensor 9 for detecting a depression amount ACC of an accelerator pedal to detect an output demanded by the driver of the vehicle on which the engine 1 is mounted. A detected signal from the acceleration sensor 9 is supplied to the ECU 7.

The ECU 7 has an input circuit, an A/D converter, a central processing unit (CPU), a memory circuit, and an output circuit. The input circuit is supplied with detected signals from the throttle valve opening sensor 8 and the acceleration sensor 9. The A/D converter converts input signals into digital signals. The CPU carries out various process operations. The memory circuit has a ROM (read only memory) for storing processes executed by the CPU, and maps and tables that are referred to in the processes, a RAM for storing results of executing processes by the CPU. The output circuit supplies an energizing current to the motor 6. The ECU 7 determines a target opening THR of the throttle valve 3 according to the depression amount ACC of the accelerator pedal, determines a control quantity DUT for the motor 6 in order to make the detected throttle valve opening TH coincide with the target opening THR, and supplies an electric signal according to the control quantity DUT to the motor 6.

In the present embodiment, a throttle valve actuating device 10 that includes the throttle valve 3, the return spring 4, the resilient member 5, and the motor 6 is a controlled object. An input to be applied to the controlled object is a duty ratio DUT of the electric signal applied to the motor 6. An output from the controlled object is the throttle valve opening TH detected by the throttle valve opening sensor 8.

Figure 2A:
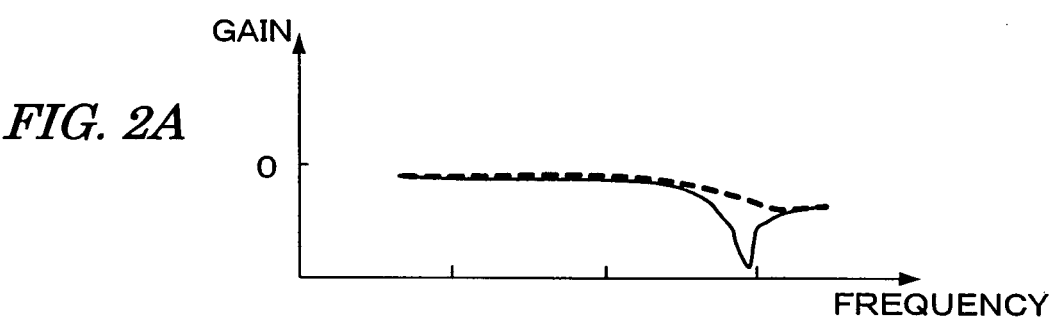
FIGS. 2A and 2B are diagrams showing frequency characteristics of the throttle valve actuating device shown in FIG. 1.
Figure 2B:
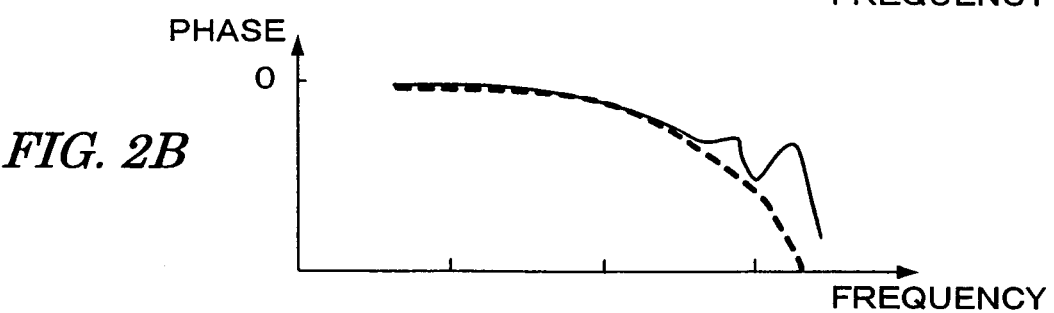

When frequency response characteristics of the throttle valve actuating device 10 are measured, gain characteristics and phase characteristics indicated by the solid lines in FIGS. 2A and 2B are obtained. A model defined by the equation (1) shown below is set as a controlled object model. Frequency response characteristics of the model are indicated by the broken-line curves in FIGS. 2A and 2B. It has been confirmed that the frequency response characteristics of the model are similar to the characteristics of the throttle valve actuating device 10.

$$DTH(k+1) = a1 \times DTH(k) + a2 \times DTH(k-1) + b1 \times DUT(k-d) + c1 \quad (1)$$

where k is a parameter representing discrete time, and DTH(k) is a throttle valve opening deviation amount defined by the equation (2) shown below. DTH(k+1) is a throttle valve opening deviation amount at a discrete time (k+1).

$$DTH(k)=TH(k)-THDEF \quad (2)$$

where TH is a detected throttle valve opening, and THDEF is the default opening.

In the equation (1), a1, a2, b1, and c1 are parameters determining the characteristics of the controlled object model, and d is a dead time. The dead time is a delay between the input and output of the controlled object model.

The model defined by the equation (1) is a DARX model (delayed autoregressive model with exogeneous input) of a discrete time system, which is employed for facilitating the application of an adaptive control.

In the equation (1), the model parameter c1 which is irrelevant to the input and output of the controlled object, in addition to the model parameters a1 and a2 which are relevant to the output deviation amount DTH and the model parameter b1 which is relevant to the input duty ratio DUT. The model parameter c1 is a parameter representing a deviation amount of the default opening THDEF and disturbance applied to the throttle valve actuating device 10. In other words, the default opening deviation amount and the disturbance can be identified by identifying the model parameter c1 simultaneously with the model parameters a1, a2, and b1 by a model parameter identifier.

Figure 3:
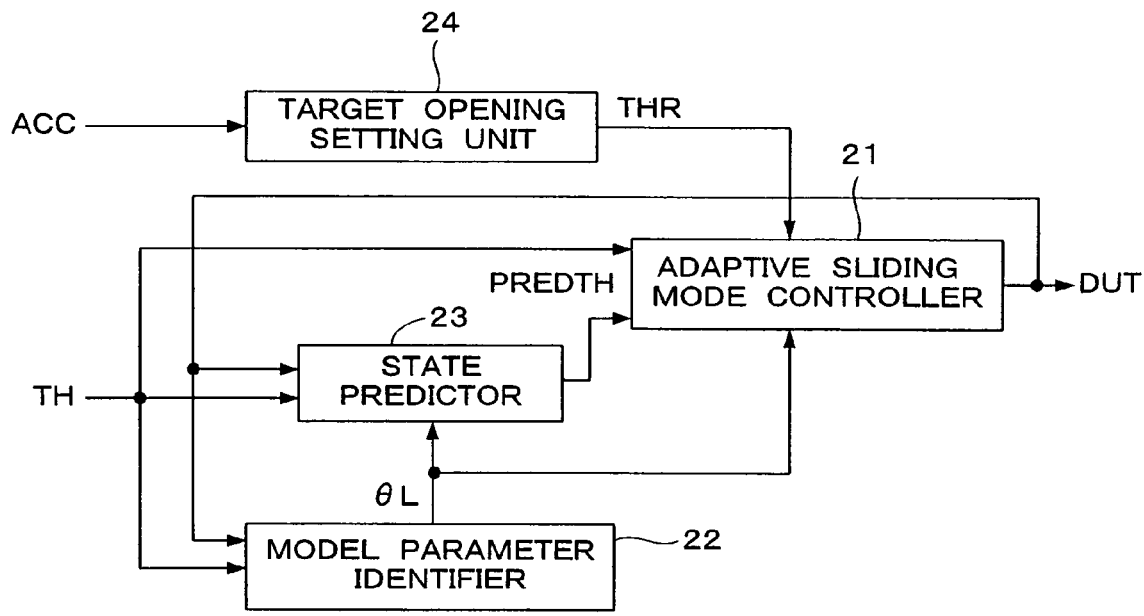
FIG. 3 is a functional block diagram showing functions realized by an electronic control unit (ECU) shown in FIG. 1.

FIG. 3 is a functional block diagram of the throttle valve control system which is realized by the ECU 7. The throttle valve control system as configured includes, an adaptive sliding mode controller 21, a model parameter identifier 22, a state predictor 23 for calculating a predicted throttle valve opening deviation amount (hereinafter referred to as "predicted deviation amount" or PREDTH(k)) where PREDTH (k) (=DTH(k+d)) after the dead time d has elapsed, and a target opening setting unit 24 for setting a target opening THR for the throttle valve 3 according to the accelerator pedal depression amount ACC.

The adaptive sliding mode controller 21 calculates a duty ratio DUT according to an adaptive sliding mode control in order to make the detected throttle valve opening TH coincide with the target opening THR, and outputs the calculated duty ratio DUT.

By using the adaptive sliding mode controller 21, it is possible to change the response characteristics of the throttle valve opening TH to the target opening THR, using a specific parameter (VPOLE). As a result, it is possible to avoid shocks at the time the throttle valve 3 moves from an open position to a fully closed position, i.e., at the time the throttle valve 3 collides with a stopper for stopping the throttle valve 3 in the fully closed position. It is also possible to make the engine response corresponding to the operation of the accelerator pedal variable. Further, it is also possible to obtain a good stability against errors of the model parameters.

The model parameter identifier 22 calculates a corrected model parameter vector θL ($\theta L^T$=[a1, a2, b1, c1]) and supplies the calculated corrected model parameter vector θL to the adaptive sliding mode controller 21. More specifically, the model parameter identifier 22 calculates a model parameter vector θ based on the throttle valve opening TH and the duty ratio DUT. The model parameter identifier 22 then carries out a limit process of the model parameter vector θ to calculate the corrected model parameter vector θL, and supplies the corrected model parameter vector θL to the adaptive sliding mode controller 21. In this manner, the model parameters a1, a2, and b1 which are optimum for making the throttle valve opening TH follow up the target opening THR are obtained, and also the model parameter c1 indicative of disturbance and a deviation amount of the default opening THDEF is obtained.

By using the model parameter identifier 22 for identifying the model parameters on a real-time basis, adaptation to changes in engine operating conditions, compensation for hardware characteristics variations, compensatation for power supply voltage fluctuations, and adaptation to aging-dependent changes of hardware characteristics are possible.

The state predictor 23 calculates a throttle valve opening TH (predicted value) after the dead time d has elapsed, or more specifically a predicted deviation amount PREDTH, based on the throttle valve opening TH and the duty ratio DUT, and supplies the calculated deviation amount PREDTH to the adaptive sliding mode controller 21. By using the predicted deviation amount PREDTH, the robustness of the control system against the dead time of the controlled object is ensured, and the controllability in the vicinity of the default opening THDEF where the dead time is large is improved.

Next, principles of operation of the adaptive sliding mode controller 21 will be hereinafter described.

First, a target value DTHR(k) is defined as a deviation amount between the target opening THR(k) and the default opening THDEF by the following equation (3).

$$DTHR(k)=THR(k)-THDEF \quad (3)$$

If a deviation e(k) between the throttle valve opening deviation amount DTH and the target value DTHR is defined by the following equation (4), then a switching function value σ(k) of the adaptive sliding mode controller is set by the following equation (5).

$$e(k) = DTH(k) - DTHR(k) \quad (4)$$

$$\sigma(k) = e(k) + VPOLE \times e(k-1) = \quad (5)$$
$$(DTH(k) - DTHR(k)) + VPOLE \times (DTH(k-1) - DTHR(k-1))$$

where VPOLE is a switching function setting parameter that is set to a value which is greater than −1 and less than 1.

On a phase plane defined by a vertical axis representing the deviation e(k) and a horizontal axis representing the preceding deviation e(k−1), a pair of the deviation e(k) and the preceding deviation e(k−1) satisfying the equation of "σ(k)=0" represents a straight line. The straight line is generally referred to as a switching straight line. A sliding mode control is a control contemplating the behavior of the deviation e(k) on the switching straight line. The sliding mode control is carried out so that the switching function value σ(k) becomes 0, i.e., the pair of the deviation e(k) and the preceding deviation e(k−1) exists on the switching straight line on the phase plane, to thereby achieve a robust control against disturbance and the modeling error (the difference between the characteristics of an actual plant and the characteristics of a controlled object model). As a result, the throttle valve opening deviation amount DTH is controlled with good robustness to follow up the target value DTHR.

Figure 4:
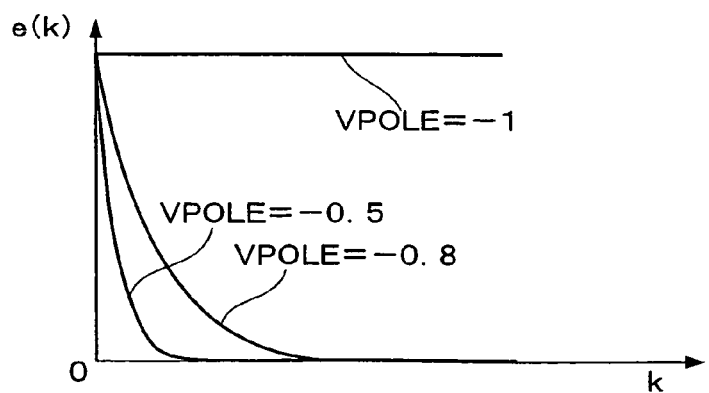
FIG. 4 is a diagram showing the relationship between control characteristics of a sliding mode controller and the value of a switching function setting parameter (VPOLE)

As shown in FIG. 4, by changing the value of the switching function setting parameter VPOLE in the equation (5), it is possible to change damping characteristics of the deviation e(k), i.e., the follow-up characteristics of the throttle valve opening deviation amount DTH to follow the target value DTHR. Specifically, if VPOLE equals −1, then the throttle valve opening deviation amount DTH completely fails to follow up the target value DTHR. As the absolute value of the switching function setting parameter VPOLE is reduced, the speed at which the throttle valve opening deviation amount DTH follows up the target value DTHR increases.

The throttle valve control system is required to satisfy the following requirements A1 and A2:

A1) When the throttle valve 3 is shifted to the fully closed position, collision of the throttle valve 3 with the stopper for stopping the throttle valve 3 in the fully closed position should be avoided; and A2) The controllability with respect to the nonlinear characteristics in the vicinity of the default opening THDEF (a change in the resiliency characteristics due to the equilibrium between the energizing force of the return spring 4 and the energizing force of the resilient member 5, backlash of gears interposed between the motor 6 and the throttle valve 3, and a dead zone where the throttle valve opening does not change even when the duty ratio DUT changes) should be improved.

Therefore, it is necessary to lower the speed at which the deviation e(k) converges, i.e., the converging speed of the deviation e(k), in the vicinity of the fully closed position of the throttle valve, and to increase the converging speed of the deviation e(k) in the vicinity of the default opening THDEF.

According to the sliding mode control, the converging speed of e(k) can easily be changed by changing the switching function setting parameter VPOLE. Therefore in the present embodiment, the switching function setting parameter VPOLE is set according to the throttle valve opening TH and an amount of change DDTHR (=DTHR(k)−DTHR(k−1)) of the target value DTHR, to thereby satisfy the requirements A1 and A2.

As described above, according to the sliding mode control, the deviation e(k) is converged to 0 at an indicated converging speed and robustly against disturbance and the modeling error by constraining the pair of the deviation e(k) and the preceding deviation e(k−1) on the switching straight line (the pair of e(k) and e(k−1) will be hereinafter referred to as "deviation state quantity"). Therefore, in the sliding mode control, it is important how to place the deviation state quantity onto the switching straight line and constrain the deviation state quantity on the switching straight line.

From the above standpoint, an input DUT(k) (also indicated as Usl(k)) to the controlled object (an output of the controller) is expressed as the sum of an equivalent control input Ueq(k), a reaching law input Urch(k), and an adaptive law input Uadp(k), as indicated by the following equation (6).

$$DUT(k) = Usl(k) \qquad (6)$$
$$= Ueq(k) + Urch(k) + Uadp(k)$$

The equivalent control input Ueq(k) is an input for constraining the deviation state quantity on the switching straight line. The reaching law input Urch(k) is an input for placing deviation state quantity onto the switching straight line. The adaptive law input Uadp(k) is an input for placing deviation state quantity onto the switching straight line while reducing the modeling error and the effect of disturbance. Methods of calculating these inputs Ueq(k), Urch(k), and Uadp(k) will be described below.

Since the equivalent control input Ueq(k) is an input for constraining the deviation state quantity on the switching straight line, a condition to be satisfied is given by the following equation (7):

$$\sigma(k)=\sigma(k+1) \qquad (7)$$

Using the equations (1), (4), and (5), the duty ratio DUT(k) satisfying the equation (7) is determined by the equation (9) shown below. The duty ratio DUT(k) calculated with the equation (9) represents the equivalent control input Ueq(k). The reaching law input Urch(k) and the adaptive law input Uadp(k) are defined by the respective equations (10) and (11) shown below.

$$DUT(k) = \frac{1}{b1}\{(1 - a1 - VPOLE)DTH(k + d) + \qquad (9)$$
$$(VPOLE - a2)DTH(k + d - 1) - c1 +$$
$$DTHR(k + d + 1) + (VPOLE - 1)DTHR(k + d) -$$
$$VPOLE \times DTHR(k + d - 1)\} = Ueq(k)$$

$$Urch(k) = \frac{-F}{b1}\sigma(k + d) \qquad (10)$$

$$Uadp(k) = \frac{-G}{b1}\sum_{i=0}^{k+d} \Delta T\sigma(i) \qquad (11)$$

where F and G respectively represent a reaching law control gain and an adaptive law control gain, which are set as described below, and ΔT represents a control period.

Calculating the equation (9) requires a throttle valve opening deviation amount DTH(k+d) after the elapse of the dead time d and a corresponding target value DTHR(k+d+1). Therefore, the predicted deviation amount PREDTH(k) calculated by the state predictor 23 is used as the throttle valve opening deviation amount DTH(k+d) after the elapse of the dead time d, and the latest target value DTHR is used as the target value DTHR(k+d+1).

Next, the reaching law control gain F and the adaptive law control gain G are determined so that the deviation state quantity can stably be placed onto the switching straight line by the reaching law input Urch and the adaptive law input Uadp.

Specifically, a disturbance V(k) is assumed, and a stability condition for keeping the switching function value σ(k) stable against the disturbance V(k) are determined to obtain a condition for setting the gains F and G. As a result, it has been obtained as the stability condition that the combination of the gains F and G satisfies the following equations (12) through (14), in other words, the combination of the gains F and G should be located in a hatched region shown in FIG. 5.

$$F>0 \qquad (12)$$

$$G>0 \qquad (13)$$

$$F<2-(\Delta T/2)G \qquad (14)$$

As described above, the equivalent control input Ueq(k), the reaching law input Urch(k), and the adaptive law input Uadp(k) are calculated from the equations (9) through (11), and the duty ratio DUT(k) is calculated as the sum of those inputs.

The model parameter identifier 22 calculates a model parameter vector of the controlled object model, based on the input (DUT(k)) and output (TH(k)) of the controlled object, as described above. Specifically, the model parameter identifier 22 calculates a model parameter vector θ(k) according to a sequential identifying algorithm (generalized sequential method-of-least-squares algorithm) represented by the following equation (15).

$$\theta(k)=\theta(k-1)+KP(k)ide(k) \qquad (15)$$

$$\theta(k)^T=[a1', a2', b1', c1'] \qquad (16)$$

where a1', a2', b1ζ, c1' represent model parameters before a limit process described later is carried out, ide(k) represents an identifying error defined by the equations (17), (18), and (19) shown below, where DTHHAT(k) represents an estimated value of the throttle valve opening deviation amount DTH(k) (hereinafter referred to as "estimated throttle valve opening deviation amount") which is calculated using the latest model parameter vector θ(k−1), and KP(k) represents a gain coefficient vector defined by the equation (20) shown below. In the equation (20), P(k) represents a quartic square matrix calculated from the equation (21) shown below.

$$i\ d\ e(k) = DTH(k) - DTHHAT(k) \qquad (17)$$

$$DTHHAT(k) = \theta(k - 1)^T \zeta(k) \qquad (18)$$

$$\zeta(k)^T = [DTH(k - 1), DTH(k - 2), DUT(k - d - 1), 1] \qquad (19)$$

$$KP(k) = \frac{P\zeta(k)}{1 + \zeta^T(k)P(k)\zeta(k)} \qquad (20)$$

$$P(k + 1) = \frac{1}{\lambda_1}\left(I - \frac{\lambda_2 P(k)\zeta(k)\zeta^T(k)}{\lambda_1 + \lambda_2\zeta^T(k)P(k)\zeta(k)}\right)P(k) \qquad (21)$$

(I: Identity Matrix)

In accordance with the setting of coefficients λ1 and λ2 in the equation (21), the identifying algorithm from the equations (15) through (21) becomes one of the following four identifying algorithm:

| | |
|---|---|
| λ1 = 1, λ2 = 0 | Fixed gain algorithm |
| λ1 = 1, λ2 = 1 | Method-of-least-squares algorithm |
| λ1 = 1, λ2 = λ | Degressive gain algorithm |
| | (λ is a given value other than 0, 1) |

-continued

| | |
|---|---|
| $\lambda1 = \lambda, \lambda2 = 1$ | Weighted Method-of-least-squares algorithm ($\lambda$ is a given value other than 0, 1) |

In the present embodiment, it is required that the following requirements B1, B2, and B3 are satisfied:

B1) Adaptation to quasi-static dynamic characteristics changes and hardware characteristics variations "Quasi-static dynamic characteristics changes" mean slow-rate characteristics changes such as power supply voltage fluctuations or hardware degradations due to aging.

B2) Adaptation to high-rate dynamic characteristics changes

Specifically, this means adaptation to dynamic characteristics changes depending on changes in the throttle valve opening TH.

B3) Prevention of a drift of model parameters

The drift, which is an excessive increase of the absolute values of model parameters, should be prevented. The drift of model parameters is caused by the effect of the identifying error, which should not be reflected to the model parameters, due to nonlinear characteristics of the controlled object.

In order to satisfy the requirements B1 and B2, the coefficients $\lambda1$ and $\lambda2$ are set respectively to a given value $\lambda$ and "0" so that the weighted Method-of-least-squares algorithm is employed.

Next, the drift of model parameters will be described below. As shown in FIG. 6A and FIG. 6B, if a residual identifying error, which is caused by nonlinear characteristics such as friction characteristics of the throttle valve, exists after the model parameters have been converged to a certain extent, or if a disturbance whose average value is not zero is steadily applied, then residual identifying errors are accumulated, causing a drift of model parameters.

Figure 7A:
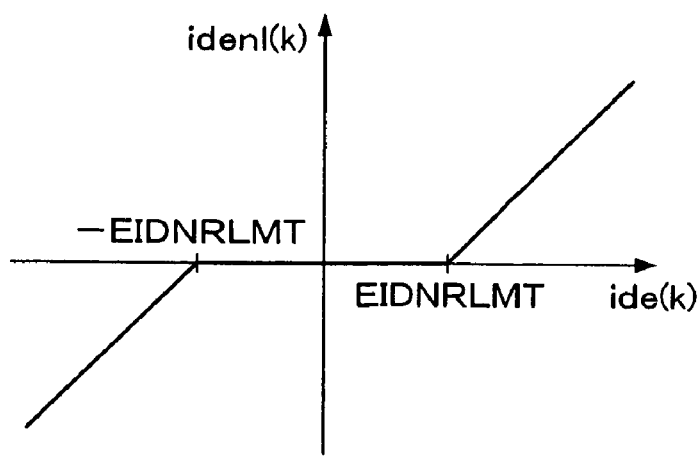
FIGS. 7A through 7C are diagrams showing functions for correcting an identifying error.

Since such a residual identifying error should not be reflected to the values of model parameters, a dead zone process is carried out using a dead zone function Fn1 as shown in FIG. 7A. Specifically, a corrected identifying error idenl(k) is calculated from the following equation (23), and a model parameter vector $\theta(k)$ is calculated using the corrected identifying error idenl(k). That is, the following equation (15a) is used instead of the above equation (15). In this manner, the requirement B3) can be satisfied.

$$idenl(k) = Fnl(ide(k)) \qquad (23)$$

$$\theta(k) = \theta(k-1) + KP(k)idenl(k) \qquad (15a)$$

Figure 7B:
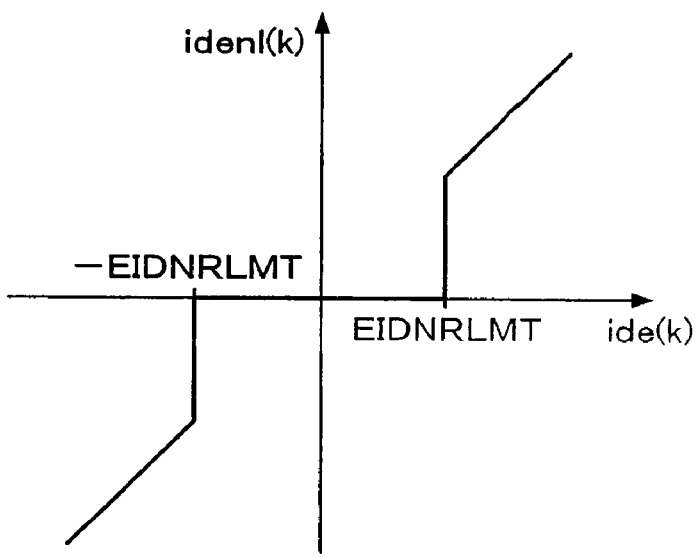
Figure 7C:
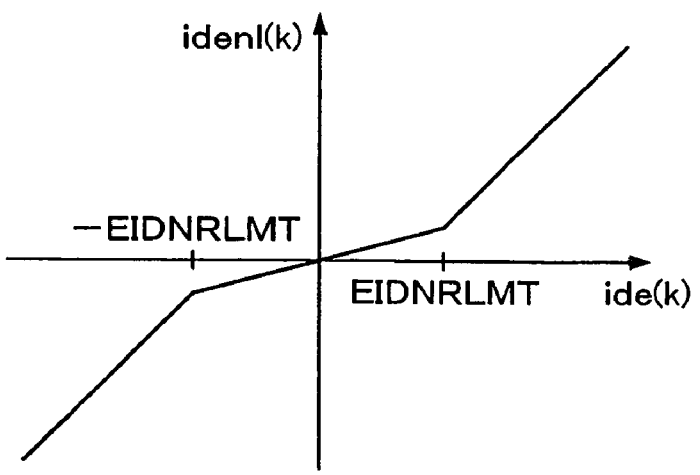

The dead zone function Fn1 is not limited to the function shown in FIG. 7A. A discontinuous dead zone function as shown in FIG. 7B or an incomplete dead zone function as shown in FIG. 7C may be used as the dead zone function Fn1. However, it is impossible to completely prevent the drift if the incomplete dead zone function is used.

The amplitude of the residual identifying error changes according to an amount of change in the throttle valve opening TH. In the present embodiment, a dead zone width parameter EIDNRLMT which defines the width of the dead zone shown in FIGS. 7A through 7C is set according to the square average value DDTHRSQA of an amount of change in the target throttle valve opening THR. Specifically, the dead zone width parameter EIDNRLMT is set such that it increases as the square average value DDTHRSQA increases. According to such setting of the dead zone width parameter EIDNRLMT, it is prevented to neglect an identifying error to be reflected to the values of the model parameters as the residual identifying error. In the following equation (24), DDTHR represents an amount of change in the target throttle valve opening THR, which is calculated from the following equation (25):

$$DDTHRSQA(k) = \frac{1}{n+1}\sum_{i=0}^{n} DDTHR(i)^2 \qquad (24)$$

$$DDTHR(k) = DTHR(k) - DTHR(k-1) \qquad (25)$$
$$= THR(k) - THR(k-1)$$

Since the throttle valve opening deviation amount DTH is controlled to the target value DTHR by the adaptive sliding mode controller 21, the target value DTHR in the equation (25) may be changed to the throttle valve opening deviation amount DTH. In this case, an amount of change DDTH in the throttle valve opening deviation amount DTH may be calculated, and the dead zone width parameter EIDNRLMT may be set according to the square average value DDTHRSQA obtained by replacing DDTHR in the equation (24) with DDTH.

For further improving the robustness of the control system, it is effective to further stabilize the adaptive sliding mode controller 21. In the present embodiment, the elements a1', a2', b1', and c1' of the model parameter vector $\theta(k)$ calculated from the equation (15) are subjected to the limit process so that a corrected model parameter vector $\theta L(k)$ ($\theta L(k)^T = [a1, a2, b1, c1]$) is calculated. The adaptive sliding mode controller 21 performs a sliding mode control using the corrected model parameter vector $\theta L(k)$. The limit process will be described later in detail referring to the flowcharts.

Next, a method for calculating the predicted deviation amount PREDTH in the state predictor 23 will be described below.

First, matrixes A, B and vectors X(k), U(k) are defined according to the following equations (26) through (29).

$$A = \begin{bmatrix} a1 & a2 \\ 1 & 0 \end{bmatrix} \qquad (26)$$

$$B = \begin{bmatrix} b1 & c1 \\ 0 & 0 \end{bmatrix} \qquad (27)$$

$$X(k) = \begin{bmatrix} DTH(k) \\ DTH(k-1) \end{bmatrix} \qquad (28)$$

$$U(k) = \begin{bmatrix} DUT(k) \\ 1 \end{bmatrix} \qquad (29)$$

By rewriting the equation (1) which defines the controlled object model, using the matrixes A, B and the vectors X(k), U(k), the following equation (30) is obtained.

$$X(k+1) = AX(k) + BU(k-d) \qquad (30)$$

Determining X(k+d) from the equation (30), the following equation (31) is obtained.

$$X(k+d) = A^d X(k) + [A^{d-1} B \; A^{d-2} B \; \cdots \; AB \; B] \begin{bmatrix} U(k-1) \\ U(k-2) \\ \vdots \\ U(k-d) \end{bmatrix} \quad (31)$$

If matrixes A' and B' are defined by the following equations (32), (33), using the model parameters a1', a2', b1', and c1' which are not subjected to the limit process, a predicted vector XHAT(k+d) is given by the following equation (34).

$$A' = \begin{bmatrix} a1' & a2' \\ 1 & 0 \end{bmatrix} \quad (32)$$

$$B' = \begin{bmatrix} b1' & c2' \\ 0 & 0 \end{bmatrix} \quad (33)$$

$$XHAT(k+d) = A'^d X(k) + [A'^{d-1} B' \; A'^{d-2} \; \cdots \; A'B' \; B'] \begin{bmatrix} U(k-1) \\ U(k-2) \\ \vdots \\ U(k-d) \end{bmatrix} \quad (34)$$

The first-row element DTHHAT(k+d) of the predicted vector XHAT(k+d) corresponds to the predicted deviation amount PREDTH(k), and is given by the following equation (35).

$$PREDTH(k) = DTHHAT(k+d) = \quad (35)$$
$$\alpha1 \times DTH(k) + \alpha2 \times DTH(k-1) + \beta1 \times DUT(k-1) +$$
$$\beta2 \times DUT(k-2) + \cdots + \beta d \times DUT(k-d) + \gamma1 + \gamma2 + \cdots + \gamma d$$

where $\alpha1$ represents a first-row, first-column element of the matrix $A'^d$, $\alpha2$ represents a first-row, second-column element of the matrix $A'^d$, $\beta i$ represents a first-row, first-column element of the matrix $A'^{d-i}B'$, and $\gamma i$ represents a first-row, second-column element of the matrix $A'^{d-i}B'$.

By applying the predicted deviation amount PREDTH(k) calculated from the equation (35) to the equation (9), and replacing the target values DTHR(k+d+1), DTHR(k+d), and DTHR(k+d-1) respectively with DTHR(k), DTHR(k-1), and DTHR(k-2), the following equation (9a) is obtained. From the equation (9a), the equivalent control input Ueq(k) is calculated.

$$DUT(k) = \quad (9a)$$
$$\frac{1}{b1}\{(1 - a1 - VPOLE)PREDTH(k) + (VPOLE - a2)PREDTH$$
$$(k-1) - c1 + DTHR(k) + (VPOLE - 1)DTHR(k-1) -$$
$$VPOLE \times DTHR(k-2)\} = Ueq(k)$$

Using the predicted deviation amount PREDTH(k) calculated from the equation (35), a predicted switching function value σpre(k) is defined by the following equation (36). The reaching law input Urch(k) and the adaptive law input Uadp(k) are calculated respectively from the following equations (10a) and (11a).

$$\sigma pre(k) = (PREDTH(k) - DTHR(k-1)) + \quad (36)$$
$$VPOLE(PREDTH(k-1) - DTHR(k-2))$$

$$Urch(k) = \frac{-F}{b1} \sigma pre(k) \quad (10a)$$

$$Uadp(k) = \frac{-G}{b1} \sum_{i=0}^{k} \Delta T \sigma pre(i) \quad (11a)$$

Figure 8:
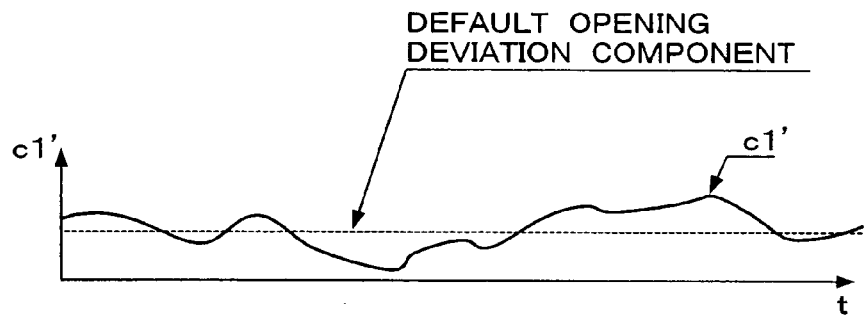
FIG. 8 is a diagram illustrating that a default opening deviation of a throttle valve is reflected to a model parameter (c1')

The model parameter c1' is a parameter representing a deviation of the default opening THDEF and disturbance. Therefore, as shown in FIG. 8, the model parameter c1' changes with disturbance, but can be regarded as substantially constant in a relatively short period. In the present embodiment, the model parameter c1' is statistically processed, and the central value of its variations is calculated as a default opening deviation thdefadp. The default opening deviation thdefadp is used for calculating the throttle valve opening deviation amount DTH and the target value DTHR.

Generally, the method of least squares is known as a method of the statistic process. In the statistic process according to the method of least squares, all data, i.e., all identified parameters c1', obtained in a certain period are stored in a memory and the stored data is subjected to a batch calculation of the statistic process at a certain timing. However, the batch calculation requires a memory having a large storage capacity for storing all data, and an increased amount of calculations are necessary because inverse matrix calculations are required.

Therefore, according to the present embodiment, the sequential method-of-least-squares algorithm for adaptive control which is indicated by the equations (15) through (21) is applied to the statistic process, and the central value of the least squares of the model parameter c1 is calculated as the default opening deviation thdefadp.

Specifically, in the equations (15) through (21), by replacing $\theta(k)$ and $\theta(k)^T$ with thdefadp, replacing $\zeta(k)$ and $\zeta(k)^T$ with "1", replacing ide(k) with ec1(k), replacing KP(k) with KPTH(k), replacing P(k) with PTH(k), and replacing $\lambda 1$ and $\lambda 2$ respectively with $\lambda 1'$ and $\lambda 2'$, the following equations (37) through (40) are obtained.

$$thdefadp(k+1) = thdefadp(k) + KPTH(k)ec1(k) \quad (37)$$

$$KPTH(k) = \frac{PTH(k)}{1 + PTH(k)} \quad (38)$$

$$PTH(k+1) = \frac{1}{\lambda_1'}\left(1 - \frac{\lambda_2' PTH(k)}{\lambda_1' + \lambda_2' PTH(k)}\right) PTH(k) \quad (39)$$

$$ec1(k) = c1'(k) - thdefadp(k) \quad (40)$$

One of the four algorithms described above can be selected according to the setting of the coefficients $\lambda 1'$ and $\lambda 2'$. In the equation (39), the coefficient $\lambda 1'$ is set to a given value other than 0 or 1, and the coefficient $\lambda 2'$ is set to 1, thus employing the weighted method of least squares.

For the calculations of the equations (37) through (40), the values to be stored are thdefadp(k+1) and PTh(k+1) only, and no inverse matrix calculations are required. Therefore, by employing the sequential method-of-least-squares algorithm, the model parameter c1 can be statistically processed according to the method of least squares while overcoming the shortcomings of a general method of least squares.

The default opening deviation thdefadp obtained as a result of the statistic process is applied to the equations (2) and (3), and the throttle valve opening deviation amount DTH(k) and the target value DTHR(k) are calculated from the following equations (41) and (42) instead of the equations (2) and (3).

$$DTH(k)=TH(k)-THDEF+thdefadp \quad (41)$$

$$DTHR(k)=THR(k)-THDEF+thdefadp \quad (42)$$

Using the equations (41) and (42), even when the default opening THDEF is shifted from its designed value due to characteristic variations or aging of the hardware, the shift can be compensated to perform an accurate control process.

Operation processes executed by the CPU in the ECU 7 for realizing the functions of the adaptive sliding mode controller 21, the model parameter identifier 22, and the state predictor 23 will be described below.

Figure 9:
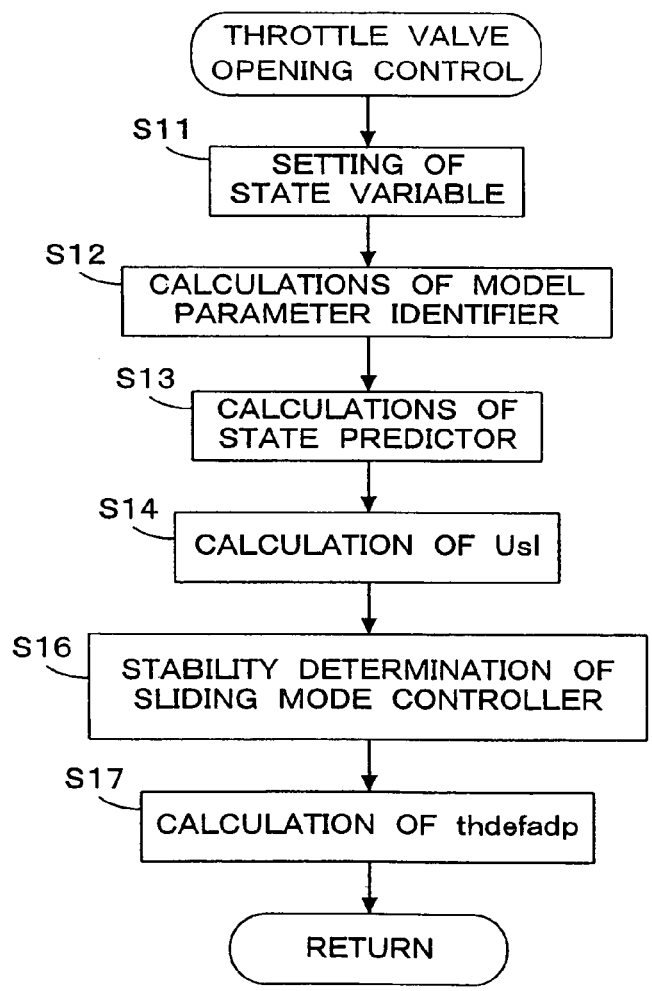
FIG. 9 is a flowchart showing a throttle valve opening control process.

FIG. 9 is a flowchart showing a process of the throttle valve opening control. The process is executed by the CPU in the ECU 7 in every predetermined period of time (e.g., 2 msec).

Figure 10:
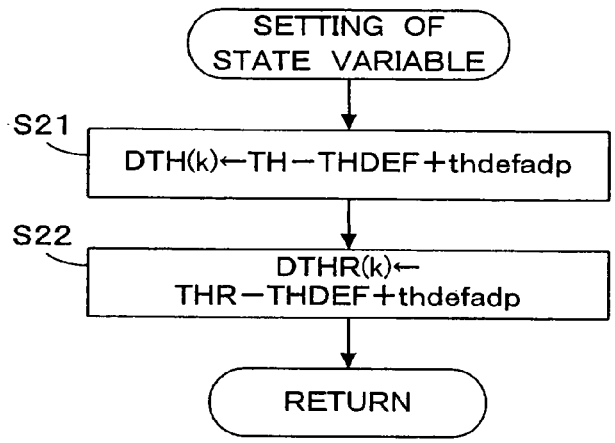
FIG. 10 is a flowchart showing a process of setting state variables in the process shown in FIG. 9.

In step S11, a process of setting a state variable shown in FIG. 10 is performed. Calculations of the equations (41) and (42) are executed to determine the throttle valve opening deviation amount DTH(k) and the target value DTHR(k) (steps S21 and S22 in FIG. 10). The symbol (k) representing a current value may sometimes be omitted as shown in FIG. 10.

Figure 11:
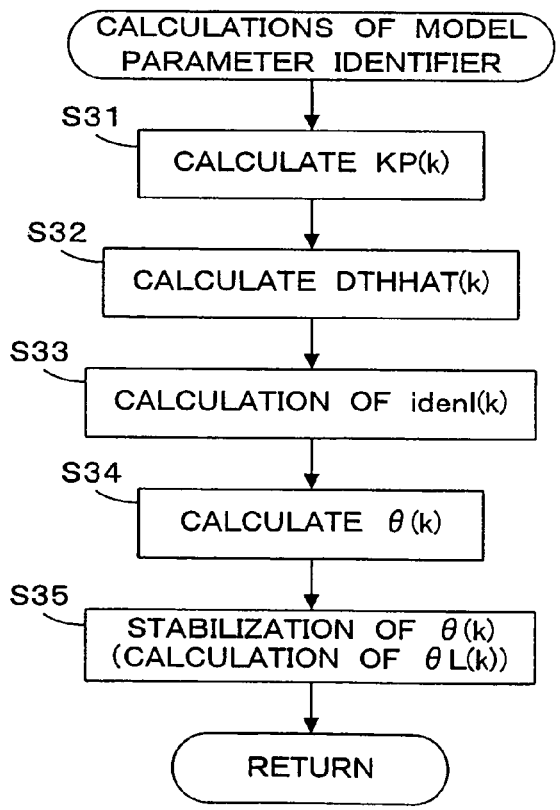
FIG. 11 is a flowchart showing a process of performing calculations of a model parameter identifier in the process shown in FIG. 9.

In step S12, a process of performing calculations of the model parameter identifier as shown in FIG. 11, i.e., a process of calculating the model parameter vector θ(k) from the equation (15a), is carried out. Further, the model parameter vector θ(k) is subjected to the limit process so that the corrected model parameter vector θL(k) is calculated.

Figure 21:
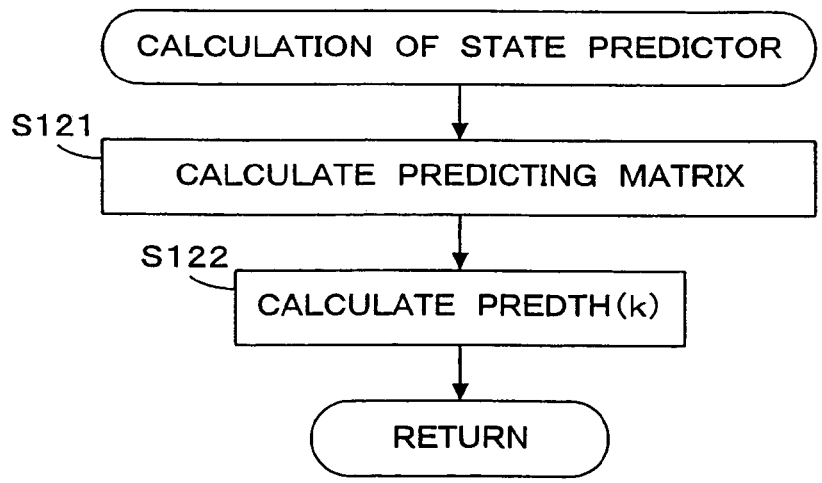
FIG. 21 is a flowchart showing a process of performing calculations of a state predictor in the process shown in FIG. 9.

In step S13, a process of performing calculations of the state predictor as shown in FIG. 21 is carried out to calculate the predicted deviation amount PREDTH(k).

Figure 22:
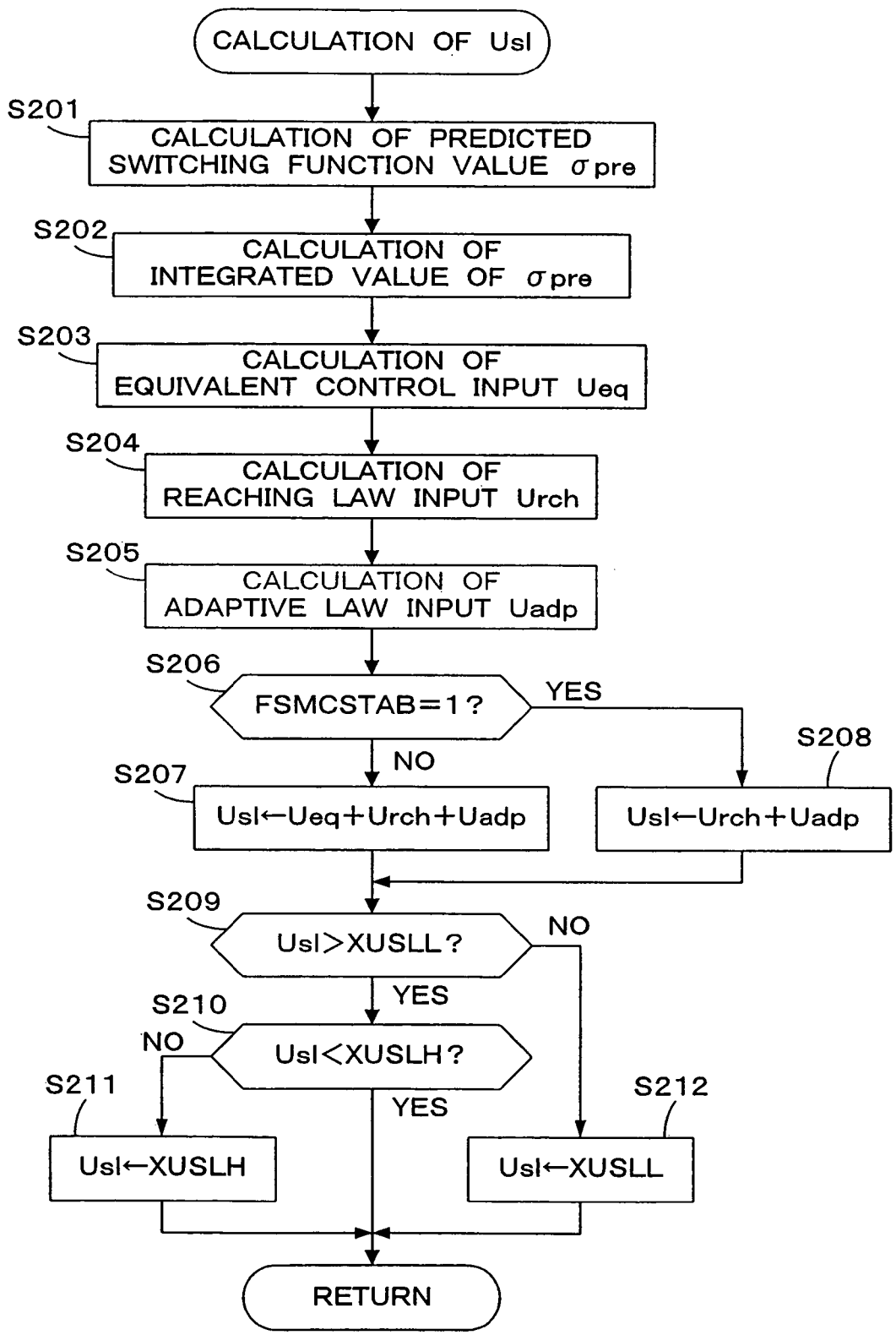
FIG. 22 is a flowchart showing a process of calculating a control input (Usl) in the process shown in FIG. 9.

Next, using the corrected model parameter vector θL(k) calculated in step S12, a process of calculating the control input Usl(k) as shown in FIG. 22 is carried out in step S14. Specifically, the equivalent control input Ueq, the reaching law input Urch(k), and the adaptive law input Uadp(k) are calculated, and the control input Usl(k) (=duty ratio DUT (k)) is calculated as a sum of these inputs Ueq(k), Urch(k), and Uadp(k).

Figure 29:
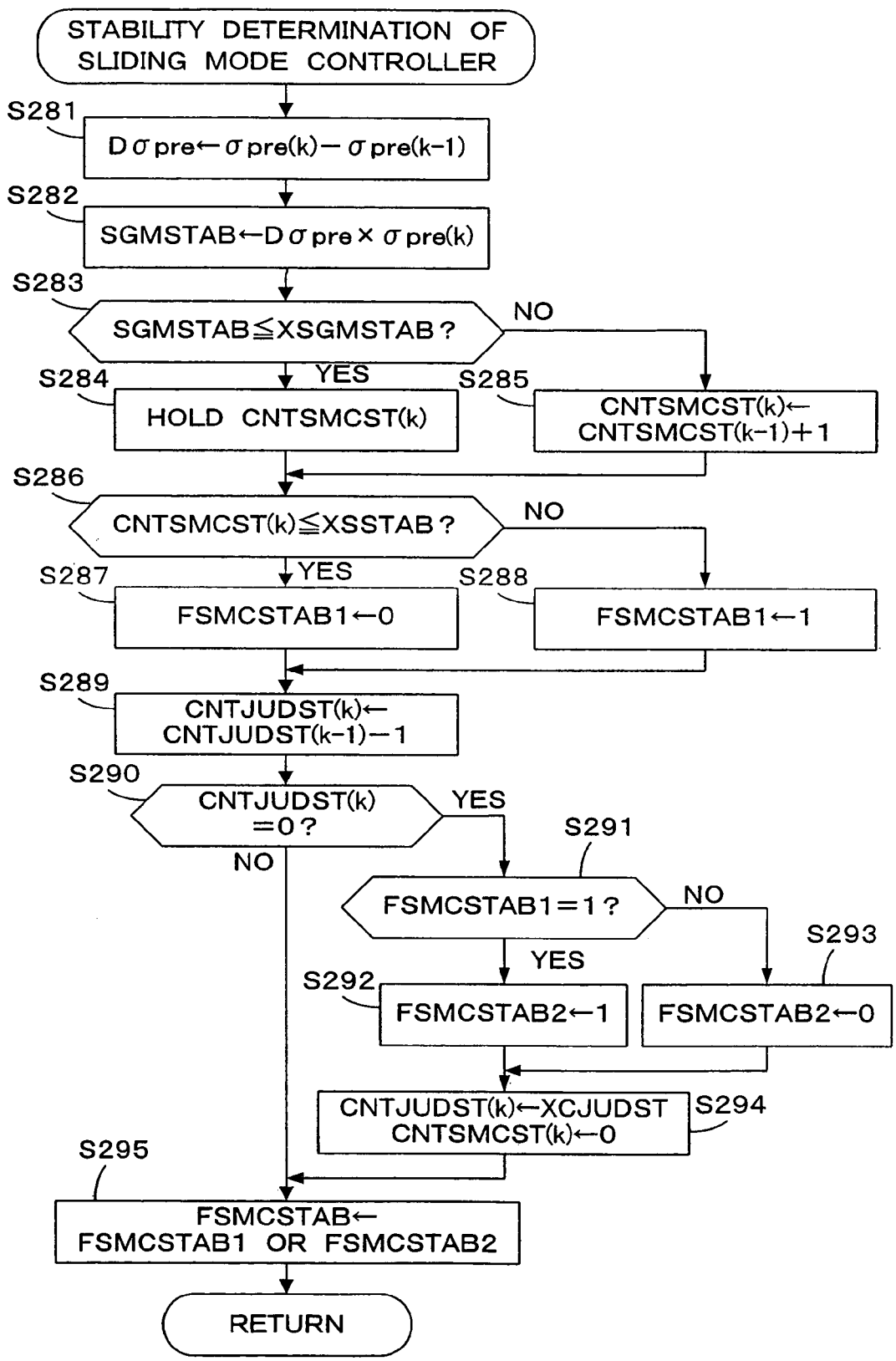
FIG. 29 is a flowchart showing a process of determining the stability of the sliding mode controller in the process shown in FIG. 9.

In step S16, a process of stability determination of the sliding mode controller as shown in FIG. 29 is carried out. Specifically, the stability is determined based on a differential value of the Lyapunov function, and a stability determination flag FSMCSTAB is set. When the stability determination flag FSMCSTAB is set to "1", this indicates that the adaptive sliding mode controller 21 is unstable.

If the stability determination flag FSMCSTAB is set to "1", indicating that the adaptive sliding mode controller 21 is unstable, the switching function setting parameter VPOLE is set to a predetermined stabilizing value XPOLESTB (see steps S231 and S232 in FIG. 24), and the equivalent control input Ueq is set to "0". That is, the control process by the adaptive sliding mode controller 21 is switched to a control process based on only the reaching law input Urch and the adaptive law input Uadp, to thereby stabilize the control (see steps S206 and S208 in FIG. 22).

Further, when the adaptive sliding mode controller 21 has become unstable, the equations for calculating the reaching law input Urch and the adaptive law input Uadp are changed. Specifically, the values of the reaching law control gain F and the adaptive law control gain G are changed to values for stabilizing the adaptive sliding mode controller 21, and the reaching law input Urch and the adaptive law input Uadp are calculated without using the model parameter b1 (see FIGS. 27 and 28). According to the above stabilizing process, it is possible to quickly terminate the unstable state of the adaptive sliding mode controller 21, and to bring the adaptive sliding mode controller 21 back to its stable state.

Figure 30:
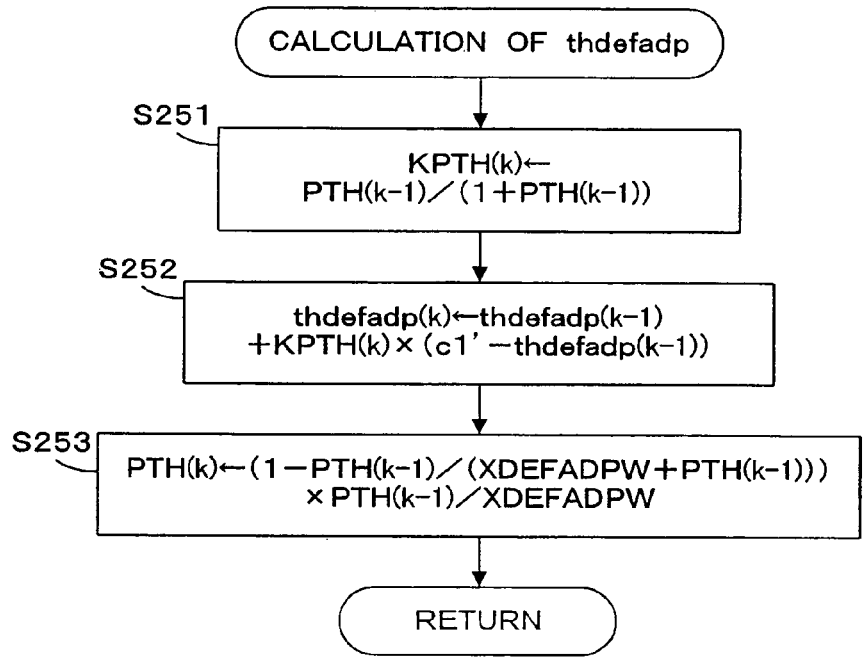
FIG. 30 is a flowchart showing a process of calculating a default opening deviation (thdefadp) in the process shown in FIG. 9.

In step S17, a process of calculating the default opening deviation thdefadp as shown in FIG. 30 is performed to calculate the default opening deviation thdefadp.

FIG. 11 is a flowchart showing a process of performing calculations of the model parameter identifier 22.

Figure 12:
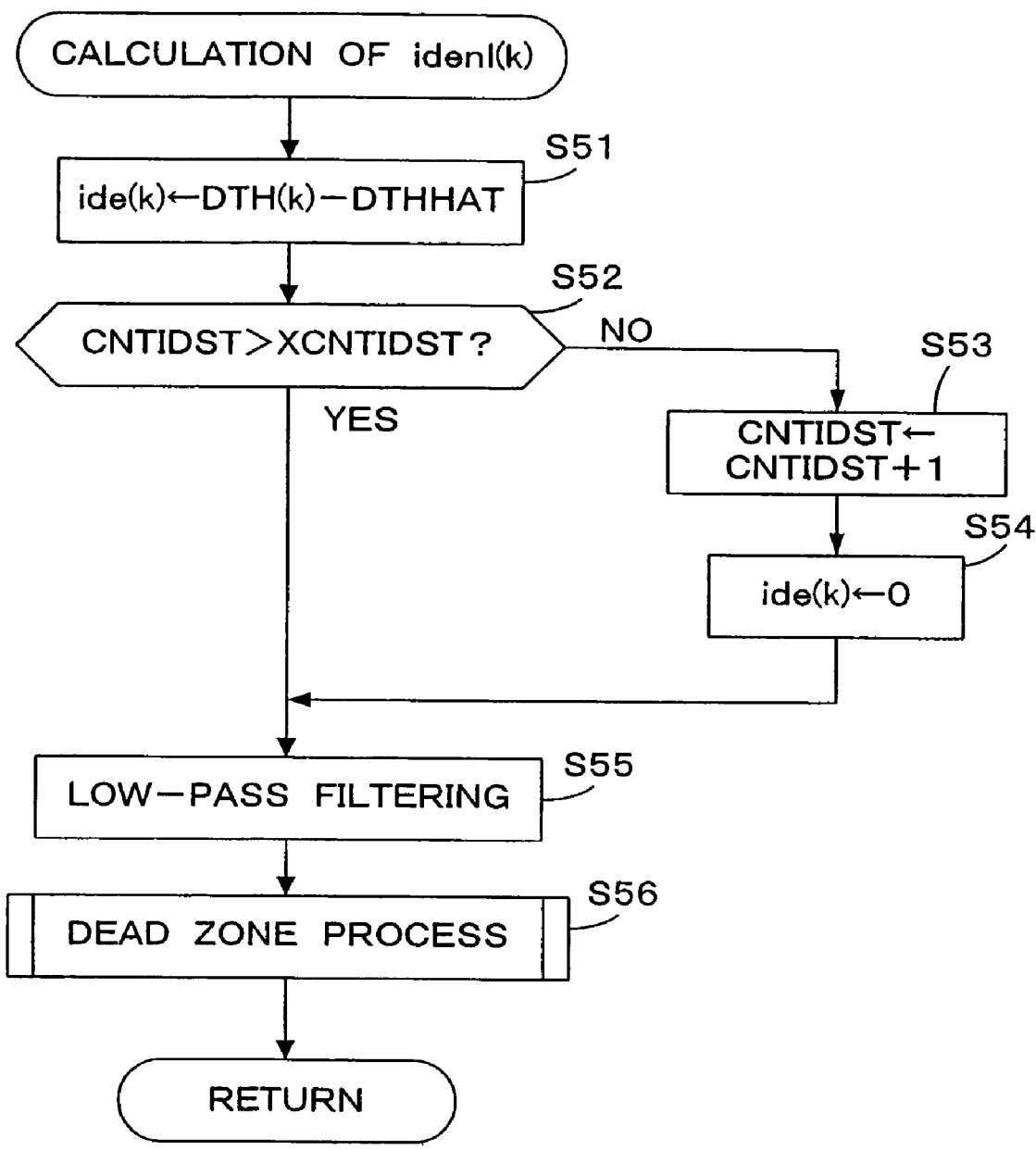
FIG. 12 is a flowchart showing a process of calculating an identifying error (ide) in the process shown in FIG. 11.

In step S31, the gain coefficient vector KP(k) is calculated from the equation (20). Then, the estimated throttle valve opening deviation amount DTHHAT(k) is calculated from the equation (18) in step S32. In step S33, a process of calculating the identifying error idenl(k) as shown in FIG. 12 is carried out. The estimated throttle valve opening deviation amount DTHHAT(k) calculated in step S32 is applied to the equation (17) to calculate the identifying error ide(k). Further in step S32, the dead zone process using the function shown in FIG. 7A is carried out to calculate the corrected identifying error idenl.

In step S34, the model parameter vector θ(k) is calculated from the equation (15a). Then, the model parameter vector θ(k) is subjected to the stabilization process in step S35. That is, each of the model parameters is subjected to the limit process to calculate the corrected model parameter vector θL(k).

FIG. 12 is a flowchart showing a process of calculating the identifying error idenl(k) which is carried out in step S33 shown in FIG. 11.

In step S51, the identifying error ide(k) is calculated from the equation (17). Then, it is determined whether or not the value of a counter CNTIDST which is incremented in step S53 is greater than a predetermined value XCNTIDST that is set according to the dead time d of the controlled object (step S52). The predetermined value XCNTIDST is set, for example, to "3" according to a dead time d=2. Since the counter CNTIDST has an initial value of "0", the process first goes to step S53, in which the counter CNTIDST is incremented by "1". Then, the identifying error ide(k) is set to "0" in step S54, after which the process goes to step S55. Immediately after starting identifying the model parameter vector θ(k), no correct identifying error can be obtained by the equation (17). Therefore, the identifying error ide(k) is set to "0" according to steps S52 through S54, instead of using the calculated result of the equation (17).

If the answer to the step S52 is affirmative (YES), then the process immediately proceeds to step S55.

In step S55, the identifying error ide(k) is subjected to a low-pass filtering. Specifically, when identifying the model parameters of an controlled object which has low-pass characteristics, the identifying weight of the method-of-least-squares algorithm for the identifying error ide(k) has frequency characteristics as indicated by the solid line L1 in FIG. 13A. By the low-pass filtering of the identifying error ide(k), the frequency characteristics as indicated by the solid line L1 is changed to a frequency characteristics as indicated by the broken line L2 where the high-frequency components are attenuated. The reason for executing the low-pass filtering will be described below.

Figure 13A:
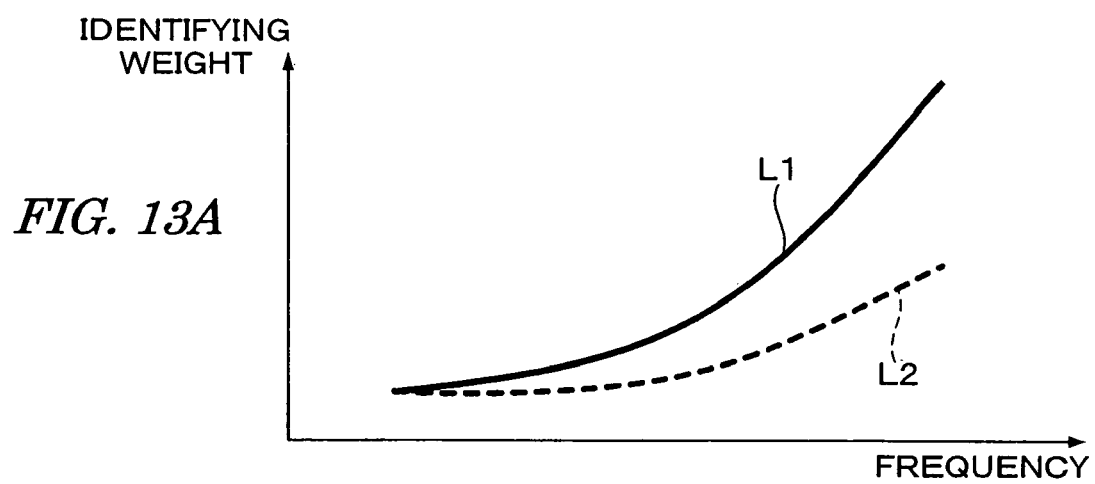
FIGS. 13A and 13B are diagrams illustrative of a process of low-pass filtering on the identifying error (ide)
Figure 13B:
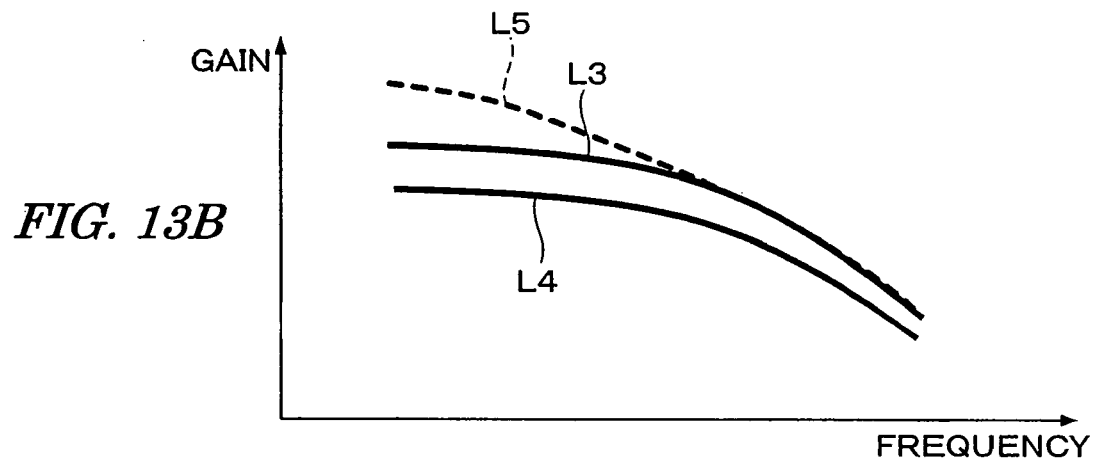

The frequency characteristics of the actual controlled object having low-pass characteristics and the controlled object model thereof are represented respectively by the solid lines L3 and L4 in FIG. 13B. Specifically, if the model parameters are identified by the model parameter identifier 22 with respect to the controlled object which has low-pass characteristics (characteristics of attenuating high-frequency components), the identified model parameters are largely affected by the high-frequency-rejection characteristics so that the gain of the controlled object model becomes lower than the actual characteristics in a low-frequency range. As a result, the sliding mode controller 21 excessively corrects the control input.

By changing the frequency characteristics of the weighting of the identifying algorithm to the characteristics indicated by the broken line L2 in FIG. 13A according to the low-pass filtering, the frequency characteristics of the controlled object are changed to frequency characteristics indicated by the broken line L5 in FIG. 13B. As a result, the frequency characteristics of the controlled object model is made to coincide with the actual frequency characteristics, or the low frequency gain of the controlled object model is corrected to a level which is slightly higher than the actual gain. Accordinly, it is possible to prevent the control input from being excessively corrected by the sliding mode controller 21, to thereby improve the robustness of the control system and further stabilize the control system.

The low-pass filtering is carried out by storing past values $ide(k-i)$ of the identifying error (e.g., 10 past values for $i=1$ through 10) in a ring buffer, multiplying the past values by weighting coefficients, and adding the products of the past values and the weighting coefficients.

Since the identifying error $ide(k)$ is calculated from the equations (17), (18), and (19), the same effect as described above can be obtained by performing the same low-pass filtering on the throttle valve opening deviation amount $DTH(k)$ and the estimated throttle valve opening deviation amount $DTHHAT(k)$, or by performing the same low-pass filtering on the throttle valve opening deviation amounts $DTH(k-1)$, $DTH(k-2)$ and the duty ratio $DUT(k-d-1)$.

Figure 14:
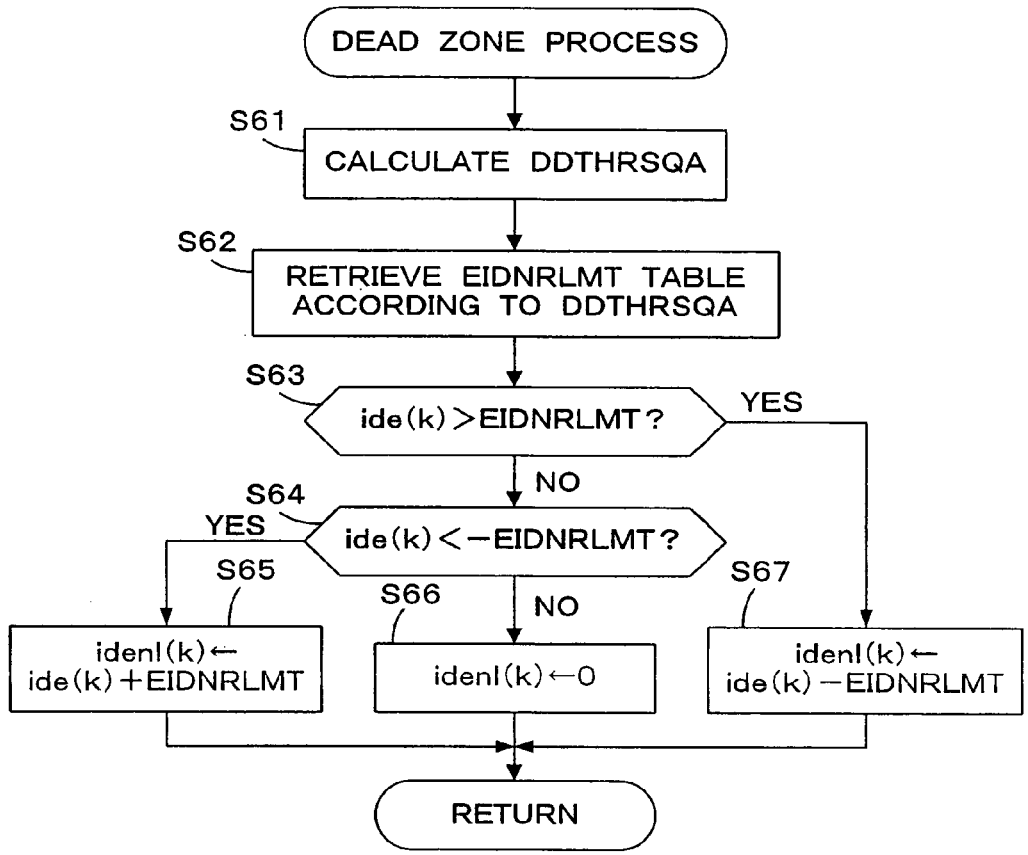
FIG. 14 is a flowchart showing the dead zone process in the process shown in FIG. 12.
Figure 15:
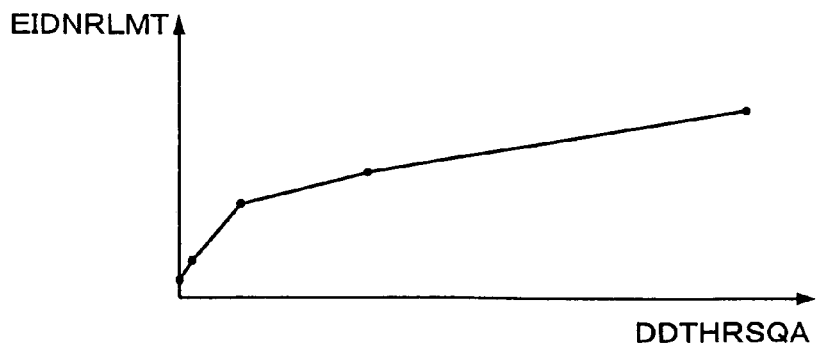
FIG. 15 is a diagram showing a table used in the process shown in FIG. 14.

Referring back to FIG. 12, the dead zone process as shown in FIG. 14 is carried out in step S56. In step S61 shown in FIG. 14, "n" in the equation (24) is set, for example, to "5" to calculate the square average value DDTHRSQA of an amount of change of the target throttle valve opening THR. Then, an EIDNRLMT table shown in FIG. 15 is retrieved according to the square average value DDTHRSQA to calculate the dead zone width parameter EIDNRLMT (step S62).

In step S63, it is determined whether or not the identifying error $ide(k)$ is greater than the dead zone width parameter EIDNRLMT. If $ide(k)$ is greater than EIDNRLMT, the corrected identifying error $idenl(k)$ is calculated from the following equation (43) in step S67.

$$idenl(k)=ide(k)-EIDNRLMT \quad (43)$$

If the answer to step S63 is negative (NO), it is determined whether or not the identifying error $ide(k)$ is greater than the negative value of the dead zone width parameter EIDNRLMT with a minus sign (step S64).

If $ide(k)$ is less than $-EIDNRLMT$, the corrected identifying error $idenl(k)$ is calculated from the following equation (44) in step S65.

$$idenl(k)=ide(k)+EIDNRLMT \quad (44)$$

If the identifying error $ide(k)$ is in the range between $+EIDNRLMT$ and $-EIDNRLMT$, the corrected identifying error $idenl(k)$ is set to "0" in step S66.

Figure 16:
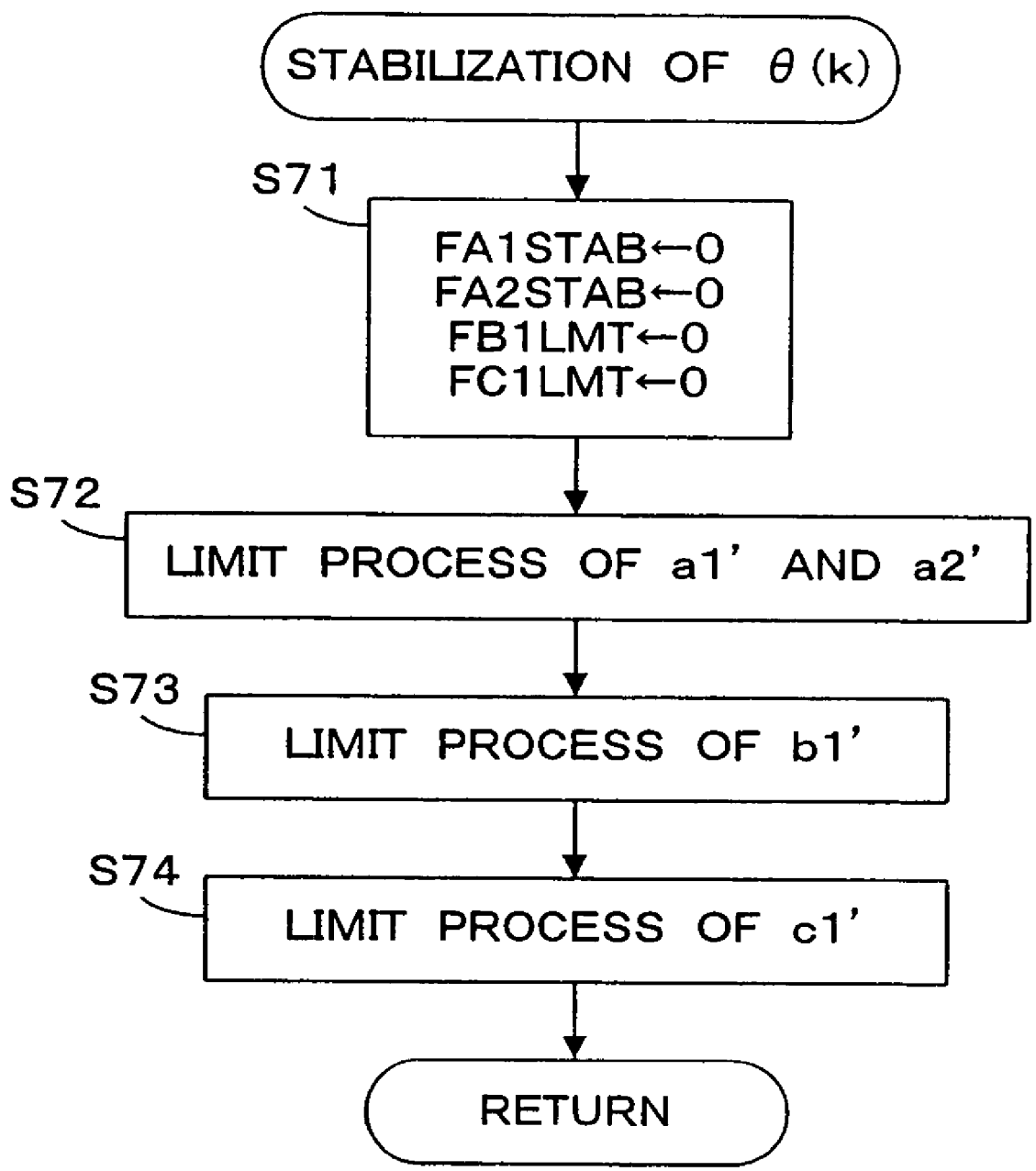
FIG. 16 is a flowchart showing a process of stabilizing a model parameter vector ($\theta$) in the process shown in FIG. 11.

FIG. 16 is a flowchart showing a process of stabilizing the model parameter vector $\theta(k)$, which is carried out in step S35 shown in FIG. 11.

Figure 17:
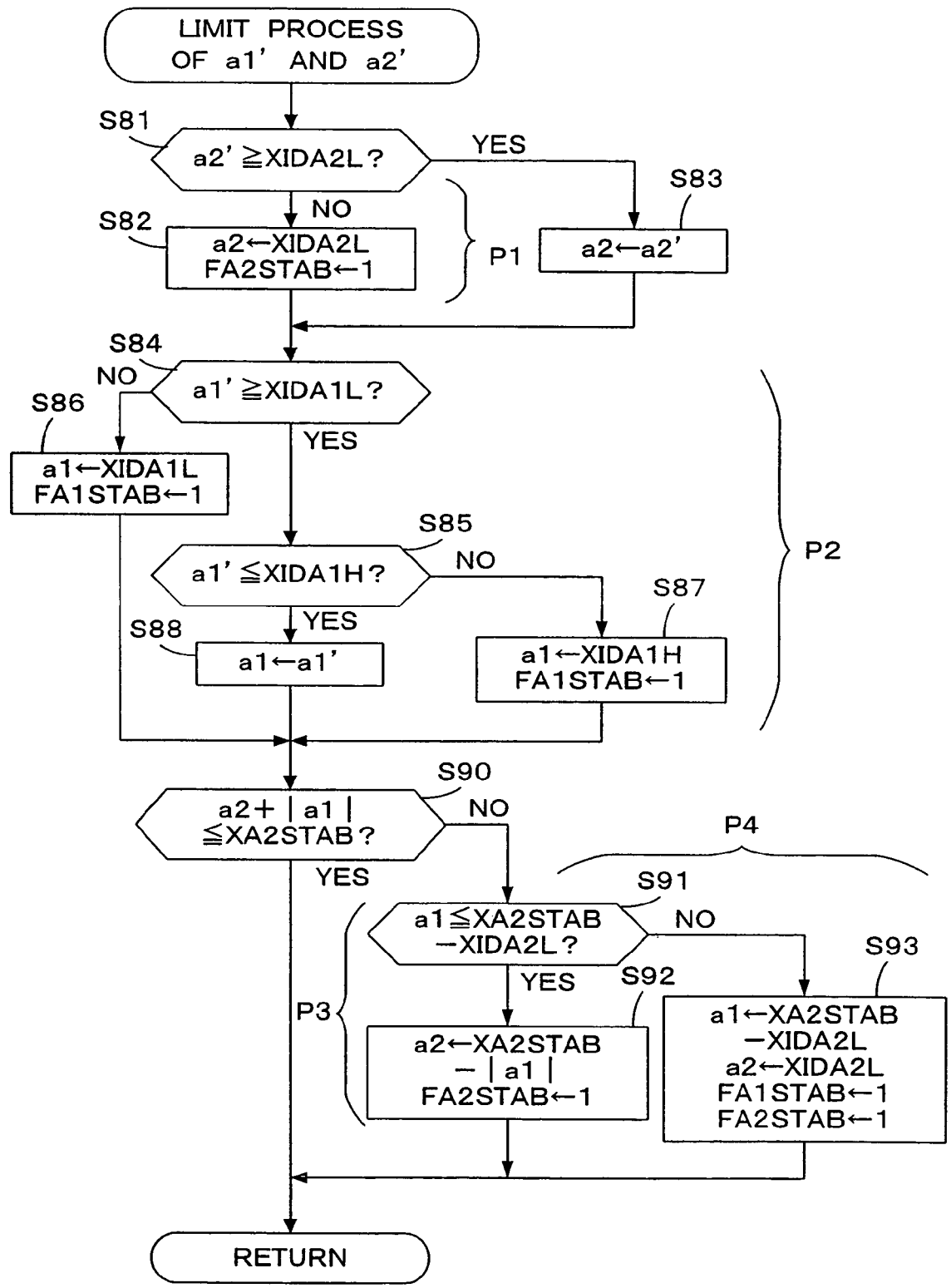
FIG. 17 is a flowchart showing a limit process of model parameters (a1', a2') in the process shown in FIG. 16.
Figure 19:
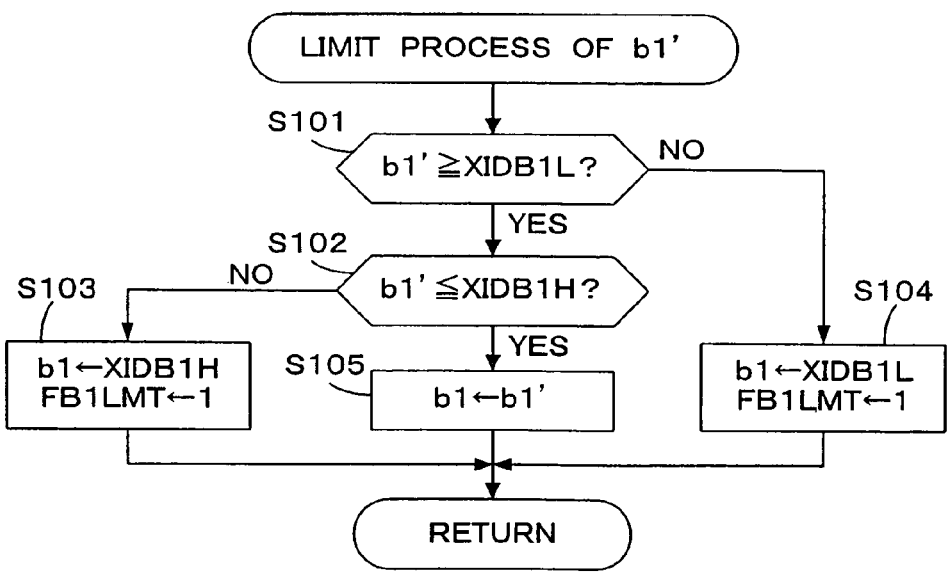
FIG. 19 is a flowchart showing a limit process of a model parameter (b1') in the process shown in FIG. 16.
Figure 20:
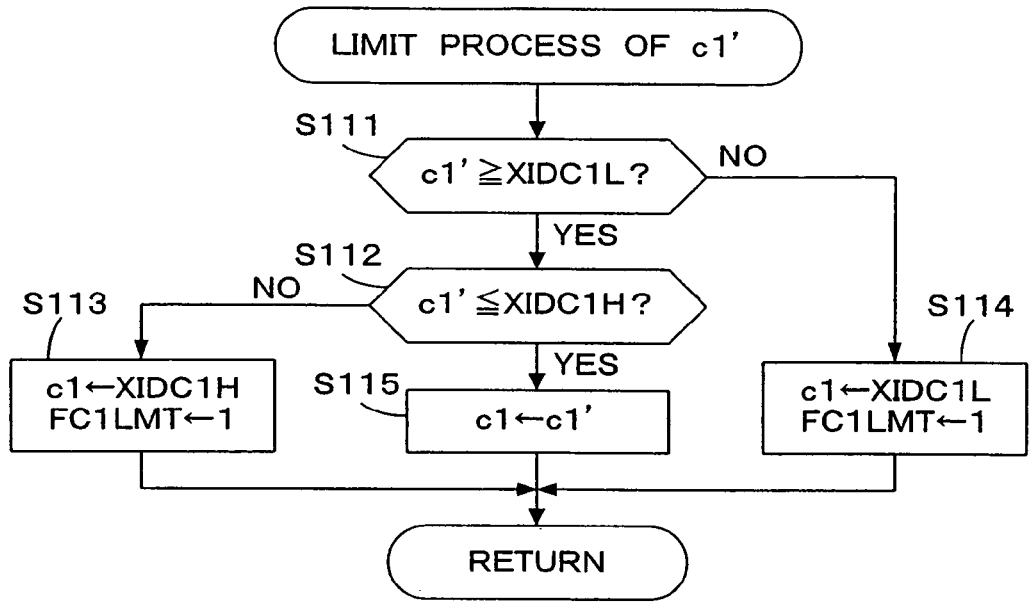
FIG. 20 is a flowchart showing a limit process of a model parameter (c1') in the process shown in FIG. 16.

In step S71 shown in FIG. 16, flags FA1STAB, FA2STAB, FB1LMT, and FC1LMT used in this process are initialized to be set to "0". In step S72, the limit process of the model parameters $a1'$ and $a2'$ shown in FIG. 17 is executed. In step S73, the limit process of the model parameter $b1'$ shown in FIG. 19 is executed. In step S74, the limit process of the model parameter $c1'$ shown in FIG. 20 is executed.

Figure 18:
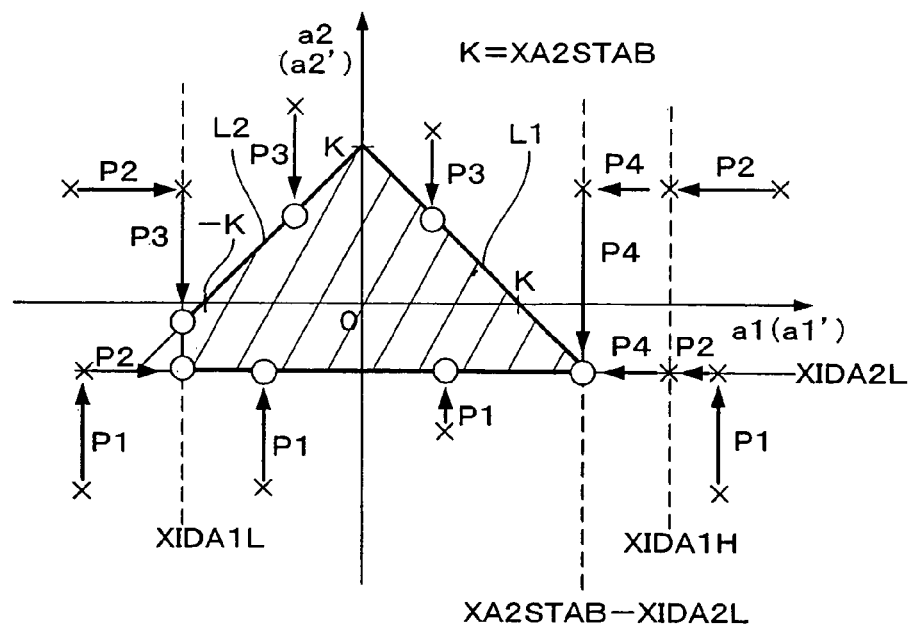
FIG. 18 is a diagram illustrative of the change in the values of the model parameters in the process shown in FIG. 16.

FIG. 17 is a flowchart showing the limit process of the model parameters $a1'$ and $a2'$, which is carried out in the step S72 shown in FIG. 16. FIG. 18 is a diagram illustrative of the process shown in FIG. 17, and will be referred to with FIG. 17.

In FIG. 18, combinations of the model parameters $a1'$ and $a2'$ which are required to be limited are indicated by "x" symbols, and the range of combinations of the model parameters $a1'$ and $a2'$ which are stable are indicated by a hatched region (hereinafter referred to as "stable region"). The limit process shown in FIG. 17 is a process of moving the combinations of the model parameters $a1'$ and $a2'$ which are in the outside of the stable region into the stable region at positions indicated by "○" symbols.

In step S81, it is determined whether or not the model parameter $a2'$ is greater than or equal to a predetermined a2 lower limit value XIDA2L. The predetermined a2 lower limit value XIDA2L is set to a negative value greater than "$-1$". Stable corrected model parameters $a1$ and $a2$ are obtained when setting the predetermined a2 lower limit value XIDA2L to "$-1$". However, the predetermined a2 lower limit value XIDA2L is set to a negative value greater than "$-1$" because the matrix A defined by the equation (26) to the "n"th power may occasionally become unstable (which means that the model parameters $a1'$ and $a2'$ do not diverge, but oscillate).

If $a2'$ is less than XIDA2L in step S81, the corrected model parameter $a2$ is set to the lower limit value XIDA2L, and an a2 stabilizing flag FA2STAB is set to "1". When the a2 stabilizing flag FA2STAB is set to "1", this indicates that the corrected model parameter $a2$ is set to the lower limit value XIDA2L. In FIG. 18, the correction of the model parameter in a limit process P1 of steps S81 and S82 is indicated by the arrow lines with "P1".

If the answer to the step S81 is affirmative (YES), i.e., if $a2'$ is greater than or equal to XIDA2L, the corrected model parameter $a2$ is set to the model parameter $a2'$ in step S83.

In steps S84 and S85, it is determined whether or not the model parameter $a1'$ is in a range defined by a predetermined a1 lower limit value XIDA1L and a predetermined a1 upper limit value XIDA1H. The predetermined a1 lower limit value XIDA1L is set to a value which is equal to or greater than "$-2$" and lower than "0", and the predetermined a1 upper limit value XIDA1H is set to "2", for example.

If the answers to steps S84 and S85 are affirmative (YES), i.e., if $a1'$ is greater than or equal to XIDA1L and less than or equal to XIDA1H, the corrected model parameter $a1$ is set to the model parameter $a1'$ in step S88.

If $a1'$ is less than XIDA1L in step S84, the corrected model parameter $a1$ is set to the lower limit value XIDA1L and an a1 stabilizing flag FA1STAB is set to "1" in step S86. If $a1'$ is greater than XIDA1H in step S85, the corrected model parameter $a1$ is set to the upper limit value XIDA1H and the a1 stabilizing flag FA1STAB is set to "1" in step S87. When the a1 stabilizing flag FA1STAB is set to "1", this indicates that the corrected model parameter $a1$ is set to the lower limit value XIDA1L or the upper limit value XIDA1H. In FIG. 18, the correction of the model parameter in a limit process P2 of steps S84 through S87 is indicated by the arrow lines with "P2".

In step S90, it is determined whether or not the sum of the absolute value of the corrected model parameter a1 and the corrected model parameter a2 is less than or equal to a predetermined stability determination value XA2STAB. The predetermined stability determination value XA2STAB is set to a value close to "1" but less than "1" (e.g., "0.99").

Straight lines L1 and L2 shown in FIG. 18 satisfy the following equation (45).

$$a2+|a1|XA2STAB \qquad (45)$$

Therefore, in step S90, it is determined whether or not the combination of the corrected model parameters a1 and a2 is placed at a position on or lower than the straight lines L1 and L2 shown in FIG. 18. If the answer to step S90 is affirmative (YES), the limit process immediately ends, since the combination of the corrected model parameters a1 and a2 is in the stable region shown in FIG. 18.

If the answer to step S90 is negative (NO), it is determined whether or not the corrected model parameter a1 is less than or equal to a value obtained by subtracting the predetermined a2 lower limit value XIDA2L from the predetermined stability determination value XA2STAB in step S91 (since XIDA2L is less than "0", XA2STAB−XIDA2L is greater than XA2STAB). If the corrected model parameter a1 is equal to or less than (XA2STAB−XIDA2L), the corrected model parameter a2 is set to (XA2STAB−|a1|) and the a2 stabilizing flag FA2STAB is set to "1" in step S92.

If the corrected model parameter a1 is greater than (XA2STAB−XIDA2L) in step S91, the corrected model parameter a1 is set to (XA2STAB−XIDA2L) in step S93. Further in step S93, the corrected model parameter a2 is set to the predetermined a2 lower limit value XIDA2L, and the a1 stabilizing flag FA1STAB and the a2 stabilizing flag FA2STAB are set to "1" in step S93.

In FIG. 18, the correction of the model parameter in a limit process P3 of steps S91 and S92 is indicated by the arrow lines with "P3", and the correction of the model parameter in a limit process P4 in steps S91 and S93 is indicated by the arrow lines with "P4".

As described above, the limit process shown in FIG. 17 is carried out to bring the model parameters a1' and a2' into the stable region shown in FIG. 18, thus calculating the corrected model parameters a1 and a2.

FIG. 19 is a flowchart showing a limit process of the model parameter b1', which is carried out in step S73 shown in FIG. 16.

In steps S101 and S102, it is determined whether or not the model parameter b1' is in a range defined by a predetermined b1 lower limit value XIDB1L and a predetermined b1 upper limit value XIDB1H. The predetermined b1 lower limit value XIDB1L is set to a positive value (e.g., "0.1"), and the predetermined b1 upper limit value XIDB1H is set to "1", for example.

If the answers to steps S101 and S102 are affirmative (YES), i.e., if b1' is greater than or equal to XIDB1L and less than or equal to XIDB1H, the corrected model parameter b1 is set to the model parameter b1' in step S105.

If b1' is less than XIDB1L in step S101, the corrected model parameter b1 is set to the lower limit value XIDB1L, and a b1 limiting flag FB1LMT is set to "1" in step S104. If b1' is greater than XIDB1H in step S102, then the corrected model parameter b1 is set to the upper limit value XIDB1H, and the b1 limiting flag FB1LMT is set to "1" in step S103.

When the b1 limiting flag FB1LMT is set to "1", this indicates that the corrected model parameter b1 is set to the lower limit value XIDB1L or the upper limit value XIDB1H.

FIG. 20 is a flowchart showing a limit process of the model parameter c1', which is carried out in step S74 shown in FIG. 16.

In steps S111 and S112, it is determined whether or not the model parameters c1' is in a range defined by a predetermined c1 lower limit value XIDC1L and a predetermined c1 upper limit value XIDC1H. The predetermined c1 lower limit value XIDC1L is set to "−60", for example, and the predetermined c1 upper limit value XIDC1H is set to "60", for example.

If the answers to steps S111 and S112 are affirmative (YES), i.e., if c1' is greater than or equal to XIDC1L and less than or equal to XIDC1H, the corrected model parameter c1 is set to the model parameter c1' in step S115.

If c1' is less than XIDC1L in step S111, the corrected model parameter c1 is set to the lower limit value XIDC1L, and a c1 limiting flag FC1LMT is set to "1" in step S114. If c1' is greater than XIDC1H in step S112, the corrected model parameter c1 is set to the upper limit value XIDC1H, and the c1 limiting flag FC1LMT is set to "1" in step S113. When the c1 limiting flag FC1LMT is set to "1", this indicates that the corrected model parameter c1 is set to the lower limit value XIDC1L or the upper limit value XIDC1H.

FIG. 21 is a flowchart showing a process of calculations of the state predictor, which is carried out in step S13 shown in FIG. 9.

In step S121, the matrix calculations are executed to calculate the matrix elements α1, α2, β1, β2, γ1 through γd in the equation (35).

In step S122, the predicted deviation amount PREDTH(k) is calculated from the equation (35).

FIG. 22 is a flowchart showing a process of calculation of the control input Usl (=DUT) applied to the throttle valve actuating device 10, which is carried out in step S14 shown in FIG. 9.

Figure 23:
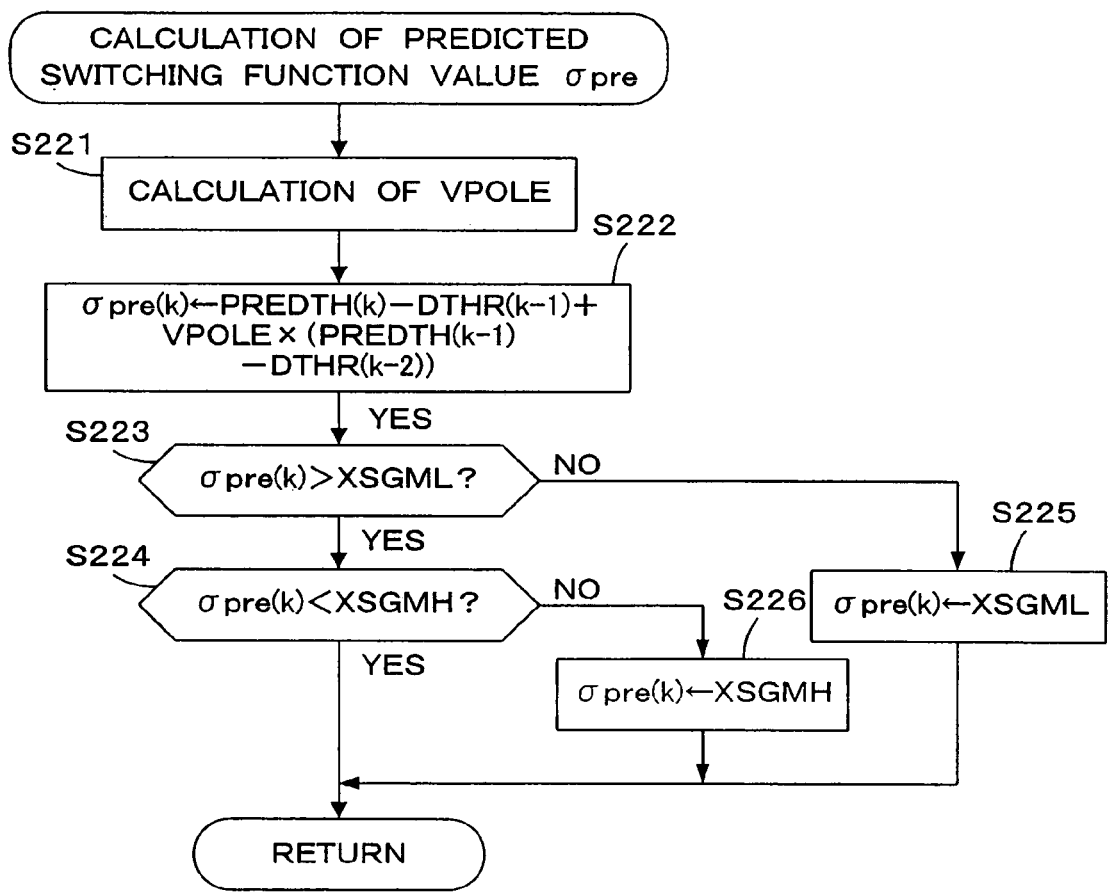
FIG. 23 is a flowchart showing a process of calculating a predicted switching function value ($\sigma$pre) in the process shown in FIG. 22.
Figure 26:
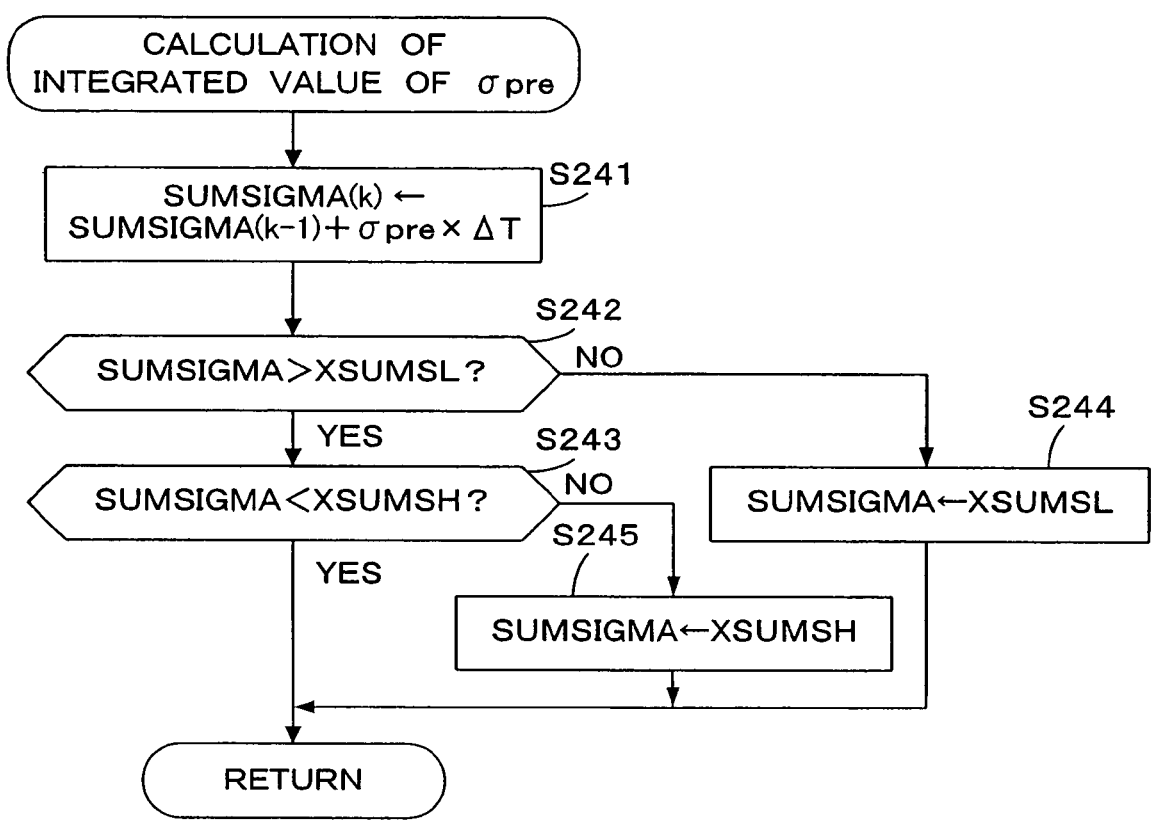
FIG. 26 is a flowchart showing a process of calculating an integrated value of the predicted switching function value ($\sigma$pre) in the process shown in FIG. 22.
Figure 27:
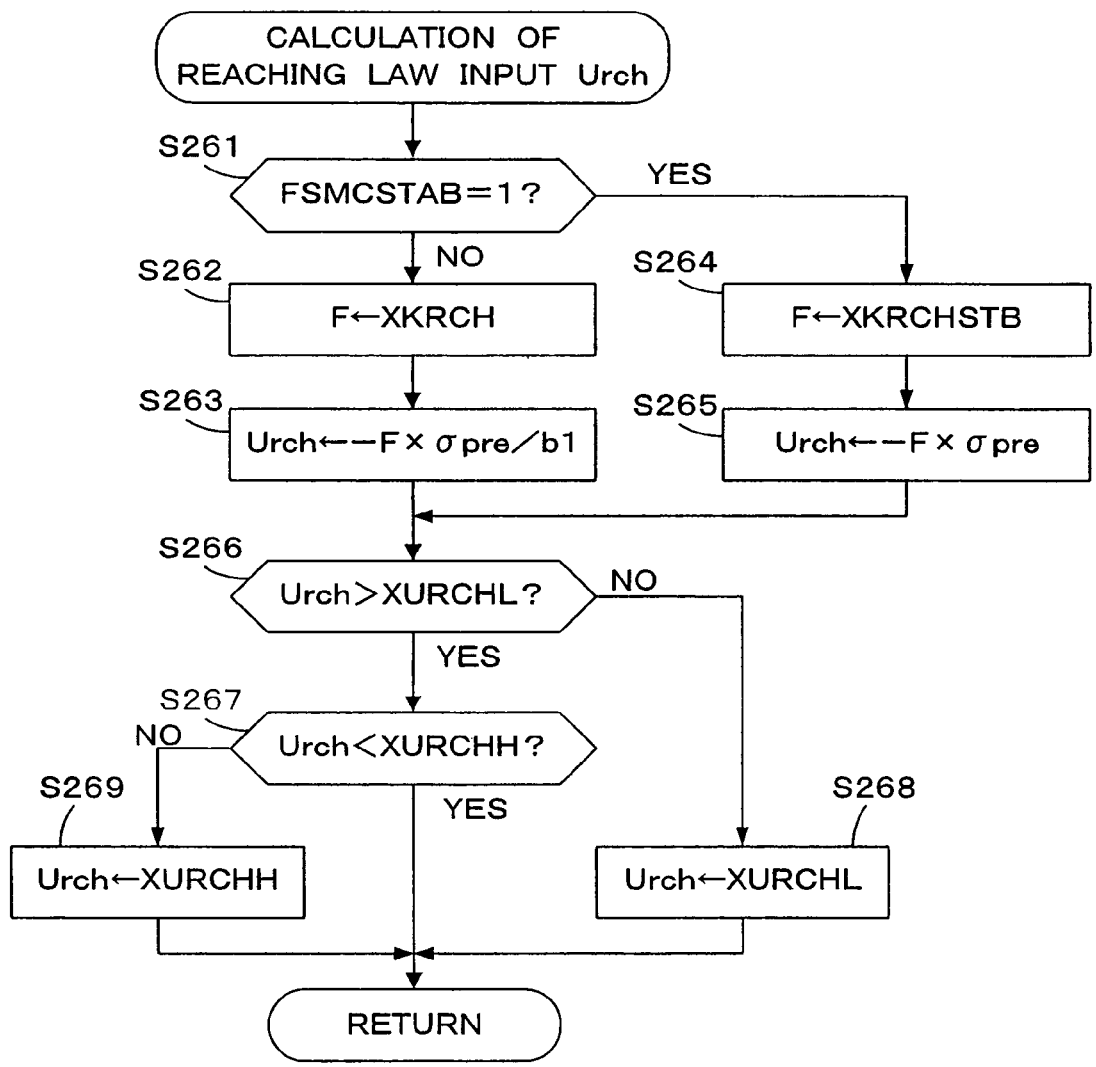
FIG. 27 is a flowchart showing a process of calculating a reaching law input (Urch) in the process shown in FIG. 22.
Figure 28:
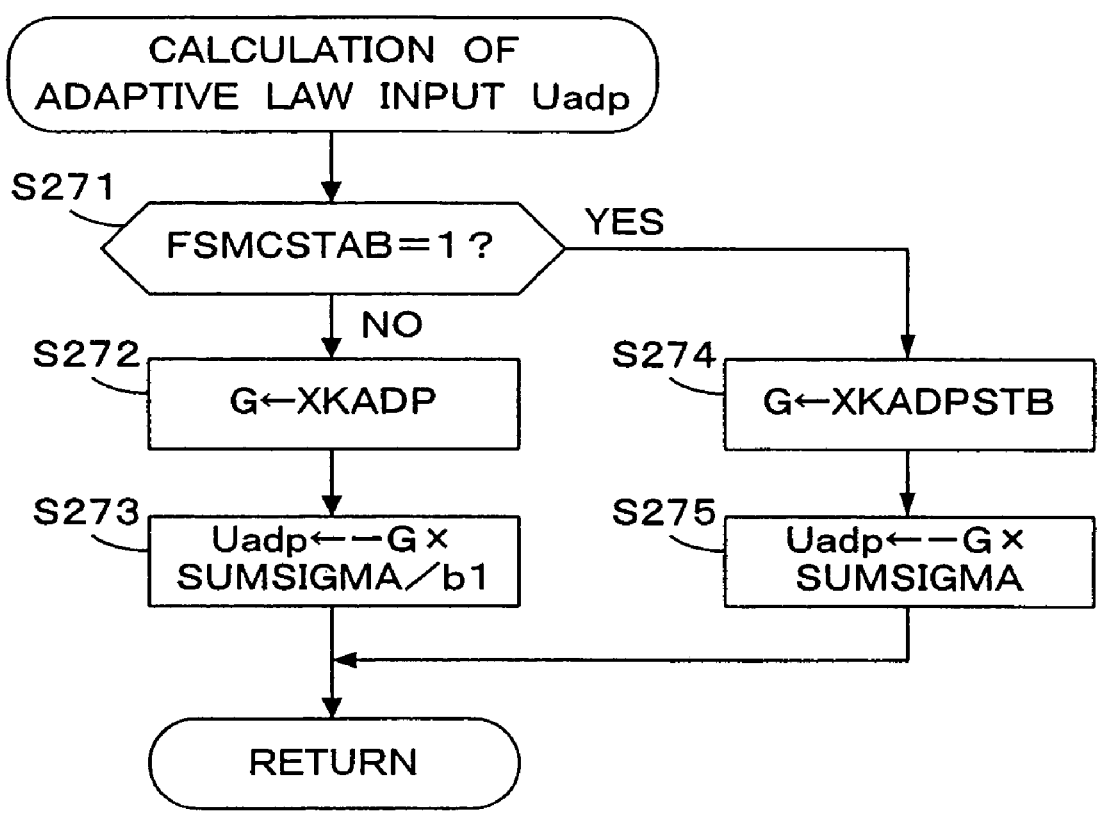
FIG. 28 is a flowchart showing a process of calculating an adaptive law input (Uadp) in the process shown in FIG. 22.

In step S201, a process of calculation of the predicted switching function value σpre, which is shown in FIG. 23, is executed. In step S202, a process of calculation of the integrated value of the predicted switching function value σpre, which is shown in FIG. 26, is executed. In step S203, the equivalent control input Ueq is calculated from the equation (9). In step S204, a process of calculation of the reaching law input Urch, which is shown in FIG. 27, is executed. In step S205, a process of calculation of the adaptive law input Uadp, which is shown in FIG. 28, is executed.

In step S206, it is determined whether or not the stability determination flag FSMCSTAB set in the process shown in FIG. 29 is "1". When the stability determination flag FSMC-STAB is set to "1", this indicates that the adaptive sliding mode controller 21 is unstable.

If FSMCSTAB is "0" in step S206, indicating that the adaptive sliding mode controller 21 is stable, the control inputs Ueq, Urch, and Uadp which are calculated in steps S203 through S205 are added, thereby calculating the control input Usl in step S207.

If FSMCSTAB is "1" in step S206, indicating that the adaptive sliding mode controller 21 is unstable, the sum of the reaching law input Urch and the adaptive law input Uadp is calculated as the control input Usl. In other words, the equivalent control input Ueq is not used for calculating the control input Usl, thus preventing the control system from becoming unstable.

In steps S209 and S210, it is determined whether or not the calculated control input Usl is in a range defined between a predetermined upper limit value XUSLH and a predetermined lower limit value XUSLL. If the control input Usl is in the range between XUSLH and XUSLL, the process immediately ends. If the control input Usl is less than or equal to the predetermined lower limit value XUSLL in step S209, the control input Usl is set to the predetermined lower limit value XUSLL in step S212. If the control input Usl is greater than or equal to the predetermined upper limit value XUSLH in step S210, the control input Usl is set to the predetermined upper limit value XUSLH in step S211.

FIG. 23 is a flowchart showing a process of calculating the predicted switching function value σpre, which is carried out in step S201 shown in FIG. 22.

Figure 24:
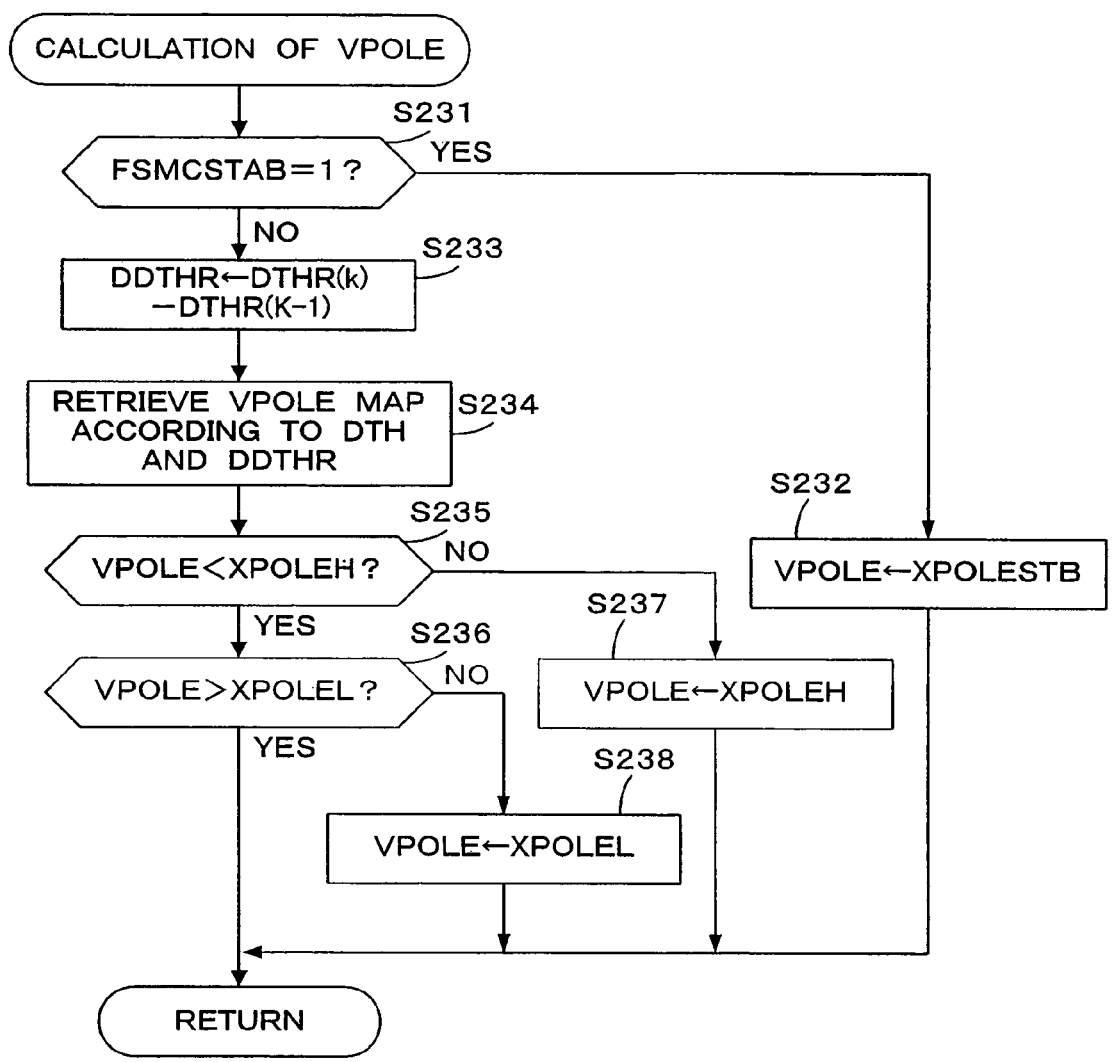
FIG. 24 is a flowchart showing a process of calculating the switching function setting parameter (VPOLE) in the process shown in FIG. 23.

In step S221, the process of calculating the switching function setting parameter VPOLE, which is shown in FIG. 24 is executed. Then, the predicted switching function value σpre(k) is calculated from the equation (36) in step S222.

In steps S223 and S224, it is determined whether or not the calculated predicted switching function value σpre(k) is in a range defined between a predetermined upper value XSGMH and a predetermined lower limit value XSGML. If the calculated predicted switching function value σpre(k) is in the range between XSGMH and XSGML, the process shown in FIG. 23 immediately ends. If the calculated predicted switching function value σpre(k) is less than or equal to the predetermined lower limit value XSGML in step S223, the calculated predicted switching function value σpre(k) is set to the predetermined lower limit value XSGML in step S225. If the calculated predicted switching function value σpre(k) is greater than or equal to the predetermined upper limit value XSGMH in step S224, the calculated predicted switching function value σpre(k) is set to the predetermined upper limit value XSGMH in step S226.

FIG. 24 is a flowchart showing a process of calculating the switching function setting parameter VPOLE, which is carried out in step S221 shown in FIG. 23.

In step S231, it is determined whether or not the stability determination flag FSMCSTAB is "1". If FSMCSTAB is "1" in step S231, indicating that the adaptive sliding mode controller 21 is unstable, the switching function setting parameter VPOLE is set to a predetermined stabilizing value XPOLESTB in step S232. The predetermined stabilizing value XPOLESTB is set to a value which is greater than "−1" but very close to "−1" (e.g., "−0.999").

If FSMCSTAB is "0", indicating that the adaptive sliding mode controller 21 is stable, an amount of change DDTHR(k) in the target value DTHR(k) is calculated from the following equation (46) in step S233.

$$DDTHR(k)=DTHR(k)-DTHR(k-1) \quad (46)$$

Figure 25A:
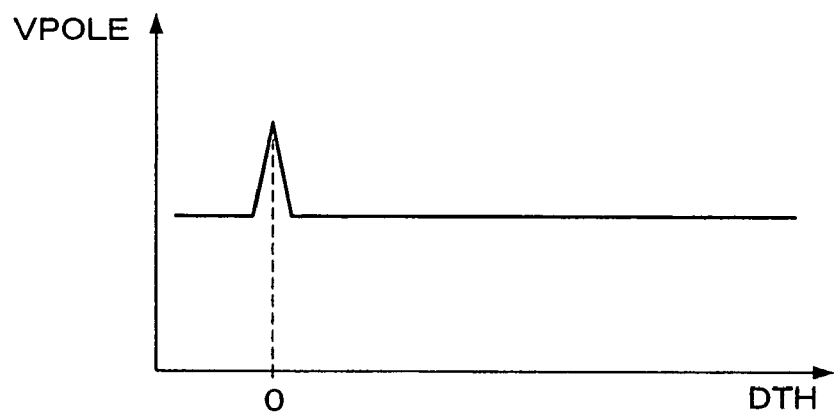
FIGS. 25A through 25C are diagrams showing maps used in the process shown in FIG. 24.
Figure 25B:
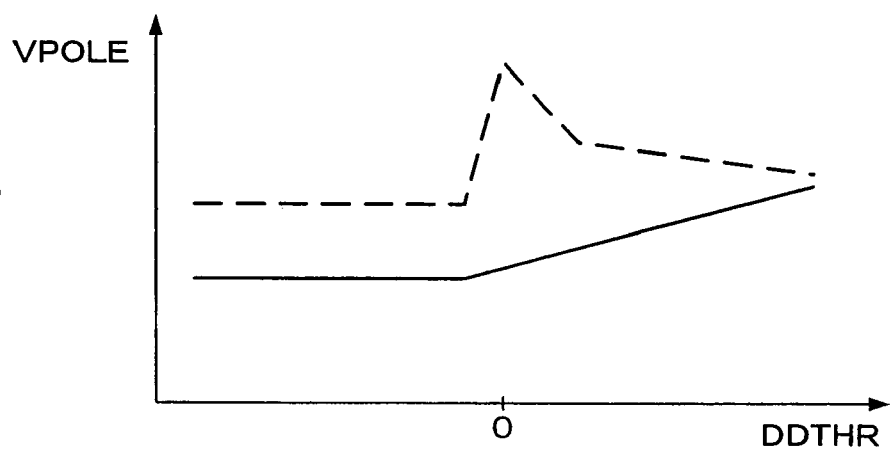

In step S234, a VPOLE map is retrieved according to the throttle valve opening deviation amount DTH and the amount of change DDTHR calculated in step S233 to calculate the switching function setting parameter VPOLE. As shown in FIG. 25A, the VPOLE map is set so that the switching function setting parameter VPOLE increases when the throttle valve opening deviation amount DTH has a value in the vicinity of "0", i.e., when the throttle valve opening TH is in the vicinity of the default opening THDEF, and the switching function setting parameter VPOLE has a substantially constant value regardless of changes of the throttle valve opening deviation amount DTH, when the throttle valve opening deviation amount DTH has values which are not in the vicinity of "0". The VPOLE map is also set so that the switching function setting parameter VPOLE increases as the amount of change DDTHR in target value increases as indicated by the solid line in FIG. 25B, and the switching function setting parameter VPOLE increases as the amount of change DDTHR in the target value has a value in the vicinity of "0" as indicated by the broken line in FIG. 25B, when the throttle valve opening deviation amount DTH has a value in the vicinity of "0".

Specifically, when the target value DTHR for the throttle valve opening changes greatly in the decreasing direction, the switching function setting parameter VPOLE is set to a relatively small value. This makes it possible to prevent the throttle valve 3 from colliding with the stopper for stopping the throttle valve 3 in the fully closed position. In the vicinity of the default opening THDEF, the switching function setting parameter VPOLE is set to a relatively large value, which improves the controllability in the vicinity of the default opening THDEF.

Figure 25C:
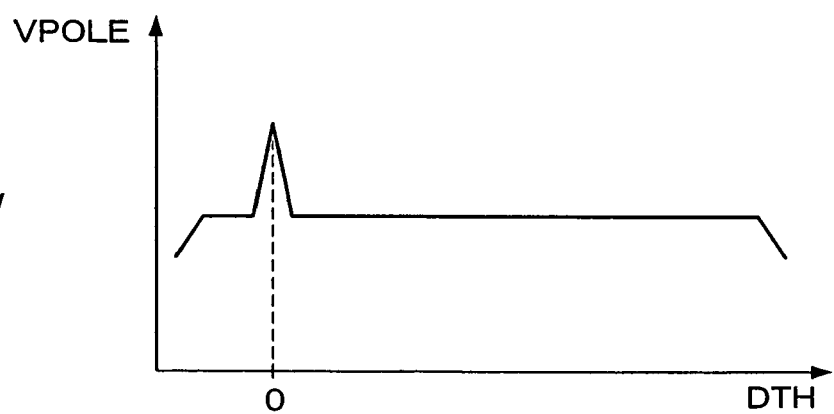

As shown in FIG. 25C, the VPOLE map may be set so that the switching function setting parameter VPOLE decreases when the throttle valve opening TH is in the vicinity of the fully closed opening or the fully open opening. Therefore, when the throttle valve opening TH is in the vicinity of the fully closed opening or the fully open opening, the speed for the throttle valve opening TH to follow up the target opening THR is reduced. As a result, collision of the throttle valve 3 with the stopper can more positively be avoided (the stopper also stops the throttle valve 3 in the fully open position).

In steps S235 and S236, it is determined whether or not the calculated switching function setting parameter VPOLE is in a range defined between a predetermined upper limit value XPOLEH and a predetermined lower limit XPOLEL. If the switching function setting parameter VPOLE is in the range between XPOLEH and XPOLEL, the process shown immediately ends. If the switching function setting parameter VPOLE is less than or equal to the predetermined lower limit value XPOLEL in step S236, the switching function setting parameter VPOLE is set to the predetermined lower limit value XPOLEL in step S238. If the switching function setting parameter VPOLE is greater than or equal to the predetermined upper limit value XPOLEH in step S235, the switching function setting parameter VPOLE is set to the predetermined upper limit value XPOLEH in step S237.

FIG. 26 is a flowchart showing a process of calculating an integrated value of σpre, SUMSIGMA, of the predicted switching function value σpre. This process is carried out in step S202 shown in FIG. 22. The integrated value SUMSIGMA is used for calculating the adaptive law input Uadp in the process shown in FIG. 28 which will be described later (see the equation (11a)).

In step S241, the integrated value SUMSIGMA is calculated from the following equation (47) where ΔT represents a calculation period.

$$SUMSIGMA(k)=SUMSIGMA(k-1)+\sigma pre \times \Delta T \quad (47)$$

In steps S242 and S243, it is determined whether or not the calculated integrated value SUMSIGMA is in a range defined between a predetermined upper limit value XSUMSH and a predetermined lower limit value XSUMSL. If the integrated value SUMSIGMA is in the range between XSUMSH and XSUMSL, the process immediately ends. If the integrated value SUMSIGMA is less than or equal to the predetermined lower limit value XSUMSL in step S242, the integrated value SUMSIGMA is set to the predetermined lower limit value XSUMSL in step S244. If the integrated value SUMSIGMA is greater than or equal to the predetermined upper limit value XSUMSH in step S243, the integrated value SUMSIGMA is set to the predetermined upper limit value XSUMSH in step S245.

FIG. 27 is a flowchart showing a process of calculating the reaching law input Urch, which is carried out in step S204 shown in FIG. 22.

In step S261, it is determined whether or not the stability determination flag FSMCSTAB is "1". If the stability determination flag FSMCSTAB is "0", indicating that the adaptive sliding mode controller 21 is stable, the control gain F is set to a normal gain XKRCH in step S262, and the reaching law input Urch is calculated from the following equation (48), which is the same as the equation (10a), in step S263.

$$Urch = -F \times \sigma pre/b1 \quad (48)$$

If the stability determination flag FSMCSTAB is "1", indicating that the adaptive sliding mode controller 21 is unstable, the control gain F is set to a predetermined stabilizing gain XKRCHSTB in step S264, and the reaching law input Urch is calculated according to the following equation (49), which does not include the model parameter b1, in step S265.

$$Urch = -F \times \sigma pre \quad (49)$$

In steps S266 and S267, it is determined whether the calculated reaching law input Urch is in a range defined between a predetermined upper limit value XURCHH and a predetermined lower limit value XURCHL. If the reaching law input Urch is in the range between XURCHH and XURCHL, the process immediately ends. If the reaching law input Urch is less than or equal to the predetermined lower limit value XURCHL in step S266, the reaching law input Urch is set to the predetermined lower limit value XURCHL in step S268. If the reaching law input Urch is greater than or equal to the predetermined upper limit value XURCHH in step S267, the reaching law input Urch is set to the predetermined upper limit value XURCHH in step S269.

As described above, when the adaptive sliding mode controller 21 becomes unstable, the control gain F is set to the predetermined stabilizing gain XKRCHSTB, and the reaching law input Urch is calculated without using the model parameter b1, which brings the adaptive sliding mode controller 21 back to its stable state. When the identifying process carried out by the model parameter identifier 22 becomes unstable, the adaptive sliding mode controller 21 becomes unstable. Therefore, by using the equation (49) that does not include the model parameter b1 which has become unstable, the adaptive sliding mode controller 21 can be stabilized.

FIG. 28 is a flowchart showing a process of calculating the adaptive law input Uadp, which is carried out in step S205 shown in FIG. 22.

In step S271, it is determined whether or not the stability determination flag FSMCSTAB is "1". If the stability determination flag FSMCSTAB is "0", indicating that the adaptive sliding mode controller 21 is stable, the control gain G is set to a normal gain XKADP in step S272, and the adaptive law input Uadp is calculated from the following equation (50), which corresponds to the equation (11a), in step S273.

$$Uadp = -G \times SUMSIGMA/b1 \quad (50)$$

If the stability determination flag FSMCSTAB is "1", indicating that the adaptive sliding mode controller 21 is unstable, the control gain G is set to a predetermined stabilizing gain XKADPSTB in step S274, and the adaptive law input Uadp is calculated according to the following equation (51), which does not include the model parameter b1, in step S275.

$$Uadp = -G \times SUMSIGMA \quad (51)$$

As described above, when the adaptive sliding mode controller 21 becomes unstable, the control gain G is set to the predetermined stabilizing gain XKADPSTB, and the adaptive law input Uadp is calculated without using the model parameter b1, which brings the adaptive sliding mode controller 21 back to its stable state.

FIG. 29 is a flowchart showing a process of determining the stability of the sliding mode controller, which is carried out in step S16 shown in FIG. 9. In this process, the stability is determined based on a differential value of the Lyapunov function, and the stability determination flag FSMCSTAB is set according to the result of the stability determination.

In step S281, a switching function change amount D$\sigma$pre is calculated from the following equation (52). Then, a stability determining parameter SGMSTAB is calculated from the following equation (53) in step S282.

$$D\sigma pre = \sigma pre(k) - \sigma pre(k-1) \quad (52)$$

$$SGMSTAB = D\sigma pre \times \sigma pre(k) \quad (53)$$

In step S283, it is determined whether or not the stability determination parameter SGMSTAB is less than or equal to a stability determining threshold XSGMSTAB. If SGMSTAB is greater than XSGMSTAB, it is determined that the adaptive sliding mode controller 21 may possibly be unstable, and an unstability detecting counter CNTSMCST is incremented by "1" in step S285. If SGMSTAB is less than or equal to XSGMSTAB, the adaptive sliding mode controller 21 is determined to be stable, and the count of the unstability detecting counter CNTSMCST is not incremented but maintained in step S284.

In step S286, it is determined whether or not the value of the unstability detecting counter CNTSMCST is less than or equal to a predetermined count XSSTAB. If CNTSMCST is less than or equal to XSSTAB, the adaptive sliding mode controller 21 is determined to be stable, and a first determination flag FSMCSTAB1 is set to "0" in step S287. If CNTSMCST is greater than XSSTAB, the adaptive sliding mode controller 21 is determined to be unstable, and the first determination flag FSMCSTAB1 is set to "1" in step S288. The value of the unstability detecting counter CNTSMCST is initialized to "0", when the ignition switch is turned on.

In step S289, a stability determining period counter CNTJUDST is decremented by "1". It is determined whether or not the value of the stability determining period counter CNTJUDST is "0" in step S290. The value of the stability determining period counter CNTJUDST is initialized to a predetermined determining count XCJUDST, when the ignition switch is turned on. Initially, therefore, the answer to step S290 is negative (NO), and the process immediately goes to step S295.

If the count of the stability determining period counter CNTJUDST subsequently becomes "0", the process goes from step S290 to step S291, in which it is determined whether or not the first determination flag FSMCSTAB1 is "1". If the first determination flag FSMCSTAB1 is "0", a second determination flag FSMCSTAB2 is set to "0" in step S293. If the first determination flag FSMCSTAB1 is "1", the second determination flag FSMCSTAB2 is set to "1" in step S292.

In step S294, the value of the stability determining period counter CNTJUDST is set to the predetermined determining count XCJUDST, and the unstability detecting counter CNTSMCST is set to "0". Thereafter, the process goes to step S295.

In step S295, the stability determination flag FSMCSTAB is set to the logical sum of the first determination flag FSMCSTAB1 and the second determination flag FSMCSTAB2. The second determination flag FSMCSTAB2 is maintained at "1" until the value of the stability determining period counter CNTJUDST becomes "0", even if the answer to step S286 becomes affirmative (YES) and the first determination flag FSMCSTAB1 is set to "0". Therefore, the stability determination flag FSMCSTAB is also maintained at "1" until the value of the stability determining period counter CNTJUDST becomes "0".

FIG. 30 is a flowchart showing a process of calculating the default opening deviation thdefadp, which is carried out in step S17 shown in FIG. 9.

In step S251 shown FIG. 30, a gain coefficient KPTH(k) is calculated according to the following equation (54).

$$KPTH(k) = PTH(k-1)/(1+PTH(k-1)) \quad (54)$$

where PTH(k−1) represents a gain parameter calculated in step S253 when the present process was carried out in the preceding cycle.

In step S252, the model parameter c1' calculated in the process of calculations of the model parameter identifier as shown in FIG. 11 and the gain coefficient KPTH(k) calculated in step S251 are applied to the following equation (55) to calculate a default opening deviation thdefadp(k).

$$thdefadp(k) = thdefadp(k-1) + KPTH(k) \times (c1' - thdefadp(k-1)) \quad (55)$$

In step S253, a gain parameter PTH(k) is calculated from the following equation (56):

$$PTH(k) = \{1 - PTH(k-1)\}/(XDEFADPW + PTH(k-1))\} \times PTH(k-1)/XDEFADPW \quad (56)$$

The equation (56) is obtained by setting λ1' and λ2' in the equation (39) respectively to a predetermined value XDEFADP and "1".

According to the process shown in FIG. 30, the model parameter c1' is statistically processed by the sequential method-of-weighted-least-squares algorithm to calculate the default opening deviation thdefadp.

In the present embodiment, the throttle valve actuating device 10 and a portion of the ECU 7 (i.e., an output circuit for supplying an energizing current to the motor 6) correspond to a plant. The process shown in FIG. 22 corresponds to a sliding mode controller. The process shown in FIG. 11 corresponds to an identifying means. The process shown in FIG. 12 corresponds to an identifying error calculating means. The process shown in FIG. 14 corresponds to an identifying error correcting means. The process shown in FIG. 21 corresponds to a predicting means.

Second Embodiment

In the first embodiment described above, the controlled object model is defined by the equation (1) including the dead time d, and the predicted deviation amount PREDTH after the elapse of the dead time d is calculated with the state predictor 23, to thereby control the controlled object model which includes the dead time. Accordingly, it is necessary to execute calculations corresponding to the state predictor 23 in the CPU, and the amount of calculations executed by the CPU becomes large. In the second embodiment, in order to reduce the calculation load on the CPU, the controlled object model is defined by the following equation (1a) where the dead time d is set to "0", and the modeling error caused by setting the dead time d to "0" is compensated by the robustness of the adaptive sliding mode control.

$$DTH(k+1) = a1 \times DTH(k) + a2 \times DTH(k-1) + b1 \times DUT(k) + c1 \quad (1a)$$

In order to further reduce the calculation load on the CPU, the fixed gain algorithm is employed as the algorithm for identifying the model parameters.

For further stabilizing the control, another process instead of the dead zone process is employed as the process for preventing the drift of the model parameters.

The second embodiment will be described below primarily with respect to details which are different from those of the first embodiment. Other details except for what will be described below are identical to those of the first embodiment.

Figure 31:
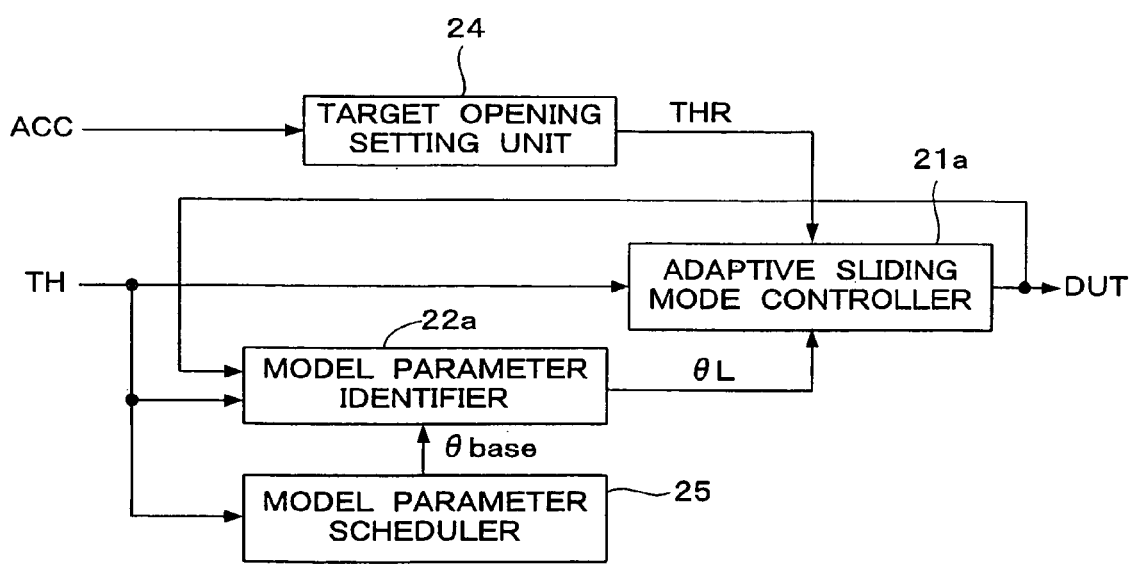
FIG. 31 is a functional block diagram showing functions realized by the electronic control unit (ECU) shown in FIG. 1 according to a second embodiment of the present invention.

FIG. 31 is a functional block diagram of a throttle valve control system which is realized by the ECU 7. The throttle valve control system comprises an adaptive sliding mode controller 21a, a model parameter identifier 22a, a model parameter scheduler 25, and a target opening setting unit 24 for setting a target opening THR for the throttle valve 3 according to the accelerator pedal depression amount ACC.

The adaptive sliding mode controller 21a is supplied with a detected throttle valve opening TH instead of the predicted deviation amount PREDTH. The adaptive sliding mode controller 21a calculates a duty ratio DUT in order to make the throttle valve opening TH coincide with a target opening THR.

Using the adaptive sliding mode controller 21a offers the same advantages as described above in the first embodiment, and achieves the robustness of the control system against the dead time of the controlled object. Therefore, it is possible to compensate for the modeling error that is caused by setting the dead time d to "0".

The model parameter identifier 22a calculates a corrected model parameter vector θL ($θL^T$=[a1, a2, b1, c1]) according to a method which is different from the method in the first embodiment, and supplies the calculated corrected model parameter vector θL to the adaptive sliding mode controller 21a. More specifically, the model parameter identifier 22a calculates a model parameter vector θ by correcting a reference model parameter vector θbase supplied from the model parameter scheduler 25, based on the throttle valve opening TH and the duty ratio DUT. The model parameter identifier 22a then performs the limit process of the model parameter vector θ to calculate a corrected model parameter vector θL, and supplies the corrected model parameter vector θL to the adaptive sliding mode controller 21a. In this manner, model parameters a1, a2, and b1 which are optimum for making the throttle valve opening TH follow up the target opening THR are obtained, and a model parameter c1 indicative of disturbance and a deviation of the default opening THDEF is obtained.

The model parameter scheduler 25 calculates a reference model parameter vector θbase ($θbase^T$=[a1base, a2base, b1base, c1base]) based on the throttle valve opening TH, and supplies the calculated reference model parameter vector θbase to the model parameter identifier 22a.

In the present embodiment, since the controlled object model is defined by the above equation (1a), the adaptive sliding mode controller 21a calculates the equivalent control input Ueq(k), the reaching law input Urch(k), and the adaptive law input Uadp(k) from the following equations (9b), (10b), and (11b) instead of the above equations (9a), (10a), and (11a).

$$DUT(k) = \frac{1}{b1}\{(1 - a1 - VPOLE)DTH(k) + (VPOLE - a2)DTH(k-1) - c1 + DTHR(k+1) + (VPOLE - 1)DTHR(k) - VPOLE \times DTHR(k-1)\} = Ueq(k) \quad (9b)$$

$$Urch(k) = \frac{-F}{b1}\sigma(k) \quad (10b)$$

$$Uadp(k) = \frac{-G}{b1}\sum_{i=0}^{k} \Delta T\sigma(i) \quad (11b)$$

The equations (9b), (10b), and (11b) are obtained by setting the dead time d to "0" in the equations (9), (10), and (11).

The model parameter identifier 22a calculates a model parameter vector of the controlled object model based on the input (DUT(k)) and output (TH(k)) of the controlled object, as described above. Specifically, the model parameter identifier 22a calculates a model parameter vector θ(k) from the following equation (15).

$$\theta(k) = \theta(k-1) + KP(k)ide(k) \quad (15)$$

The identifying error ide(k) in the equation (15) is defined by the following equations (17), (18), and (19a). The gain coefficient vector KP(k) is defined by the following equation (20), and the square matrix P(k) in the equation (20) is calculated from the following equation (21).

$$ide(k) = DTH(k) - DTHHAT(k) \quad (17)$$

$$DTHHAT(k) = \theta(k-1)^T \zeta(k) \quad (18)$$

$$\zeta(k)^T = [DTH(k-1), DTH(k-2), DUT(k-1), 1] \quad (19a)$$

$$KP(k) = \frac{P(k)\zeta(k)}{1 + \zeta^T(k)P(k)\zeta(k)} \quad (20)$$

$$P(k+1) = \frac{1}{\lambda_1}\left(I - \frac{\lambda_2 P(k)\zeta(k)\zeta^T(k)}{\lambda_1 + \lambda_2 \zeta^T(k)P(k)\zeta(k)}\right)P(k) \quad (21)$$

(I: Identity Matrix)

In the present embodiment, the following requirements B4 and B5 are required to be satisfied, in addition to the requirements B1 through B3 which should be satisfied like the first embodiment should be satisfied.

B1) Adaptation to quasi-static dynamic characteristic changes and hardware characteristics variations "Quasi-static dynamic characteristics changes" mean slow-rate characteristics changes such as power supply voltage fluctuations or hardware degradations due to aging.

B2) Adaptation to high-rate dynamic characteristics changes

Specifically, this means adaptation to dynamic characteristics changes depending on changes in the throttle valve opening TH.

B3) Prevention of a drift of model parameters

The drift, which is an excessive increase of the absolute values of model parameters, should be prevented. The drift of model parameters is caused by the effect of the identifying error, which should not be reflected to the model parameters, due to nonlinear characteristics of the controlled object.

B4) Matching with the calculating capability of the ECU

Specifically, the amount of calculations is required to be further reduced.

B5) The stabilization of model parameters (control performance)

Specifically, variations of identified model parameters should be minimized.

In order to satisfy the requirement B4, the coefficients $\lambda 1$ and $\lambda 2$ are set respectively to "1" and "0", to thereby employ the fixed gain algorithm. Accordingly, the square matrix P(k) is made constant, and the calculation of the equation (21) can be omitted. As a result, the amount of calculations can greatly be reduced.

Specifically, when the fixed gain algorithm is employed, the equation (20) is simplified into the following equation (20a) where P represents a square matrix having constants as diagonal elements.

$$KP(k) = \frac{P\zeta(k)}{1 + \zeta^T(k)P\zeta(k)} \quad (20a)$$

According to the algorithm thus simplified, the amount of calculations can be reduced. However, the identifying ability is also slightly reduced. Further, the equation (15) for calculating the model parameter vector θ(k) can be rewritten to the following equation (15b) and has an integral structure of the identifying error ide(k). Therefore, the identifying error ide(k) is likely to be integrated to the model parameters to cause the drift of the model parameters.

$$\theta(k) = \theta(0) + KP(1)ide(1) + KP(2)ide(2) + \cdots + KP(k)ide(k) \quad (15b)$$

where θ(0) represents an initial vector having elements of initial values of the model parameters.

In the present embodiment, in order to prevent the drift of the model parameters, the model parameter vector θ(k) is calculated from the following equation (15c) instead of the above equation (15b).

$$\theta(k) = \theta(0) + DELTA^{k-1} \times KP(1)ide(1) + \quad (15c)$$
$$DELTA^{k-2} \times KP(2)ide(2) + \cdots +$$
$$DELTA \times KP(k-1)ide(k-1) +$$
$$KP(k)ide(k)$$

where DELTA represents a forgetting coefficient vector having forgetting coefficients DELTAi (i=1 through 4) as elements, as indicated by the following equation.

DELTA=[DELTA1, DELTA2, DELTA3, DELTA4]

The forgetting coefficients DELTAi are set to a value between 0 and 1 (0<DELTAi<1) and have a function to gradually reduce the influence of past identifying errors. One of the coefficient DELTA3 which is relevant to the calculation of the model parameter b1, and the coefficient DELTA4 which is relevant to the calculation of the model parameter c1 is set to "1". In other words, one of the forgetting coefficients DELTA3 and DELTA4 is made noneffective. By setting one or more of the elements of the forgetting coefficient vector DELTA to "1", it is possible to prevent a steady-state deviation between the target value DTHR and the throttle valve opening deviation amount DTH from occurring. If both of the coefficients DELTA3 and DELTA4 are set to "1", the effect of preventing the model parameters from drifting becomes insufficient. Accordingly, it is preferable to set only one of the coefficients DELTA3 or DELTA4 to "1".

If the equation (15) is rewritten into a recursive form, the following equations (15d) and (15e) are obtained. A process of calculating the model parameter vector θ(k) from the equations (15d) and (15e) instead of the equation (15) is hereinafter referred to as a δ correcting method, and dθ(k) defined by the equation (15e) is referred to as "updating vector".

$$\theta(k)=\theta(0)+d\theta(k) \tag{15d}$$

$$d\theta(k)=\text{DELTA} \times d\theta(k-1)+KP(k)ide(k) \tag{15e}$$

According to the algorithm using the δ correcting method, the drift preventing effect which satisfies the requirement B3 and the model parameter stabilizing effect which satisfies the requirement B5 are obtained. Specifically, the initial vector θ(0) is maintained at all times, and the values which can be taken by the elements of the updating vector dθ(k) are limited by the effect of the coefficient vector DELTA. Therefore, the model parameters can be stabilized in the vicinity of their initial values.

Furthermore, since the model parameters are calculated while adjusting the updating vector dθ(k) according to the identifying process based on the input and output data of the actual controlled object, the model parameters matching the actual controlled object can be obtained, and hence the above requirement B1 is satisfied.

In order to satisfy the requirement B2, the model parameter vector θ(k) is calculated from the following equation (15f) which uses the reference model parameter vector θbase, instead of the initial vector θ(0) in the equation (15d).

$$\theta(k)=\theta\text{base}+d\theta(k) \tag{15f}$$

The reference model parameter vector θbase is set according to the throttle valve opening deviation amount DTH (TH−THDEF) by the model parameter scheduler 25. Consequently, the reference model parameter vector θbase can be adapted to changes in the dynamic characteristics which correspond to changes in the throttle valve opening TH, and hence the above requirement B2 is satisfied.

As described above, according to the present embodiment, the amount of calculations by the ECU is reduced by employing the fixed gain algorithm (the requirement B4). The adaptation to quasi-static dynamic characteristics changes and hardware characteristics variations (the requirement B1), the stabilization of the model parameters (control performance) (the requirement B5), and the prevention of the drift of the model parameter (the requirement B3) are achieved by employing the algorithm using the δ correcting method. Further, the adaptation to dynamic characteristics changes corresponding to changes in the throttle opening TH is achieved by employing the model parameter scheduler 25 (the requirement B2).

The elements a1', a2', b1', and c1' of the model parameter vector θ(k) calculated from the equation (15f) are subjected to the limit process so that the corrected model parameter vector θL(k) (θL(k)$^T$=[a1, a2, b1, c1]) is calculated like the first embodiment.

In addition, the model parameter c1' is statistically processed, and the central value of its variations is calculated as the default opening deviation thdefadp and used to calculate the throttle valve opening deviation amount DTH and the target value DTHR from the equations (41) and (42) like the first embodiment.

$$DTH(k)=TH(k)-THDEF+thdefadp \tag{41}$$

$$DTHR(k)=THR(k)-THDEF+thdefadp \tag{42}$$

Operations of the CPU of the ECU 7 for realizing the functions of the adaptive sliding mode controller 21a, the model parameter identifier 22a, and the model parameter scheduler 25 will be described below.

Figure 32:
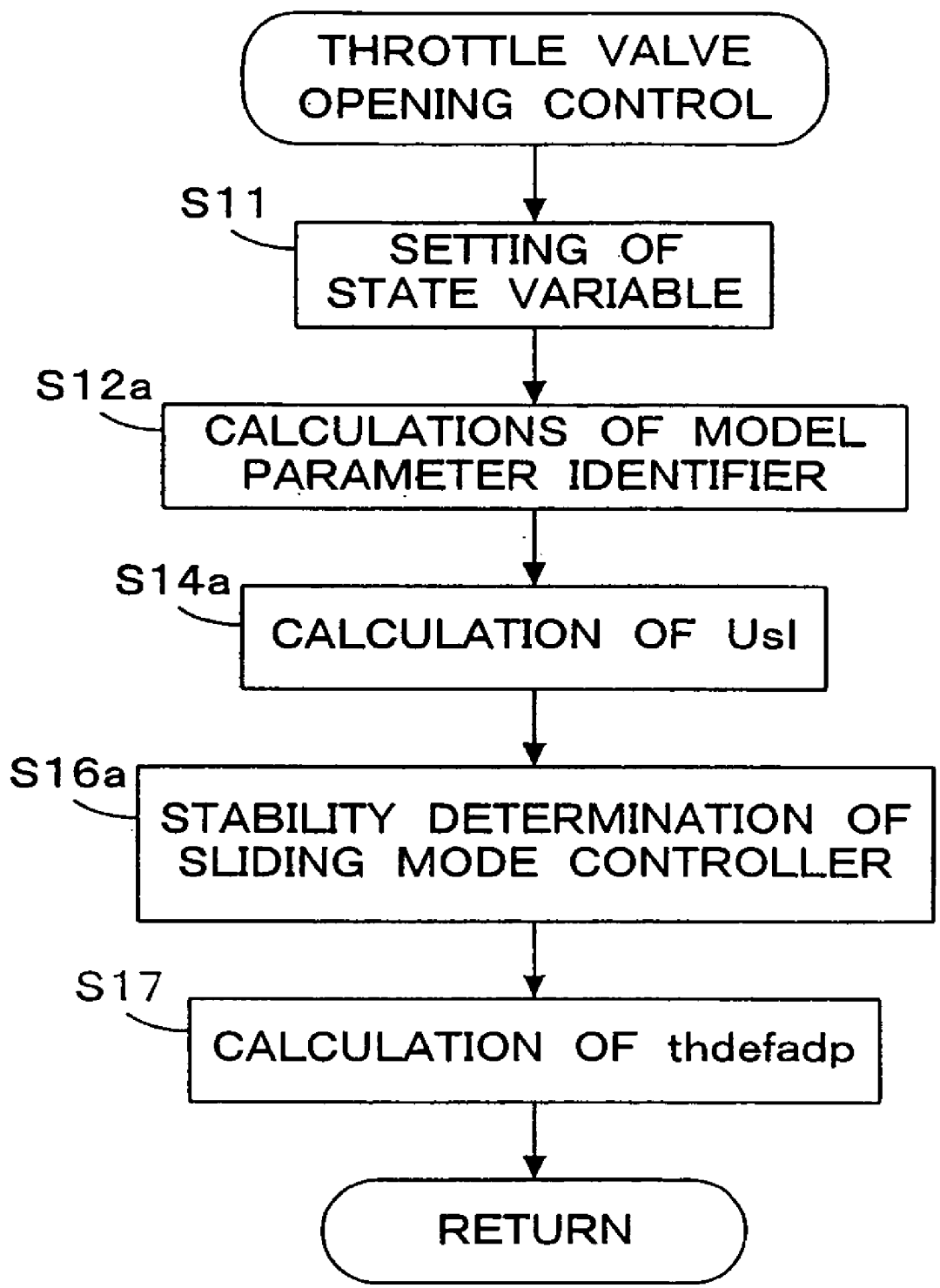
FIG. 32 is a flowchart showing a throttle valve opening control process according to the second embodiment.

FIG. 32 is a flowchart showing a throttle valve opening control process. The throttle valve opening control process differs from the throttle valve opening control process shown in FIG. 9 in that step S13 (the calculations of the state predictor) in the latter process is omitted, and steps S12, S14, and S16 in the latter process are changed respectively to steps S12a, S14a, and S16a.

Figure 33:
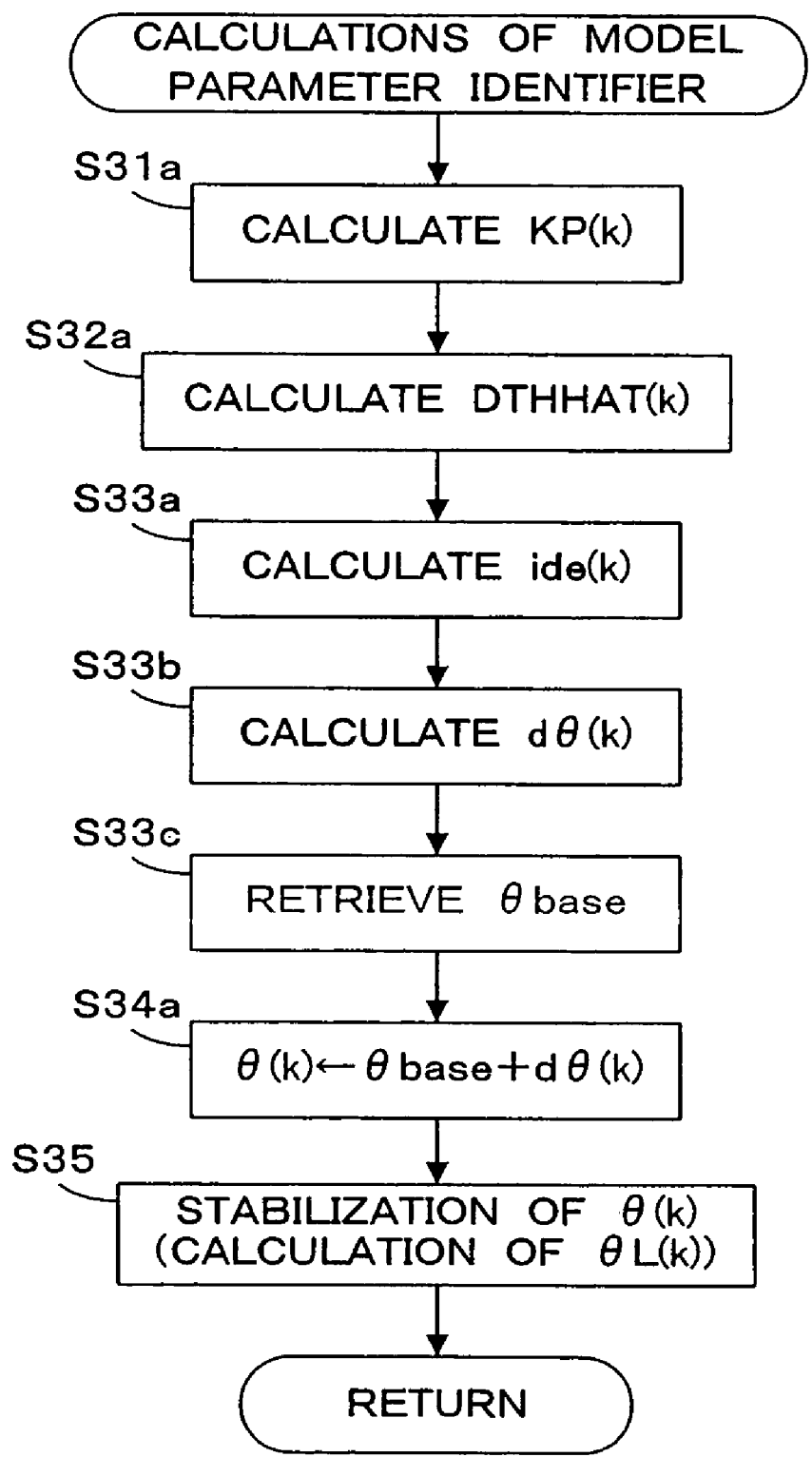
FIG. 33 is a flowchart showing a process of performing calculations of a model parameter identifier in the process shown in FIG. 32.

In step S12a, a process of performing calculations of the model parameter identifier as shown in FIG. 33. Specifically, a process of calculating the model parameter vector θ(k) from the equation (15f) is carried out, and the model parameter vector θ(k) is subjected to the limit process so that the corrected model parameter vector θL(k) is calculated.

Figure 36:
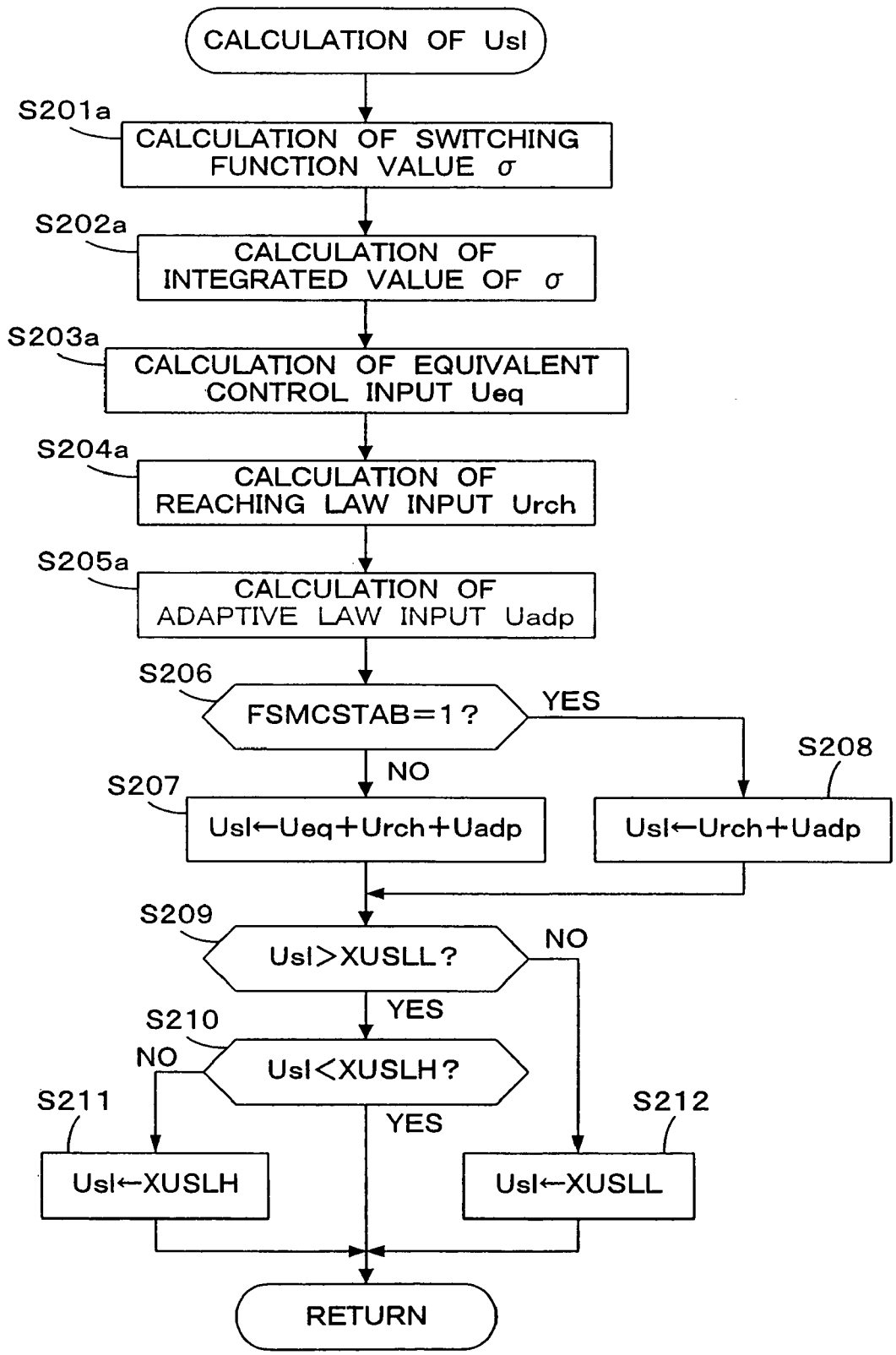
FIG. 36 is a flowchart showing a process of calculating a control input (Usl) in the process shown in FIG. 32.

In step S14a, the control input Usl(k) shown in FIG. 36 is calculated using the corrected model parameter vector θL(k). Specifically, the equivalent control input Ueq, the reaching law input Urch(k), and the adaptive law input Uadp(k) are calculated, and the sum of these inputs is calculated as the control input Usl(k) (duty ratio DUT(k)).

Figure 41:
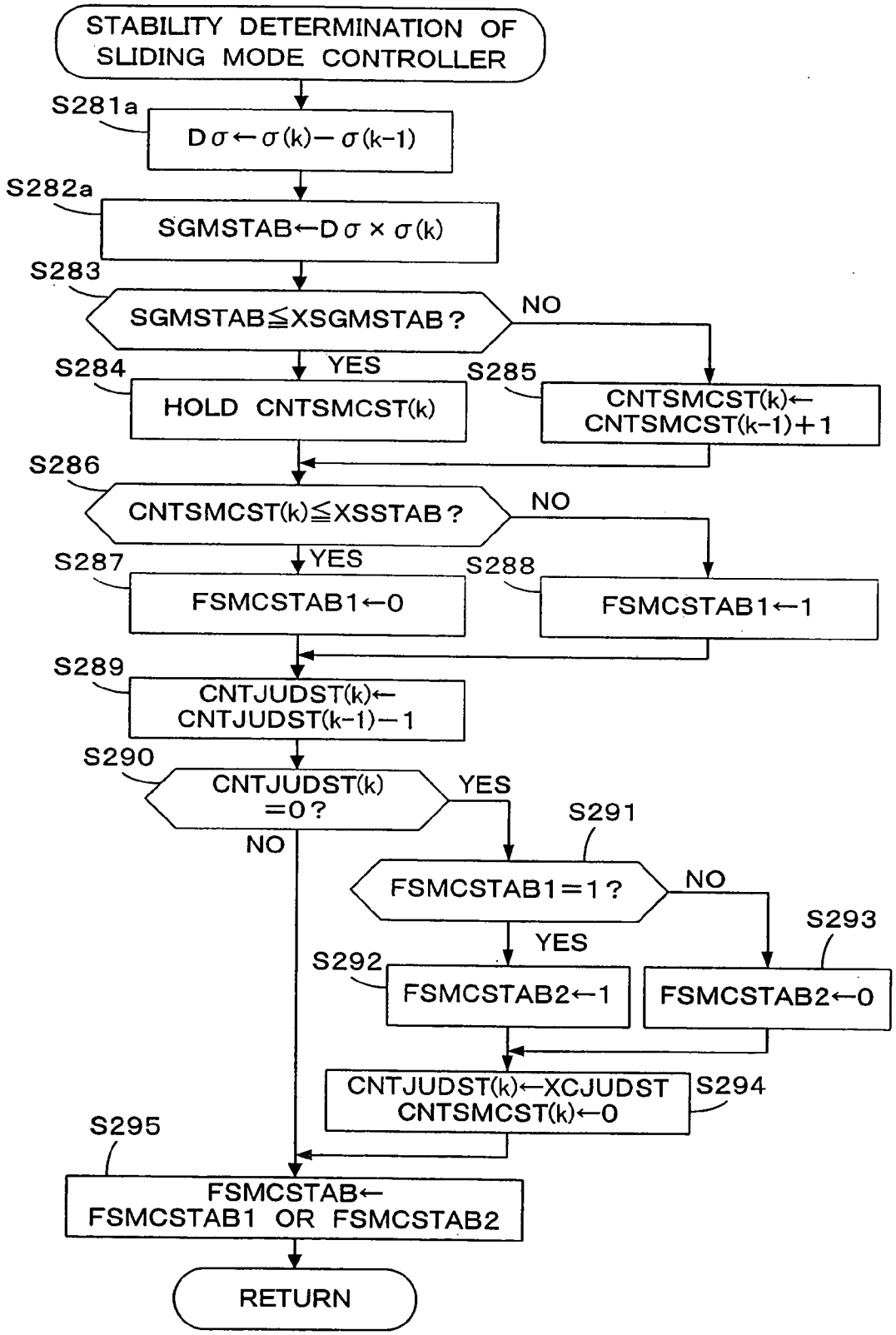
FIG. 41 is a flowchart showing a process of determining the stability of a sliding mode controller in the process shown in FIG. 32.

In step S16a, a process of determining the stability of the sliding mode controller as shown in FIG. 41 is carried out. Specifically, the stability of the sliding mode controller is determined using the switching function value σ instead of the predicted switching function value σpre, and the stability determination flag FSMCSTAB is set. The process performed when the stability determination flag FSMCSTAB is set to "1" is the same as that the first embodiment.

FIG. 33 is a flowchart showing a process of calculations of the model parameter identifier 22a. The process shown in FIG. 33 is different from the process of calculations of the model parameter identifier as shown in FIG. 11 in that steps S31 through S34 in the process shown in FIG. 11 are changed to steps S31a through S34a, and steps S33b and S33c are added.

In step S31a, the gain coefficient vector KP(k) is calculated from the equation (20a). Then, the estimated throttle valve opening deviation amount DTHHAT(k) is calculated from the equations (18) and (19a) in step S32a.

Figure 34:
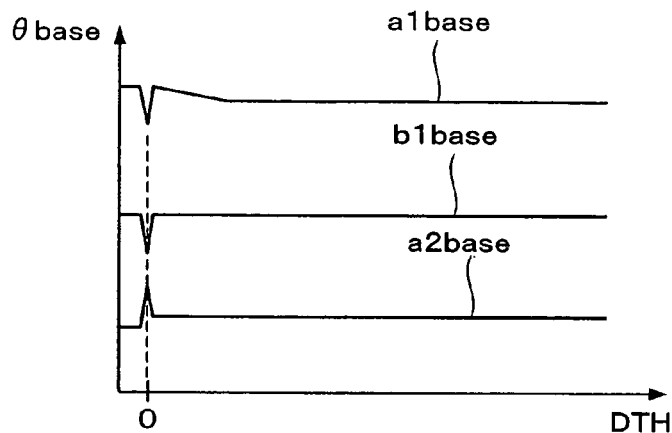
FIG. 34 is a diagram showing a table used in the process shown in FIG. 33.
Figure 35:
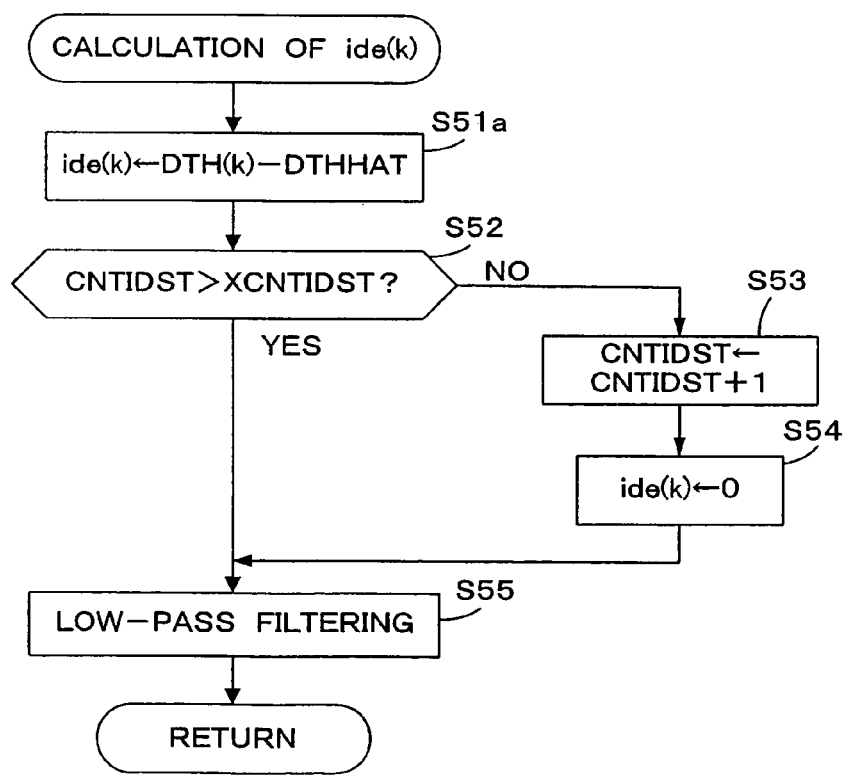
FIG. 35 is a flowchart showing a process of calculating an identifying error (ide) in the process shown in FIG. 33.

In step S33a, a process of calculating ide(k) as shown in FIG. 35 is carried out to calculate the identifying error ide(k). In step S33b, the updating vector dθ(k) is calculated from the equation (15e). Then, a θbase table shown in FIG. 34 is retrieved according to the throttle valve opening deviation amount DTH to calculate the reference model parameter vector θbase in step S33c. In the θbase table, reference model parameters a1base, a2base, and b1base are set. When the throttle valve opening deviation amount DTH has a value close to "0" (i.e., when the throttle opening TH is in the vicinity of the default opening THDEF), the reference model parameters a1base and b1base decrease and the reference model parameter a2base increases. The reference model parameter c1base is set to "0".

In step S34a, the model parameter vector θ(k) is calculated from the equation (15f). Then, the process of stabilizing the model parameter vector θ(k) is executed like the first embodiment (step S35). That is, the model parameters are subjected to the limit process so that the corrected model parameter vector θL(k) is calculated.

FIG. 35 is a flowchart showing a process of calculating the identifying error ide(k) which is carried out in step S33a shown in FIG. 33. The process shown in FIG. 35 is different from the process shown in FIG. 12 in that the dead zone process in step S56 shown in FIG. 12 is omitted and step S51 shown in FIG. 12 is changed to step S51a. In the present embodiment, the dead zone process is not performed, since the drift of the model parameters is prevented by the δ correcting method.

In step S51a, the estimated throttle valve opening deviation amount DTHHAT(k) is calculated from the equations (18) and (19a), and the identifying error ide(k) is calculated using the estimated throttle valve opening deviation amount DTHHAT(k).

In the present embodiment, the predetermined value XCNTIDST in step S52 is set to "2", for example, because the dead time d of the controlled object model is set to "0".

FIG. 36 is a flowchart showing a process of calculating the control input Usl (DUT) applied to the throttle valve actuating device 10, which is carried out in step S14a shown in FIG. 32. The process shown in FIG. 36 is different from the process shown in FIG. 22 in that steps S201 through S205 shown in FIG. 22 are changed respectively to steps S201a through S205a.

Figure 37:
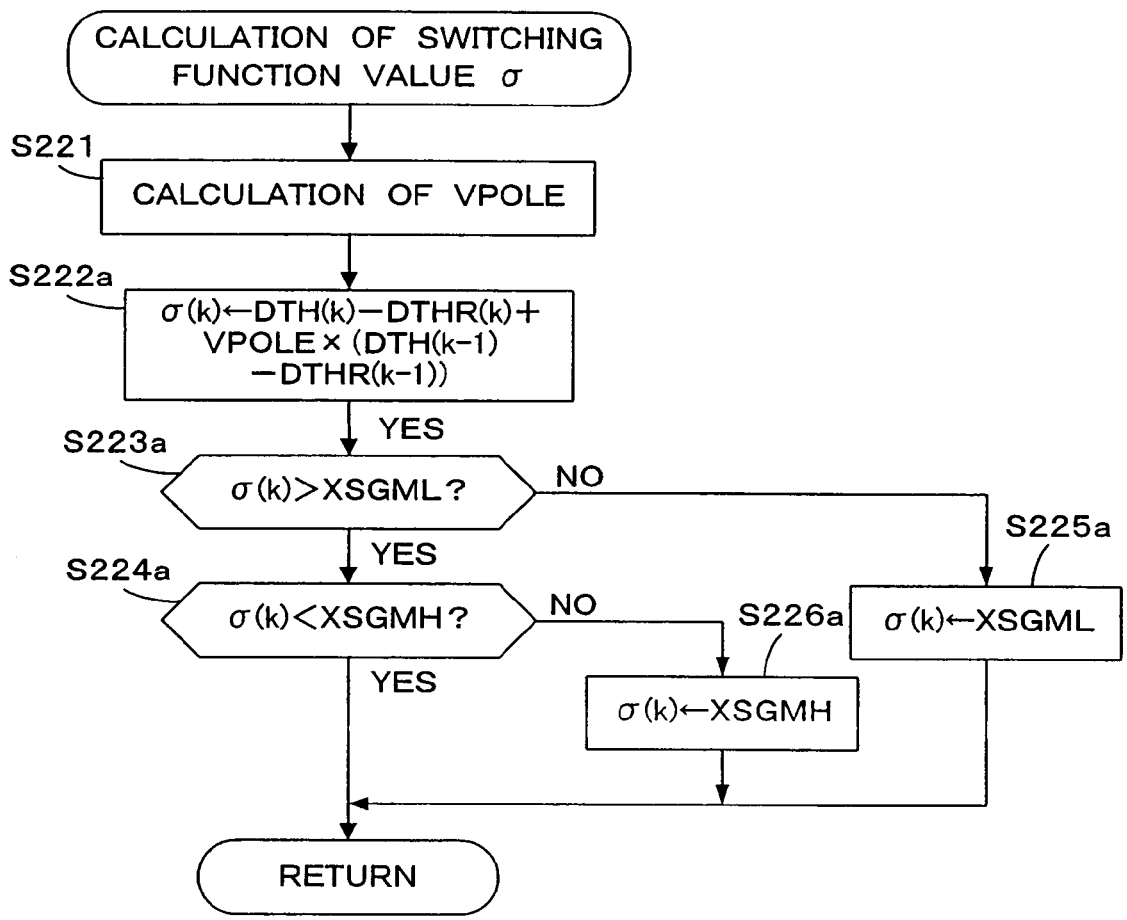
FIG. 37 is a flowchart showing a process of calculating a switching function value ($\sigma$) in the process shown in FIG. 36.
Figure 38:
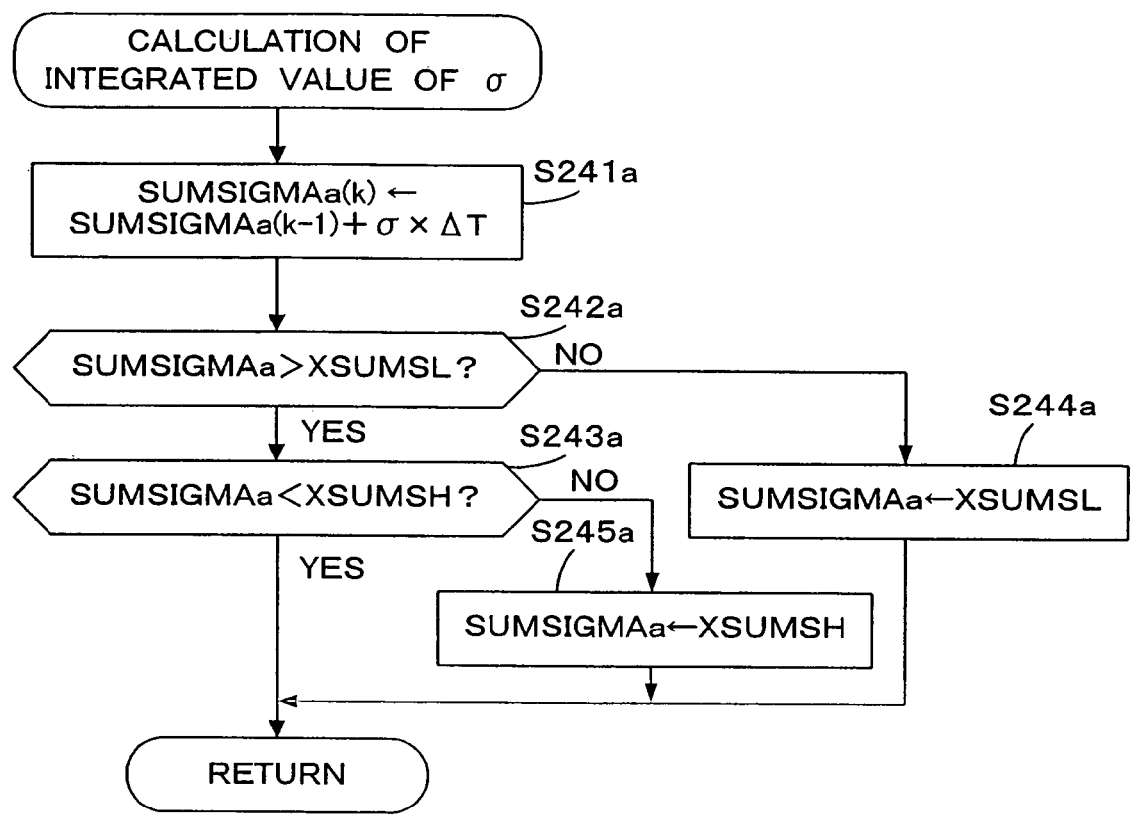
FIG. 38 is a flowchart showing a process of calculating an integrated value of the switching function value ($\sigma$) in the process shown in FIG. 36.
Figure 39:
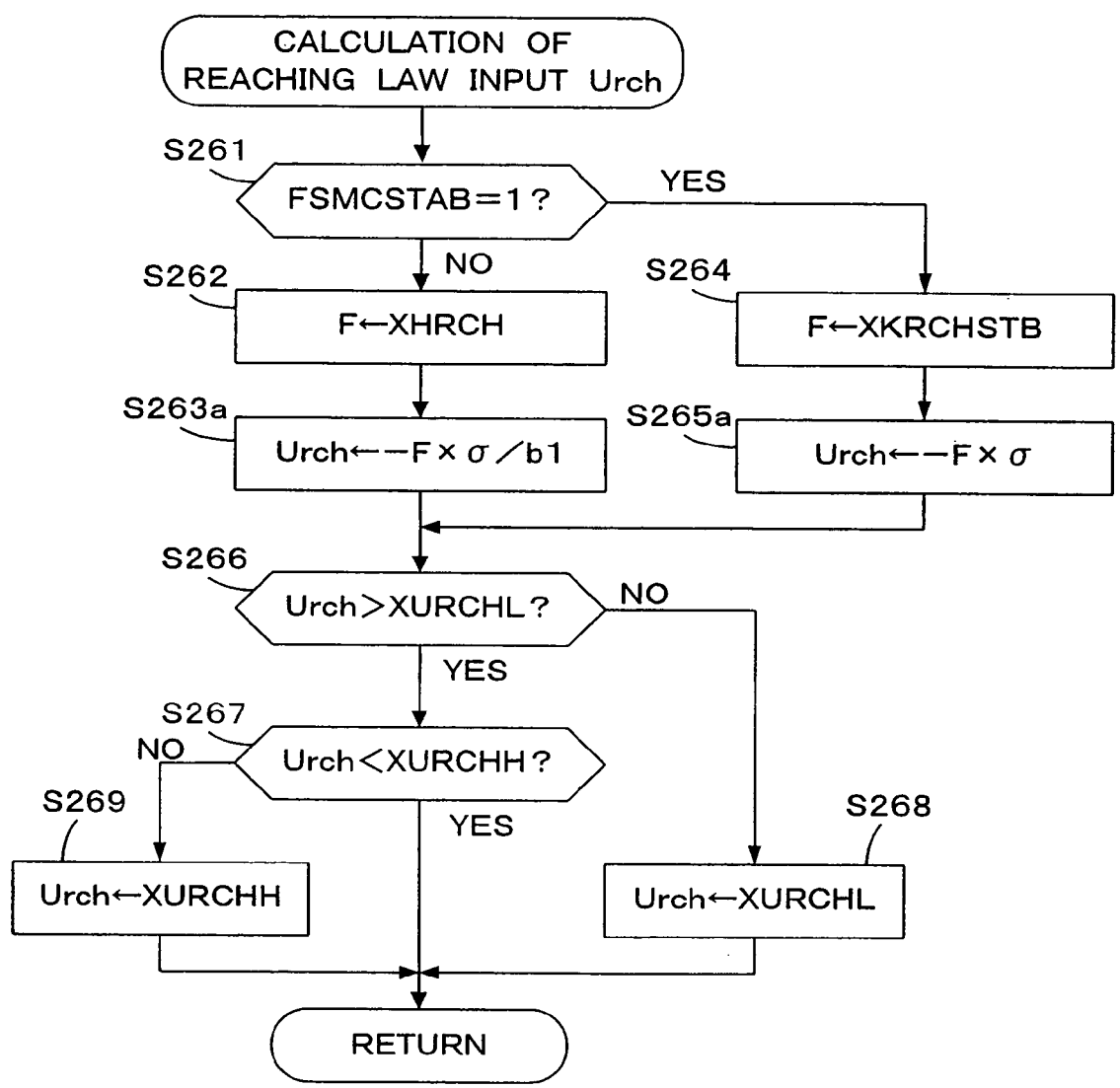
FIG. 39 is a flowchart showing a process of calculating a reaching law input (Urch) in the process shown in FIG. 36.
Figure 40:
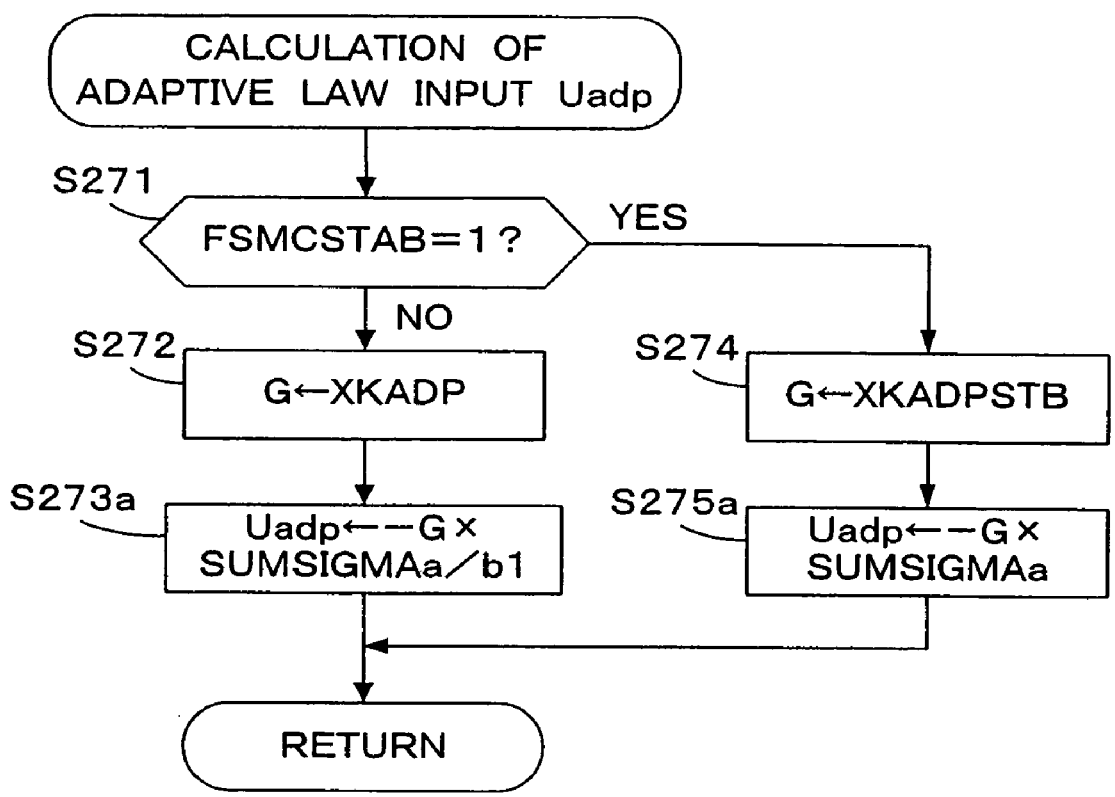
FIG. 40 is a flowchart showing a process of calculating an adaptive law input (Uadp) in the process shown in FIG. 36.

In step S201a, the switching function value σ is calculated as shown in FIG. 37. In step S202a, the integrated value of the switching function value σ is calculated as shown in FIG. 38. In step S203a, the equivalent control input Ueq is calculated from the equation (9b). In step S204a, the reaching law input Urch is calculated as shown in FIG. 39. In step S205a, the adaptive law input Uadp is calculated as shown in FIG. 40.

FIG. 37 is a flowchart showing a process of calculating the switching function value σ which is carried out in step S201a shown in FIG. 36. The process shown in FIG. 37 is different from the process shown in FIG. 23 in that steps S222 through S226 shown in FIG. 23 are changed respectively to steps S222a through S226a.

In step S222a, the switching function value σ(k) is calculated from the equation (5). Steps S223a through S226a are the steps obtained by replacing "σpre" in steps S223 through S226 shown in FIG. 23 with "σ". Accordingly, the switching function value σ(k) is subjected to the limit process in the same manner as the process shown in FIG. 23.

FIG. 38 is a flowchart showing a process of calculating an integrated value SUMSIGMAa of the switching function value a which is carried out in step S202a shown in FIG. 36. The process shown in FIG. 38 is different from the process shown in FIG. 26 in that steps S241 through S245 shown in FIG. 26 are changed respectively to steps S241a through S245a. The integrated value SUMSIGMAa is used for the calculation of the adaptive law input Uadp in a process shown in FIG. 40 described below (see the equation (11b)).

In step S241a, the integrated value SUMSIGMAa is calculated according to the following equation (47a):

$$SUMSIGMAa(k)=SUMSIGMAa(k-1)+\sigma \times \Delta T \qquad (47a)$$

In steps S242a through S245a, the calculated integrated value SUMSIGMAa is subjected to the limit process in the same manner as the process shown in FIG. 26.

FIG. 39 is a flowchart showing a process of calculating the reaching law input Urch, which is carried out in step S204a shown in FIG. 36. The process shown in FIG. 39 is different from the process shown in FIG. 27 in that steps S263 and S265 shown in FIG. 27 are changed respectively to steps S263a and S265a.

In the present embodiment, using the switching function value σ instead of the predicted switching function value σpre, the reaching law input Urch is calculated in step S263a, when the adaptive sliding mode controller 21a is stable, and the reaching law input Urch is calculated in step S265a when the adaptive sliding mode controller 21a is unstable.

FIG. 40 is a flowchart showing a process of calculating the adaptive law input Uadp which is carried out in step S205a shown in FIG. 36. The process shown in FIG. 40 is different from the process shown in FIG. 28 in that steps S273 and S275 shown in FIG. 28 are changed respectively to steps S273a and S275a.

In the present embodiment, using the integrated value SUMSIGMAa of the switching function value σ, the adaptive law input Uadp is calculated in step S273a, when the adaptive sliding mode controller 21a is stable, and the adaptive law input Uadp is calculated in step S275a when the adaptive sliding mode controller 21a is unstable.

FIG. 41 is a flowchart showing a process of determining the stability of the sliding mode controller which is carried out in step S16a shown in FIG. 32. The process shown in FIG. 41 is different from the process shown in FIG. 29 in that steps S281 and S282 shown in FIG. 29 are changed respectively to steps S281a and S282a.

In step S281a, the switching function change amount Dσ is calculated according to the following equation (52a). The stability determining parameter SGMSTAB is calculated according to the following equation (53a) in step S282a. That is, the stability is determined on the basis of the switching function value σ instead of the predicted switching function value σpre.

$$D\sigma=\sigma(k)-\sigma(k-1) \qquad (52a)$$

$$SGMSTAB=D\sigma \times \sigma(k) \qquad (53a)$$

In the present embodiment, the throttle valve actuating device 10 and a portion of the ECU 7, i.e., an output circuit for supplying an energizing current to the motor 6, correspond to a plant. The process shown in FIG. 36 corresponds to a sliding mode controller. The process shown in FIG. 33 corresponds to an identifying means. The process shown in FIG. 35 corresponds to an identifying error calculating means. The process shown in FIG. 35 corresponds to an identifying error correcting means. Step S33b shown FIG. 33 corresponds to an updating vector calculating means and an updating vector correcting means.

Third Embodiment

Figure 42:
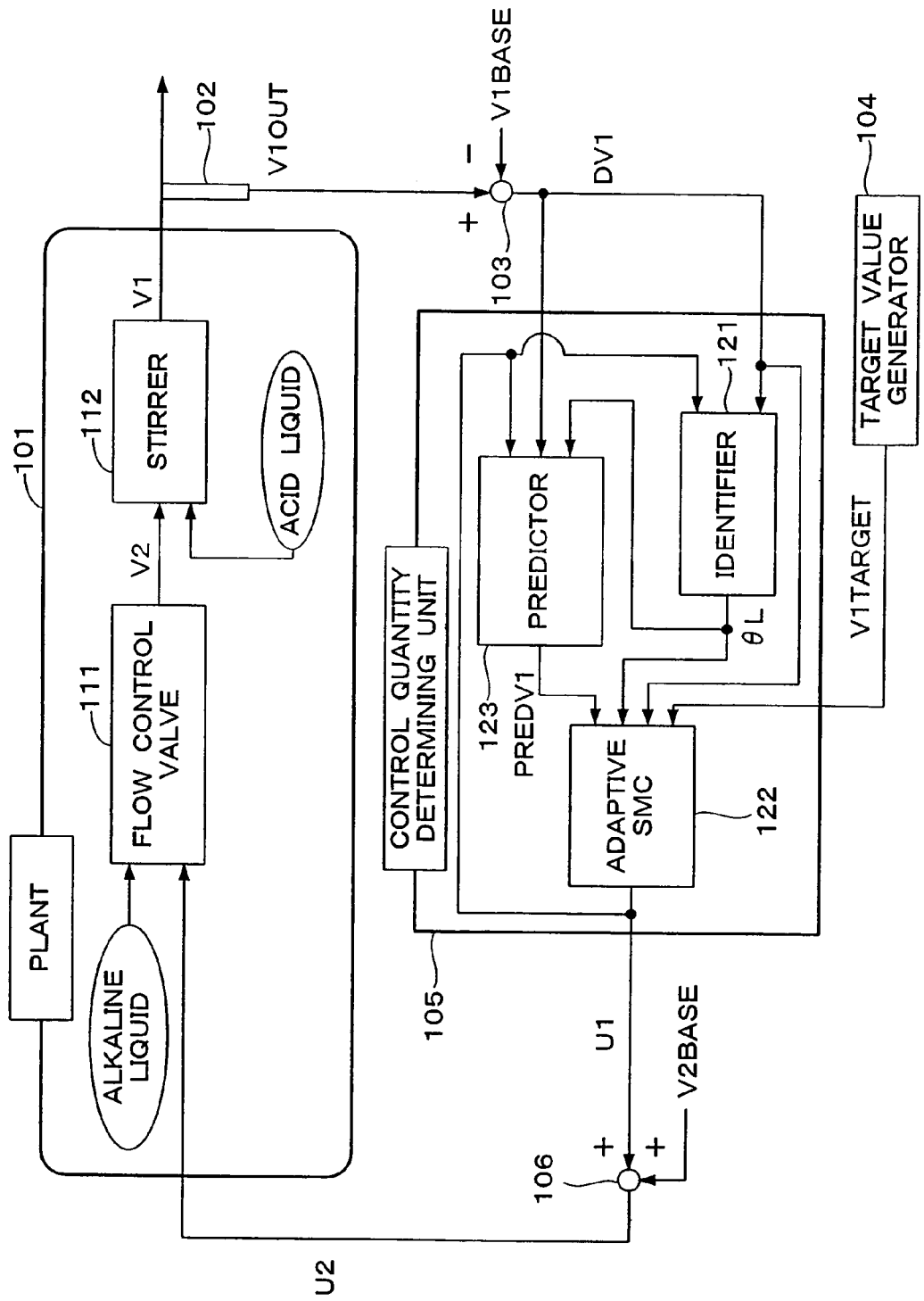
FIG. 42 is a block diagram of a control system according to a third embodiment of the present invention.

FIG. 42 is a block diagram showing a control system according to the third embodiment of the present invention.

As shown in FIG. 42, the control system comprises a plant 101 as a controlled object, a pH sensor 102 for detecting a pH of a mixed liquid which is an output from the plant, a subtractor 103 for subtracting a first reference value V1BASE from an output V1OUT from the pH sensor 102, a target value generator 104 for generating a control target value V1TARGET, a control quantity determining unit 105 for determining a first control quantity U1, and an adder 106 for adding the first control quantity U1 and a second reference value V2BASE and outputting a second control quantity U2.

The subtractor 103, the target value generator 104, the control quantity determining unit 105, and the adder 106 are specifically implemented by an electronic control unit having a CPU, a memory, and an input/output circuit.

The plant 101 includes a flow rate control valve 111 for controlling the flow rate of an alkaline liquid according to the second control quantity U2, and a stirrer 112 for stirring an alkaline liquid supplied via the flow rate control valve 111 and an acid liquid. The plant 101 stirs the alkaline liquid and the acid liquid and outputs a mixed liquid having a desired pH value.

The control quantity determining unit 105 comprises an identifier 121 for identifying a model parameter vector of a controlled object model which is obtained by modeling the plant 101, an adaptive sliding mode controller 122, and a predictor 123. The identifier 121, the adaptive sliding mode controller 122, and the predictor 123 correspond respectively to the model parameter identifier 22, the adaptive sliding mode controller 21, and the state predictor 23 according to the first embodiment, and have the same functions as those of the model parameter identifier 22, the adaptive sliding mode controller 21, and the state predictor 23.

The relations between the components and parameters of the third embodiment and the components and parameters of the first embodiment will be described below.

The pH sensor 102 corresponds to the throttle valve opening sensor 8, and the output V1OUT of the pH sensor 102 corresponds to the throttle valve opening TH. The first target value V1BASE corresponds to the default opening THDEF. In the present preferred embodiment, the first target value V1BASE is set to a pH value corresponding to the neutral value. Therefore, a deviation amount DV1 corresponds to the throttle valve opening deviation amount DTH. The target value generator 104 corresponds to the target opening setting unit 24, and the control target value V1TARGET corresponds to the target value DTHR of the throttle valve opening deviation amount. In the first embodiment, the function of the subtractor 103 is included in the model parameter identifier 22 and the state predictor 23.

The second reference value V2BASE is added to bias the central value of the first control quantity U1 which is the output of the adaptive sliding mode controller 122. In the first embodiment, there is no component corresponding to the adder 106, and hence the second reference value V2BASE substantially equals "0" (i.e., U1=U2=Usl). In the present embodiment, the second reference value V2BASE is set to such a value that the opening of the flow rate control valve 111 is 50%, for example.

The flow rate control valve 111 corresponds to a switching element (which is included in the output circuit of the ECU 7, but not shown in the drawings and not explained the description) that is turned on and off by a pulse signal having the duty ratio DUT. The alkaline liquid corresponds to the supply voltage. An output flow rate V2 of the flow rate control valve 111 corresponds to an energizing current of the motor 6. The stirrer 112 corresponds to the motor 6 and the valve body of the throttle valve 3. The acid liquid corresponds to the intake pipe negative pressure acting on the valve body of the throttle valve 3 and the energizing forces of the return spring 4 and the resilient member 5. A pH value V1 of the mixed liquid outputted from the stirrer 112 corresponds to the actual throttle valve opening.

Because of the above relations, the plant 101 can be modeled in the same manner as the first embodiment, and the same control process as the control process according to the first embodiment can be applied to the plant 101. Specifically, the identifier 121 performs the same operation as that of the first embodiment to calculate the corrected model parameter vector θL, based on the first control quantity U1 and the deviation amount DV1. The predictor 123 performs the same operation as that of the first embodiment to calculate the predicted deviation PREDV1, based on the first control quantity U1, the deviation amount DV1, and the corrected model parameter vector θL. The adaptive sliding mode controller 122 performs the same operation as that of the first embodiment to calculate the first control quantity U1 in order to make the predicted deviation PREDV1 coincide with the control target value V1TARGET, based on the predicted deviation amount PREDV1 and the corrected model parameter vector θL. Therefore, the output V1 of the plant 101 can be made to coincide with a desired pH value by setting the control target value V1TARGET to a desired relative pH value (a desired deviation amount from the first reference value V1BASE).

In the present embodiment, the identifier 121 corresponds to an identifying means, and includes an identifying error calculating means and an identifying error correcting means. The predictor 123 corresponds to a predicting means.

Modification of Third Embodiment

Figure 43:
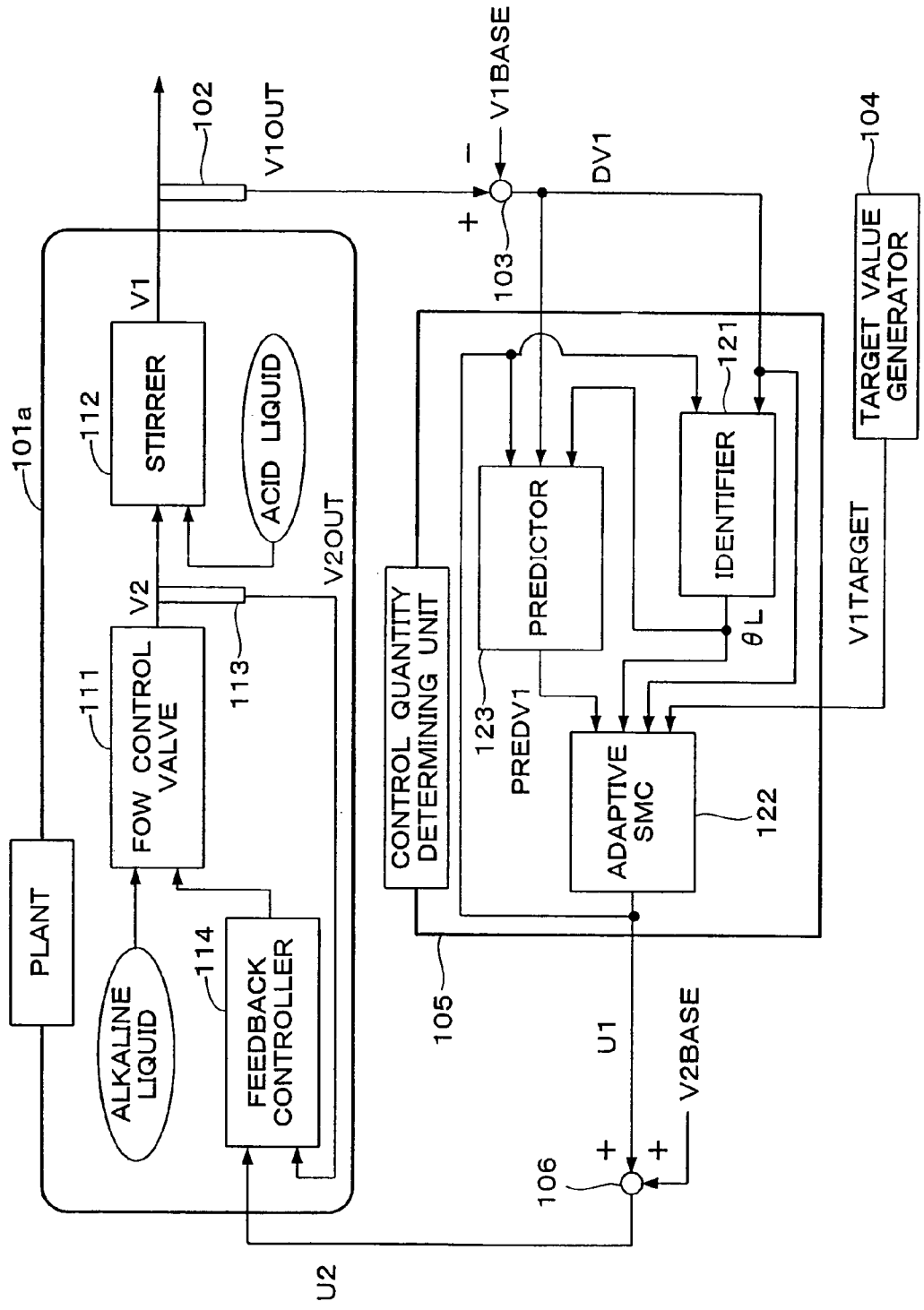
FIG. 43 is a block diagram of a modification of the control system shown in FIG. 42.

FIG. 43 shows a modification of the control system shown in FIG. 42. In the modification, a plant 101a, instead of the plant 101 shown in FIG. 42, is a controlled object. The plant 101a is constituted by adding a flow rate sensor 113 and a feedback controller 114 to the plant 101 shown in FIG. 42. The flow rate sensor 113 detects an output flow rate V1 of the flow control valve 111, and the feedback controller 114 controls the flow control valve 111 to make an output V2OUT of the flow rate sensor 113 coincide with a flow rate corresponding to the second control quantity U2.

The modeling and the control process which are the same as those of the third embodiment are also applicable to the plant including the local feedback loop as shown in FIG. 43.

Since the circuit for energizing the motor in the first embodiment is already known, this circuit has not been described in detail. The circuit for energizing the motor may include a current sensor for detecting an output current of the switching element that is turned on and off, and a feedback control process may be carried out to make a detected current value ID coincide with a current value IR corresponding to the control quantity Usl. The present modification corresponds to a structure where the above circuit arrangement is applied to the first embodiment.

Fourth Embodiment

Figure 44:
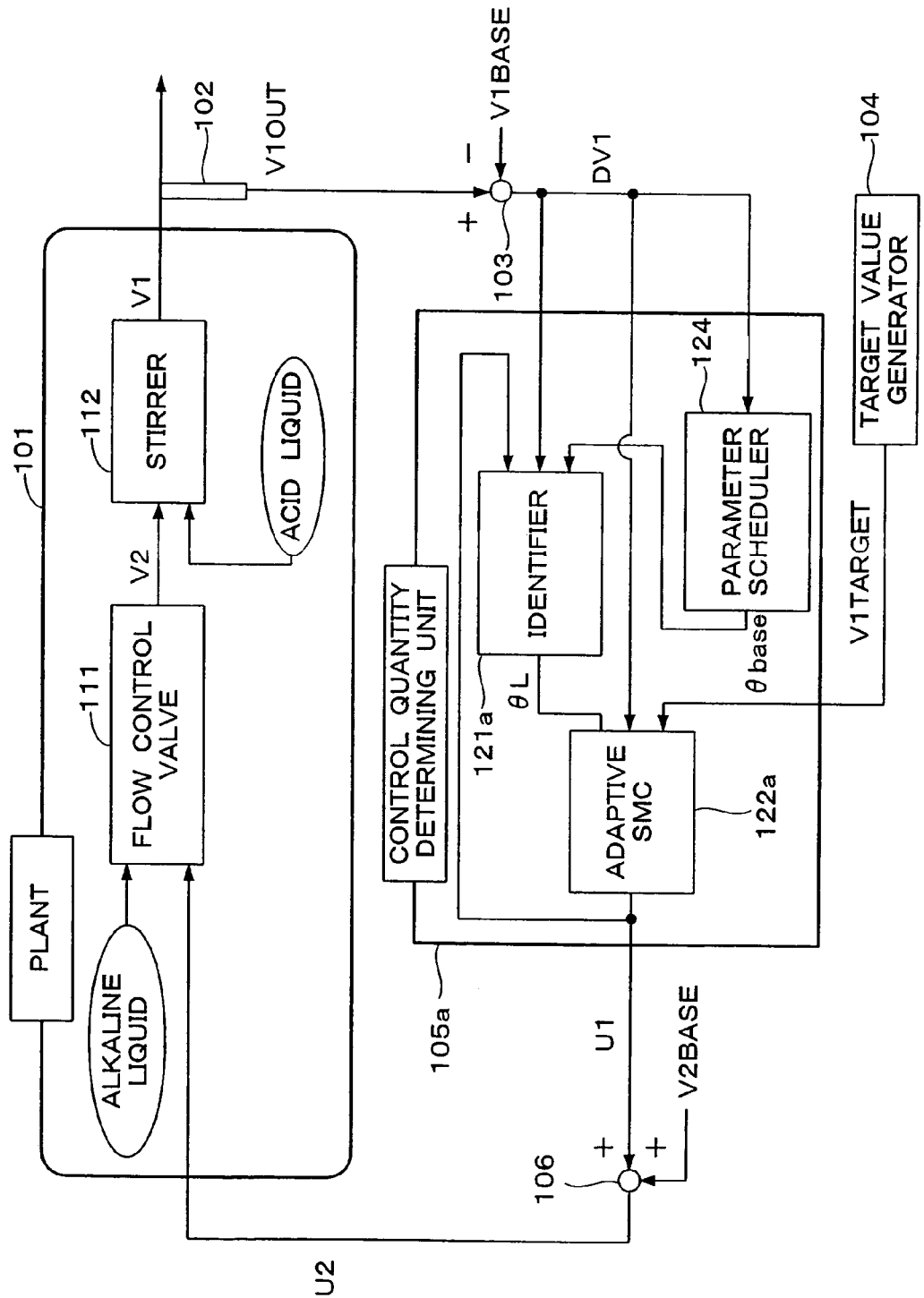
FIG. 44 is a block diagram of a control system according to a fourth embodiment of the present invention.

FIG. 44 is a block diagram of a control system according to the fourth embodiment of the present invention. The control system shown in FIG. 44 corresponds to the control system according to the second embodiment, and is similar to the control system shown in FIG. 42 except that the control quantity determining unit 105 shown in FIG. 42 is replaced with a control quantity determining unit 105a. The details of the control system shown in FIG. 44 which will not be described below are identical to those of the control system according to the third embodiment.

The control quantity determining unit 105a comprises an identifier 121a, an adaptive sliding mode controller 122a, and a parameter scheduler 124.

The identifier 121a, the adaptive sliding mode controller 122a, and the parameter scheduler 124 correspond respectively to, and have the same functions as, the model parameter identifier 22a, the adaptive sliding mode controller 21a, and the model parameter scheduler 25 according to the second embodiment.

The parameter scheduler 124 performs the same operation as that of the second embodiment to calculate the reference model parameter vector θbase, based on the deviation amount DV1. The identifier 121a performs the same operation as that of the second embodiment to calculate the corrected model parameter vector θL based on the first control quantity U1, the deviation amount DV1, and the reference model parameter vector θbase. The adaptive sliding mode controller 122a performs the same operation as that of the second embodiment to calculate the first control quantity U1 based on the deviation amount DV1 and the corrected model parameter vector θL, to make the deviation amount DV1 coincide with the control target value V1TARGET. Therefore, the output V1 of the plant 101 can be made to coincide with a desired pH value by setting the control target value V1TARGET to a desired relative pH value (a deviation amount from the first reference value V1BASE).

In the present embodiment, the identifier 121a corresponds to an identifying means, and includes an identifying error calculating means, an updating vector calculating means, and an updating vector correcting means.

Modification of Fourth Embodiment

Figure 45:
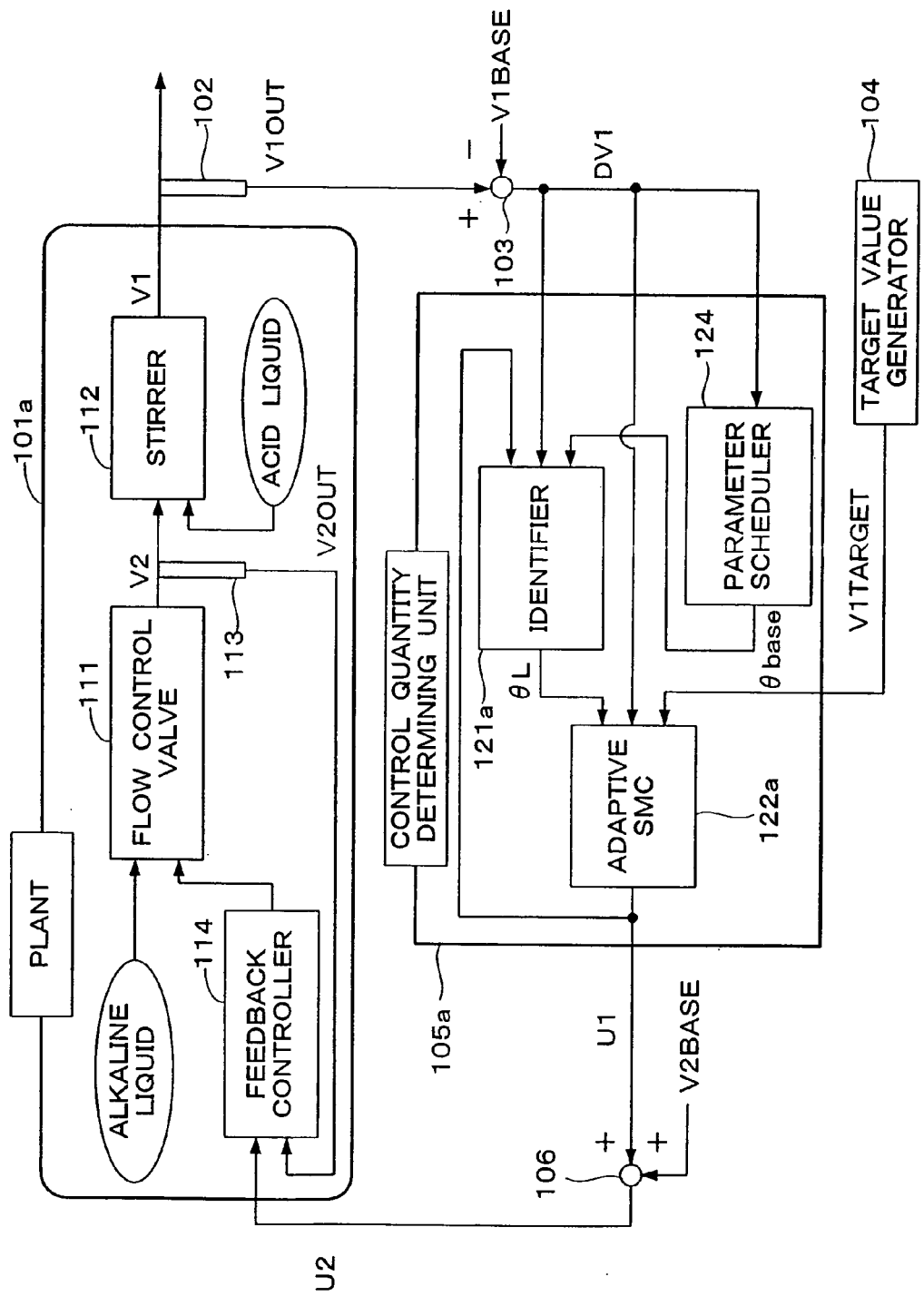
FIG. 45 is a block diagram of a modification of the control system shown in FIG. 44.

FIG. 45 shows a modification of the control system shown in FIG. 44. In the modification, a plant 101a, instead of the plant 101 shown in FIG. 44, is a controlled object. The plant 101a is identical to the plant 101a shown in FIG. 43.

The modeling and the control process which are the same as those of the fourth embodiment are also applicable to the plant including the local feedback loop as shown in FIG. 45.

Fifth Embodiment

Figure 46:
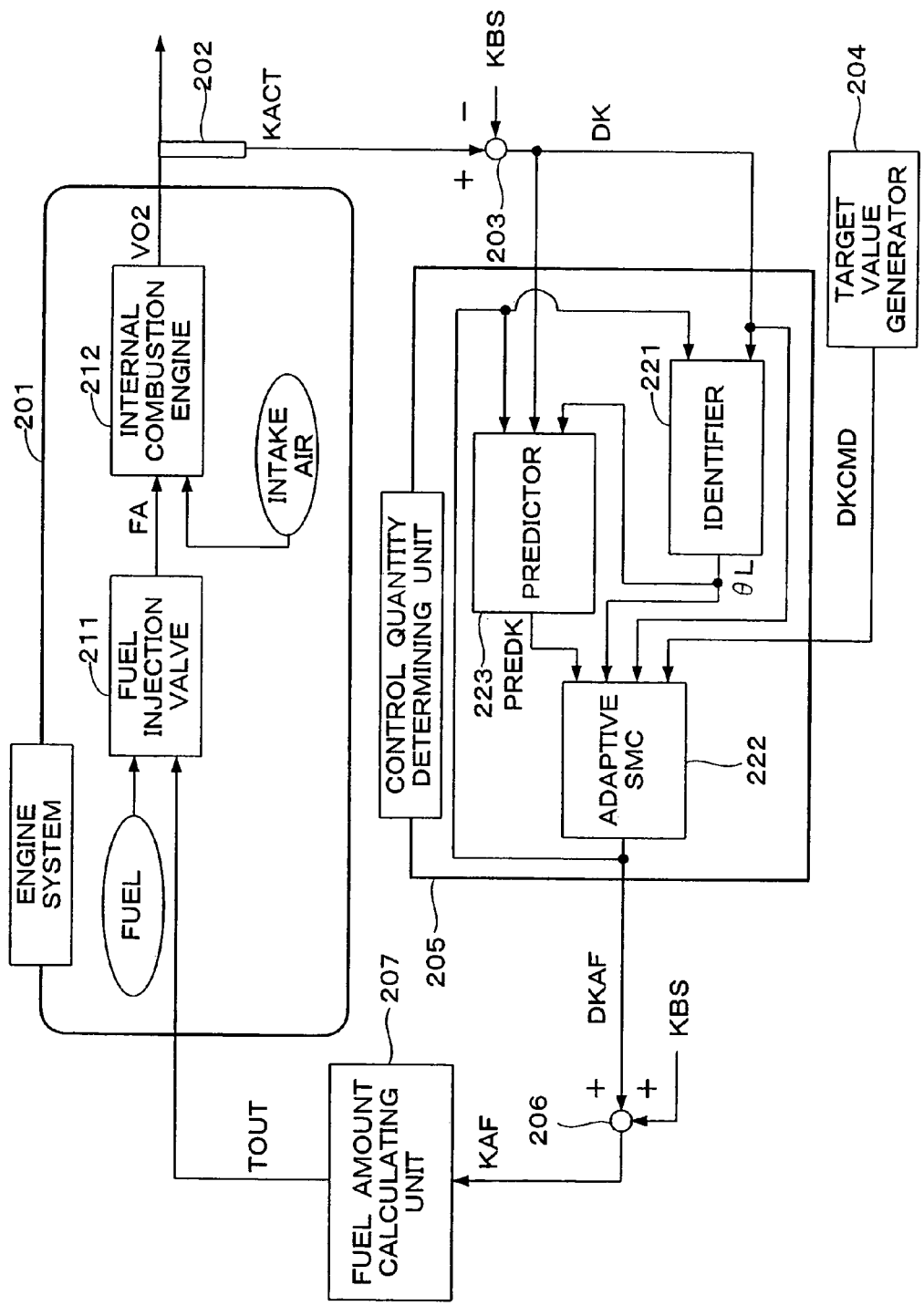
FIG. 46 is a block diagram of a control system according to a fifth embodiment of the present invention.

FIG. 46 is a block diagram showing a control system according to the fifth embodiment of the present invention.

As shown in FIG. 46, the control system comprises an engine system 201 as a controlled object, which includes an internal combustion engine 212, an air-fuel ratio sensor 202 for detecting an air-fuel ratio of an air-fuel mixture to be supplied to the engine 212, a subtractor 203 for subtracting a reference value KBS from an output KACT (having a value converted to an equivalent ratio) from the air-fuel ratio sensor 202, a target value generator 204 for generating a control target value DKCMD, a control quantity determining unit 205 for determining a control quantity DKAF, an adder 206 for adding the control quantity DKAF and the reference value KBS and outputting a correction quantity KAF, and a fuel amount calculating unit 207 for calculating a fuel amount TOUT using the correction quantity KAF and other feedfoward control terms.

The subtractor 203, the target value generator 204, the control quantity determining unit 205, the adder 206, and the fuel amount calculating unit 207 are specifically implemented by an electronic control unit having a CPU, a memory, and an input/output circuit.

The engine system 201 includes a fuel injection valve 211 for injecting fuel according to the fuel amount TOUT, and an internal combustion engine 212 in which an air-fuel mixture of the fuel supplied via the fuel injection valve 211 and the intake air is combusted. The engine system 201 generates a rotation torque by combusting the fuel, and emits combusted gases (exhaust gases).

The control quantity determining unit 205 comprises an identifier 221 for identifying a model parameter vector of a controlled object model which is obtained by modeling the engine system 201, an adaptive sliding mode controller 222, and a predictor 223. The identifier 221, the adaptive sliding mode controller 222, and the predictor 223 correspond respectively to the model parameter identifier 22, the adaptive sliding mode controller 21, and the state predictor 23 according to the first embodiment, and have the same functions as those of the model parameter identifier 22, the adaptive sliding mode controller 21, and the state predictor 23.

The relations between the components and parameters of the fifth embodiment and the components and parameters of the first embodiment will be described below.

The air-fuel ratio sensor 202 corresponds to the throttle valve opening sensor 8, and the output KACT of the air-fuel ratio sensor 202 corresponds to the throttle valve opening TH. The reference value KBS corresponds to the default opening THDEF. In the present embodiment, the reference value KBS is set to a value (1.0) corresponding to the stoichiometric air-fuel ratio. Therefore, a deviation amount DK corresponds to the throttle valve opening deviation amount DTH. The target value generator 204 corresponds to the target opening setting unit 24, and the control target value DKCMD corresponds to the target value DTHR of the throttle valve opening deviation amount. In the first embodiment, the function of the subtractor 203 is included in the model parameter identifier 22 and the state predictor 23.

The reference value KBS is added to bias the central value of the control quantity DKAF which is the output of the adaptive sliding mode controller 222.

The fuel injection valve 211 corresponds to a switching element (which is included in the output circuit of the ECU 7, but not shown in the drawings and not explained the description) that is turned on and off by a pulse signal having the duty ratio DUT. The fuel corresponds to the supply voltage. A fuel amount FA injected from the injection valve 211 corresponds to an energizing current of the motor 6. The engine 212 corresponds to the motor 6 and the valve body of the throttle valve 3. The intake air corresponds to the intake pipe negative pressure acting on the valve body of the throttle valve 3 and the energizing forces of the return spring 4 and the resilient member 5. An oxygen concentration VO2 in the exhaust gases output from the engine 212 corresponds to the actual throttle valve opening.

Because of the above relations, the engine system 201 can be modeled in the same manner as the first embodiment, and the same control process as the control process according to the first embodiment can be applied to the engine system 201. Specifically, the identifier 221 performs the same operation as that of the first embodiment to calculate the corrected model parameter vector θL, based on the control quantity DKAF and the deviation amount DK. The predictor 223 performs the same operation as that of the first embodiment to calculate the predicted deviation PREDK, based on the control quantity DKAF, the deviation amount DK, and the corrected model parameter vector θL. The adaptive sliding mode controller 222 performs the same operation as that of the first embodiment to calculate the control quantity DKAF in order to make the predicted deviation PREDK coincide with the control target value DKCMD, based on the predicted deviation amount PREDK and the corrected model parameter vector θL. Therefore, the air-fuel ratio of the air-fuel mixture to be supplied to the engine 212 can be made to coincide with a desired air-fuel ratio by setting the control target value DKCMD to a desired air-fuel ratio correction value (a desired deviation amount from the reference value KBS).

In the present embodiment, the identifier 221 corresponds to an identifying means, and includes an identifying error calculating means and an identifying error correcting means. The predictor 223 corresponds to a predicting means.

Sixth Embodiment

Figure 47:
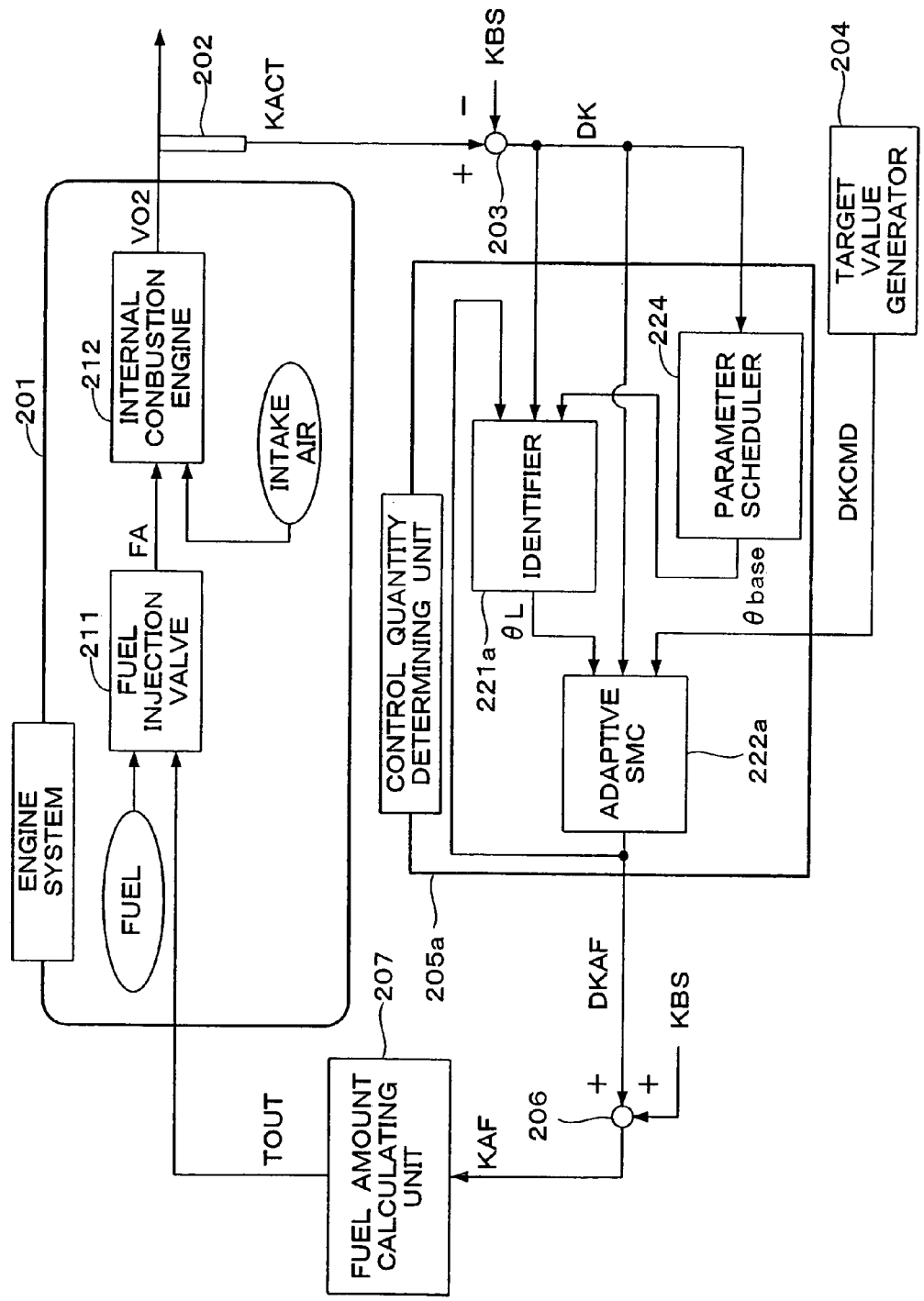
FIG. 47 is a block diagram of a control system according to a sixth embodiment of the present invention.

FIG. 47 is a block diagram of a control system according to the sixth embodiment of the present invention. The control system shown in FIG. 47 corresponds to the control system according to the second embodiment, and is similar to the control system shown in FIG. 46 except that the control quantity determining unit 205 shown in FIG. 46 is replaced with a control quantity determining unit 205a. The details of the control system shown in FIG. 47 which will not be described below are identical to those of the control system according to the fifth embodiment.

The control quantity determining unit 205a comprises an identifier 221a, an adaptive sliding mode controller 222a, and a parameter scheduler 224.

The identifier 221a, the adaptive sliding mode controller 222a, and the parameter scheduler 224 correspond respectively to, and have the same functions as, the model parameter identifier 22a, the adaptive sliding mode controller 21a, and the model parameter scheduler 25 according to the second embodiment.

The parameter scheduler 224 performs the same operation as that of the second embodiment to calculate the reference model parameter vector θbase, based on the deviation amount DK. The identifier 221a performs the same operation as that of the second embodiment to calculate the corrected model parameter vector θL based on the control quantity DKAF, the deviation amount DK, and the reference model parameter vector θbase. The adaptive sliding mode controller 222a performs the same operation as that of the second embodiment to calculate the control quantity DKAF based on the deviation amount DK and the corrected model parameter vector θL, to make the deviation amount DK coincide with the control target value DKCMD. Therefore, the air-fuel ratio of the air-fuel mixture to be supplied to the engine 212 can be made to coincide with a desired air-fuel ratio by setting the control target value DKCMD to a desired air-fuel ratio correction value (a desired deviation amount from the reference value KBS).

In the present embodiment, the identifier 221a corresponds to an identifying means, and includes an identifying error calculating means, an updating vector calculating means, and an updating vector correcting means.

Other Embodiments

The δ correcting method may be replaced with a ε correcting method described below, as a method of calculating the identifying error ide(k) of the model parameters. Specifically, the following equation (15g) may be used instead of the equation (15c) to calculate the model parameter vector θ(k).

$$\theta(k) = EPS^k \theta(0) + \\ EPS^{k-1} \times KP(1)ide(1) + \\ EPS^{k-2} \times KP(2)ide(2) + \cdots + \\ EPS \times KP(k-1)ide(k-1) + KP(k)ide(k)$$ (15g)

where EPS represents a forgetting coefficient vector having forgetting coefficients EPSi (i=1 through 4) as its elements, as indicated by the following equation.

EPS=[EPS1, EPS2, EPS3, EPS4]

Like the forgetting coefficients DELTAi, the forgetting coefficients EPS1, EPS2, and EPS4 are set to a value between "0" and "1" (0<EPSi<1) and have a function to gradually reduce the influence of past identifying errors.

In the ε correcting method, the coefficient EPS3 which is relevant to the calculation of the model parameter b1 must be set to "1" for the following reasons. In the ε correcting method, the all values of the model parameters becomes closer to zero, as the identifying error ide(k) becomes less. Since the model parameter b1 is applied to the denominator of the equations (9b), (10b), and (11b), the input Usl applied to the controlled object diverges as the model parameter b1 becomes closer to "0".

The equation (15g) is different from the equation (15c) in that the initial vector θ(0) is also multiplied by the forgetting coefficient vector EPS.

If the equation (15g) is rewritten into a recursive form, the following equation (15h) is obtained. The method of calculating the model parameter vector θ(k) from the equation (15h) instead of the equation (15) is referred to as the ε correcting method.

$$\theta(k)=EPS\times\theta(k-1)+KP(k)ide(k)$$ (15h)

The ε correcting method also has a function to gradually reduce the influence of past identifying errors eid. Accordingly, the drift of the model parameters are prevented by the ε correcting method.

In the second embodiment, the drift of the model parameters is prevented by the δ correcting method. However, like the first embodiment, the corrected identifying error idenl(k) may be calculated according to the dead zone process (FIG. 14), and the model parameter vector θ(k) may be calculated using the corrected identifying error idenl(k).

In the first embodiment, the dead zone process may be replaced with the δ correcting method or the ε correcting method. If the δ correcting method is employed in the first embodiment, it is preferable to employ the model parameter scheduler like the second embodiment, and calculate the model parameter vector θ by adding the updating vector and the reference vector θbase calculated by the model parameter scheduler.

INDUSTRIAL APPLICABILITY

According to the control system for a plant of the present invention, one or more model parameters of a controlled object model which is obtained by modeling the plant as a controlled object, are identified, and the sliding mode control using the identified model parameters can be stabilized. Specifically, the present invention is applicable to the control of an actuating device of a throttle valve that controls an amount of air supplied to an internal combustion engine, a combustion system including an internal combustion engine, a chemical plant, or the like. The present invention contributes to improve stability of control when controlling the above controlled object with the sliding mode control. Further, the present invention is also applicable to the control of an engine having an crank shaft mounted vertically, such as an outboard engine for driving a ship.

The invention claimed is:

1. A control system for a plant, including a sliding mode controller for controlling said plant with a sliding mode control, wherein said sliding mode controller includes:

switching function value calculating means for calculating a value of a switching function defined as a linear function of a deviation between an output of said plant and a control target value;

equivalent control input calculating means for calculating an equivalent control input that contributes to constraining a deviation state quantity which is defined based on the deviation between the output of said plant and the control target value, on a switching straight line on which the value of the switching function becomes zero;

reaching law input calculating means for calculating a reaching law input that contributes to placing the deviation state quantity onto the switching straight line;

control input calculating means for calculating a control input to said plant by adding at least the equivalent control input and the reaching law input;

stability determining means for determining whether or not the sliding mode control is stable; and stabilizing means for reducing an absolute value of the equivalent control input when the sliding mode control is determined to be unstable.

2. A control system for a plant, including a sliding mode controller for controlling said plant with a sliding mode control, wherein said sliding mode controller includes:

switching function value calculating means for calculating a value of a switching function defined as a linear function of a deviation between an output of said plant and a control target value;

equivalent control input calculating means for calculating an equivalent control input that contributes to constraining a deviation state quantity which is defined based on the deviation between the output of said plant and the control target value, on a switching straight line on which the value of the switching function becomes zero;

reaching law input calculating means for calculating a reaching law input that contributes to placing the deviation state quantity onto the switching straight line!

control input calculating means for calculating a control input to said plant by adding at least the equivalent control input and the reaching law input;

stability determining means for determining whether or not the sliding mode control is stable; and stabilizing means for changing a control gain that is used in calculating the reaching law input, to a value that makes the sliding mode control more stable, when the sliding mode control is determined to be unstable.

3. A control system according to claim 1 or 2, wherein said sliding mode controller further includes adaptive law input calculating means for calculating an adaptive law input that contributes to placing the deviation state quantity onto the switching straight line, and said control input calculating means calculates the control input to said plant by adding the equivalent control input, the reaching law input, and the adaptive law input.

4. A control system for a plant, including a sliding mode controller for controlling said plant with a sliding mode control, wherein said sliding mode controller includes:

switching function value calculating means for calculating a value of a switching function defined as a linear function of a deviation between an output of said plant and a control target value;

equivalent control input calculating means for calculating an equivalent control input that contributes to constraining a deviation state quantity which is defined based on the deviation between the output of said plant and the control target value, on a switching straight line on which the value of the switching function becomes zero;

reaching law input calculating means for calculating a reaching law input that contributes to placing the deviation state quantity onto the switching straight line;

adaptive law input calculating means for calculating an adaptive law input that contributes to placing the deviation state quantity onto the switching straight line;

control input calculating means for calculating a control input to said plant by adding the equivalent control input, the reaching law input, and the adaptive law input;

stability determining means for determining whether or not the sliding mode control is stable; and stabilizing means for changing a control gain that is used in calculating the adaptive law input, to a value that makes the sliding mode control more stable, when the sliding mode control is determined to be unstable.

5. A control system for a plant, including a sliding mode controller for controlling said plant with a sliding mode control, wherein said sliding mode controller includes:

switching function value calculating means for calculating a value of a switching function defined as a linear function of a deviation between an output of said plant and a control target value;

stability determining means for determining whether or not the sliding mode control is stable; and stabilizing means for changing the switching function so that a response speed of the sliding mode control may decrease, when the sliding mode control is determined to be unstable.

6. A control system according to any one of claims 1, 2, 4 or 5, wherein said stability determining means performs the stability determination, based on a value of the switching function.

7. A control system for a plant, comprising:

identifying means for identifying at least one model parameter of a controlled object model that is obtained by modeling said plant, based on an input and an output of said plant; and a sliding mode controller for controlling said plant with a sliding mode control, using the at least one model parameter identified by said identifying means, wherein said sliding mode controller includes:

stability determining means for determining whether or not the sliding mode control is stable; and stabilizing means for inhibiting the use of a predetermined model parameter, when the sliding mode control is determined to be unstable.

8. A control system according to any one of claim 7, wherein said plant includes a throttle valve actuating device having a throttle valve of an internal combustion engine and actuating means for actuating said throttle valve, and said sliding mode controller calculates a parameter for determining the control input to be applied to said throttle valve actuating device to make the opening of said throttle valve coincide with a target opening.

* * * * *